(12) United States Patent
Zeller et al.

(10) Patent No.: US 11,480,446 B2
(45) Date of Patent: *Oct. 25, 2022

(54) TRACKING POSITIONS OF PERSONNEL, VEHICLES, AND INANIMATE OBJECTS

(71) Applicant: Merlin Technology, Inc., Kent, WA (US)

(72) Inventors: Rudolf Zeller, Seattle, WA (US); Guenter W. Brune, Bellevue, WA (US); Albert W. Chau, Woodinville, WA (US); John E. Mercer, Gig Harbor, WA (US)

(73) Assignee: Merlin Technology Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,680

(22) Filed: Sep. 9, 2020

(65) Prior Publication Data
US 2021/0010828 A1    Jan. 14, 2021

Related U.S. Application Data

(60) Continuation of application No. 16/579,795, filed on Sep. 23, 2019, now Pat. No. 10,809,099, which is a
(Continued)

(51) Int. Cl.
*G01D 5/20*      (2006.01)
*G01V 3/08*      (2006.01)
(Continued)

(52) U.S. Cl.
CPC ....... *G01D 5/2006* (2013.01); *E21B 47/0232* (2020.05); *G01V 3/08* (2013.01); *G01V 3/081* (2013.01); *G01V 3/38* (2013.01)

(58) Field of Classification Search
None
See application file for complete search history.

(56) References Cited

U.S. PATENT DOCUMENTS 3,046,549 A    7/1962   Kalmus
3,121,228 A    2/1964   Kalmus
(Continued)

*Primary Examiner* — Jermele M Hollington
(74) *Attorney, Agent, or Firm* — Pritzkau Patent Group LLC

(57) ABSTRACT

A device rotates at least one static magnetic field about an axis, producing a rotating magnetic dipole field, and is movable in relation to the surface of the ground. The field is periodically sensed using a receiver to produce a receiver output responsive to the field. A positional relationship between the receiver and the device is monitored using the output. In one aspect, changing the positional relationship, by moving the device nearer to a boring tool which supports the receiver, causes an increase in accuracy of depth determination. In another aspect, determination of an actual overhead position of the boring tool, and its application, are described. Use of a plurality of measurements over at least one-half revolution of each magnet is disclosed. Establishing a surface radial direction toward a boring tool and resolution of multi-valued parameters is described. Calibration techniques, as well as a three transmitter configuration are also described.

2 Claims, 24 Drawing Sheets

Related U.S. Application Data continuation of application No. 15/090,507, filed on Apr. 4, 2016, now Pat. No. 10,422,664, which is a continuation of application No. 14/702,694, filed on May 2, 2015, now Pat. No. 9,310,507, which is a continuation of application No. 14/179,314, filed on Feb. 12, 2014, now Pat. No. 9,035,656, which is a continuation of application No. 13/099,713, filed on May 3, 2011, now Pat. No. 8,686,731, which is a continuation of application No. 12/952,020, filed on Nov. 22, 2010, now Pat. No. 7,960,973, which is a division of application No. 12/831,421, filed on Jul. 7, 2010, now Pat. No. 7,859,249, which is a division of application No. 12/490,897, filed on Jun. 24, 2009, now Pat. No. 7,772,849, which is a division of application No. 12/195,860, filed on Aug. 21, 2008, now Pat. No. 7,570,060, which is a division of application No. 10/961,841, filed on Oct. 7, 2004, now Pat. No. 7,425,829.

(60) Provisional application No. 60/510,293, filed on Oct. 9, 2003.

(51) Int. Cl.
*G01V 3/38* (2006.01)
*E21B 47/0232* (2012.01)

(56) References Cited

U.S. PATENT DOCUMENTS

| | | | |
|---|---|---|---|
| 3,868,565 A | 2/1975 | Kuipers | |
| 3,876,831 A | 4/1975 | Wickham et al. | |
| 3,983,474 A | 9/1976 | Kuipers | |
| 4,812,812 A | 3/1989 | Flowerdew et al. | |
| 5,002,137 A | 3/1991 | Dickinson et al. | |
| 5,589,775 A | 12/1996 | Kuckes | |
| 5,646,524 A | 7/1997 | Gilboa | |
| 5,646,525 A * | 7/1997 | Gilboa | F41G 3/225 324/207.17 |
| 6,223,826 B1 | 5/2001 | Chau et al. | |
| 6,285,190 B1 | 9/2001 | Brune et al. | |
| 6,380,732 B1 | 4/2002 | Gilboa | |
| 6,496,008 B1 | 12/2002 | Brune et al. | |
| 6,498,480 B1 | 12/2002 | Manara | |
| 6,537,196 B1 | 3/2003 | Creighton, IV et al. | |
| 6,615,155 B2 | 9/2003 | Gilboa | |
| 6,727,704 B2 | 4/2004 | Brune et al. | |
| 6,927,741 B2 * | 8/2005 | Brune | H01Q 1/04 324/334 |
| 7,044,369 B2 | 5/2006 | Gantz | |
| 7,425,829 B2 | 9/2008 | Zeller et al. | |
| 7,570,060 B2 | 8/2009 | Zeller et al. | |
| 7,772,849 B2 | 8/2010 | Zeller et al. | |
| 7,859,249 B2 | 12/2010 | Zeller et al. | |
| RE42,426 E | 6/2011 | McLoughlin | |
| 9,071,062 B2 * | 6/2015 | Whitehead | H01F 21/08 |
| 9,310,507 B2 * | 4/2016 | Zeller | G01V 3/081 |
| 2001/0038354 A1 | 11/2001 | Gilboa | |
| 2002/0005719 A1 | 1/2002 | Gilboa et al. | |
| 2002/0062203 A1 | 5/2002 | Gilboa | |
| 2003/0090424 A1 * | 5/2003 | Brune | H01Q 7/00 343/741 |
| 2003/0094945 A1 | 5/2003 | Netzer | |
| 2003/0218458 A1 | 11/2003 | Seger et al. | |
| 2004/0000902 A1 | 1/2004 | Tokunaga et al. | |
| 2011/0062959 A1 | 3/2011 | Zeller et al. | |

* cited by examiner

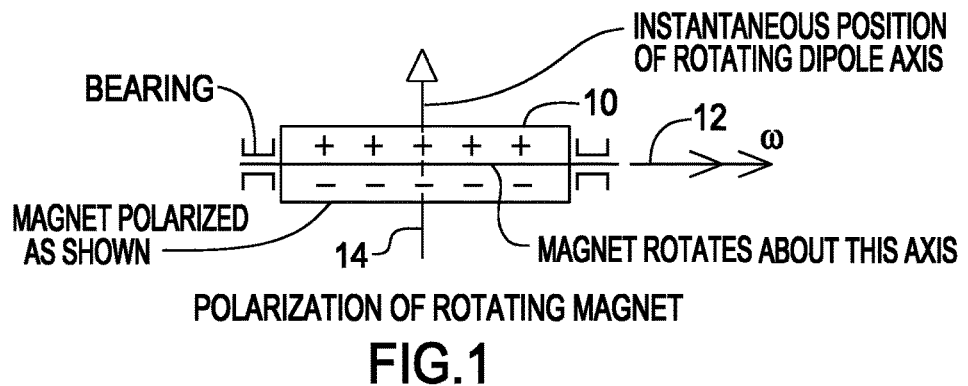
FIG.1 POLARIZATION OF ROTATING MAGNET
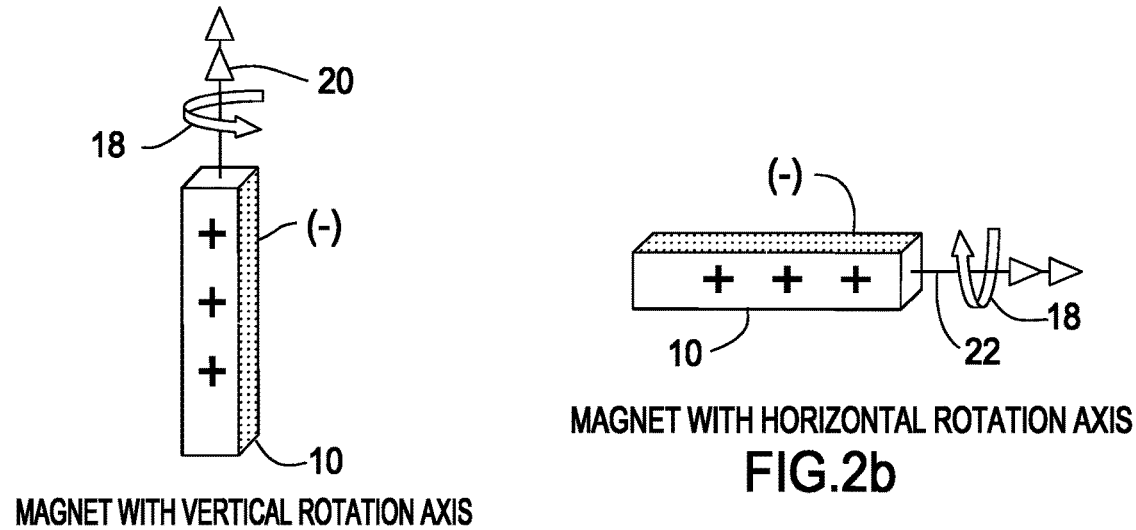
FIG.2a MAGNET WITH VERTICAL ROTATION AXIS
FIG.2b MAGNET WITH HORIZONTAL ROTATION AXIS
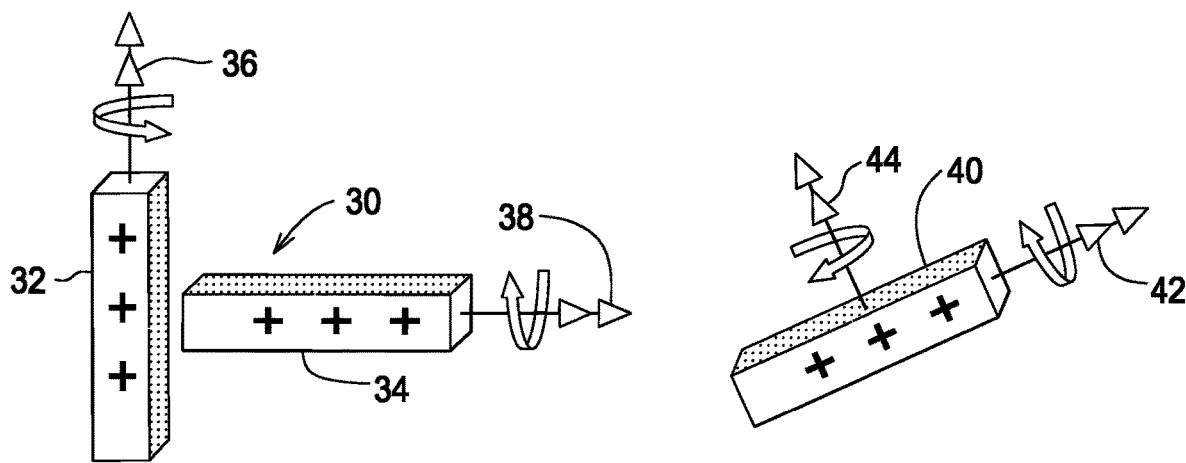
FIG.2c VERTICAL AND HORIZONTAL MAGNETS IN SAME HOUSING
FIG.2d MAGNET ROTATING ABOUT TWO AXES

HORIZONTAL MAGNET AND MAGNET WITH OBLIQUE ROTATION AXIS

PERSONNEL TRACKING SYSTEM

TRACKING POSITIONS OF PERSONNEL, VEHICLES, AND INANIMATE OBJECTS

RELATED APPLICATION

The present application is a continuation application of co-pending U.S. application Ser. No. 16/579,795 filed Sep. 23, 2019 and issued as U.S. Pat. No. 10,809,099 on Oct. 20, 2020; which is a continuation application of U.S. application Ser. No. 15/090,507 filed Apr. 4, 2016 and issued as U.S. Pat. No. 10,422,664 on Sep. 24, 2019; which is a continuation application of U.S. application Ser. No. 14/702,694 filed May 2, 2015 and issued as U.S. Pat. No. 9,310,507; which is a continuation application of U.S. application Ser. No. 14/179,314 filed Feb. 12, 2014 and issued as U.S. Pat. No. 9,035,656 on May 19, 2015; which is a continuation application of U.S. application Ser. No. 13/099,713 filed May 3, 2011 and issued as U.S. Pat. No. 8,686,731 on Apr. 1, 2014; which is a continuation application of U.S. application Ser. No. 12/952,020 filed Nov. 22, 2010 and issued as U.S. Pat. No. 7,960,973 on Jun. 14, 2011; which is a divisional application of U.S. application Ser. No. 12/831,421 filed Jul. 7, 2010 and issued as U.S. Pat. No. 7,859,249 on Dec. 28, 2010; which is a divisional application of U.S. application Ser. No. 12/490,897 filed Jun. 24, 2009 and issued as U.S. Pat. No. 7,772,849 on Aug. 10, 2010; which is a divisional application of U.S. application Ser. No. 12/195,860, filed Aug. 21, 2008 and issued as U.S. Pat. No. 7,570,060 on Aug. 4, 2009; which is a divisional application of U.S. application Ser. No. 10/961,841, filed Oct. 7, 2004 and issued as U.S. Pat. No. 7,425,829 on Sep. 16, 2008; which claims priority from U.S. Provisional Application Ser. No. 60/510,293, filed on Oct. 9, 2003; which are all incorporated herein by reference.

BACKGROUND OF THE INVENTION

The present invention is related generally to the field of positional tracking using an electromagnetic field and, more particularly, to such tracking using a rotating dipole field.

The prior art contains many examples of the use of an electromagnetic field for tracking and position monitoring purposes. A number of these prior art implementations specifically utilize an electromagnetic dipole field. In particular applications, such as, for example, horizontal directional drilling, a dipole field is particularly useful, at least in part, as a result of its axisymmetric field pattern. That is, the axis of the dipole field can be oriented along the axis of a rotating boring tool in order to create a quasistatic field. It is noted that the electromagnetic dipole field is advantageous with respect to the ability to modulate the field with information of interest.

A more limited number of prior art implementations make use of a dipole field wherein the dipole field axis is rotated about an axis that is generally perpendicular to the dipole field axis for purposes of monitoring position and/or orientation. Such a field can be created in the form of an electromagnetic field by passing electrical current through coils. One use of a rotating electromagnetic dipole field is described by U.S. Pat. No. 3,121,228, issued to Kalmus (hereinafter the '228 patent) and entitled DIRECTION INDICATOR. This patent teaches a system which transmits a rotating electromagnetic dipole field from a leading vehicle which is received by a following vehicle. The field generator on the leading vehicle and the receiver on the following vehicle are each made up of a pair of orthogonal coils. The field generator is driven by an alternating current source with a 90 degree phase difference between its coils. A phase difference between the receiver coils is used to determine orientation, while the distance between the receiver and generator is determined based on the sum of the induced voltages in the receiver coils. It is of interest, however, that the solution which is presented assumes that the signal generator and the receiver are coplanar with respect to one another, which is typically only the case with a level ground surface. It is considered that this constraint markedly narrows the usefulness of the described method.

Another early prior art system is described in U.S. Pat. No. 4,812,812. Unfortunately, this system does not appear to be capable of producing distance measurements. Further, it is submitted that the system is inoperable in the event that the transmitter is higher than the receiver.

Another prior art implementation which uses a rotating dipole field is described in U.S. Pat. No. 5,589,775 issued to Kuckes. In this implementation, the rotated dipole field is applied to the purpose of forming a horizontal borehole in a parallel spaced apart relationship with a pre-existing borehole. Formation of such a parallel borehole is useful, for example, in steam-assisted gravity drainage (SAGD) of heavy oils. Like the '228 patent, Kuckes provides a solution in which the receiver and field generator are assumed to be coplanar, as described in column 9 of the Kuckes disclosure. Any deviation from this coplanar relationship is described as being so small as to be insignificant. That is, the Kuckes patent embodies the same limiting constraint that is embodied by the '228 patent by ignoring out-of-plane displacements.

U.S. Pat. Nos. 5,646,524 and 5,646,525 issued to Gilboa (hereinafter, the Gilboa patents) are directed to a targeting system for detecting the position and orientation of a helmet using a rotating magnetic field. Unfortunately, it appears that the techniques introduced by the Gilboa patents are limited at least with respect to their use of a plurality of detectors that are spaced apart from one another on the helmet in determining parameters associated with the helmet. Further difficulties are introduced based on assumptions that the rotating magnet is fixed to the airframe of an aircraft in a known orientation and position and that the helmet position is at least approximately known with respect to the airframe and, therefore, with respect to the rotating magnet. Such constraints may not be acceptable when the rotating magnet concept is applied in more general tracking and locating applications.

The present invention serves to resolve the foregoing limitations and constraints while providing still further advantages.

SUMMARY OF THE DISCLOSURE

In one aspect of the present invention, in a system including a boring tool that is movable underground using a drill string which extends from the boring tool to a drill rig that operates at the surface of the ground, a portable device is configured for rotating a single, static magnetic field about an axis in a way which produces a rotating magnetic dipole field and for movement in relation to the surface of the ground by an operator. At least initially, a known elevational relationship is established between the portable device and the boring tool. The rotating magnetic dipole field is at least periodically sensed, starting in the known elevational relationship, and a receiver is used that is provided as part of the boring tool to at least periodically produce a receiver output responsive to the rotating dipole field. A positional relationship between the boring tool and the portable device is monitored by using the receiver output to establish at least a depth of the boring tool such that changing the positional relationship, by moving the portable device nearer to the boring tool, causes an increase in accuracy determination of the depth, as determined using the receiver output.

In another aspect of the present invention, in a system including a boring tool for underground movement in a region, a portable device is configured for rotating a static magnetic field about an axis in a way which produces a rotating magnetic dipole field emanating into the region and for movement in relation to the boring tool by an operator at the surface of the ground. A total signal strength of the rotating magnetic dipole field is sensed, at least periodically, using a sensing arrangement that is provided as part of the boring tool, to produce a receiver output responsive to a positional relationship, characterized in three dimensions by a set of parameters, between the boring tool and the portable device. Information is transferred, relating to the receiver output, from the boring tool to the portable device based on the periodically sensed total signal strength. Based on the information, at least two possible values are determined for at least a particular one of the parameters which particular parameter is multi-valued when so determined. The portable device is then used to provide one or more indications that are intended to cause the operator to provide an influence on or to change the positional relationship based on the two possible values. The total signal strength of the rotating magnetic field is re-sensed, responsive to the influence, for use in establishing an actual value of the particular parameter as one of the two possible values.

In still another aspect of the present invention, in a system including a boring tool for underground movement in a region, a portable device is configured for rotating a single static magnetic field about an axis of rotation in a way which produces a rotating magnetic dipole field emanating into the region and for selective movement, in relation to the boring tool, by an operator at the surface of the ground. An initial position of the portable device is established that is in a known elevational relationship with the boring tool. With the portable device at the initial position, the rotating magnetic dipole field is sensed, using a receiving arrangement that is provided as part of the boring tool, to produce a receiver output. Information relating to the receiver output is transferred to an above ground location. Based on the transferred information, at least one point of an opposing pair of possible overhead points on opposite sides of the portable device and on the surface of the ground are indicated at the above ground location, where one of the possible overhead points is an actual overhead point that is directly above the boring tool. The portable device is moved toward the indicated one of the possible overhead points as at least a preliminary step in establishing a direction of movement toward the actual overhead point. Thereafter, the portable device is moved in the established direction of movement toward the actual overhead point, while at least periodically indicating an updated position of the actual overhead point in relation to the portable device using additional transferred information generated from the receiving arrangement in the boring tool.

In yet another aspect of the present invention, in a system including a receiver for underground movement in a region, a portable device is configured for rotating a single static magnetic field about an axis of rotation in a way which produces a rotating magnetic dipole field emanating into the region and for selective movement in relation to the receiver by an operator at the surface of the ground. An initial position of the portable device is established that is known to be one of vertically above or vertically below the boring tool. With the portable device above ground, a total magnetic flux responsive to the rotating magnetic dipole field at the receiver is at least periodically sensed such that the total magnetic flux is influenced by a change in a relative positional relationship between the receiver and the portable device, resulting from movement of at least one of the receiver and the portable device. Using the total magnetic flux, at least one characteristic relating to the total magnetic flux is at least periodically determined. The portable device is moved while monitoring the periodically determined characteristic in a way which, at least to an approximation, establishes a surface radial direction toward an overhead point, that is directly above the receiver, from the portable device.

In a continuing aspect of the present invention, in a system including a boring tool that is movable underground using a drill string which extends from the boring tool to a drill rig that operates at the surface of the ground, a portable device is configured for rotating a single static magnetic field about an axis in a way which produces a rotating magnetic dipole field and for movement in relation to the surface of the ground by an operator. Starting with the portable device in a known elevational relationship with the boring tool, a receiver, that is provided as part of the boring tool, is used to at least periodically sense the rotating magnetic dipole field, to produce a receiver output responsive to the rotating dipole field. A positional relationship between the receiver and the portable device is monitored by using the receiver output in cooperation with changing the positional relationship to establish an actual position of an overhead point that is directly above the receiver in a laterally spaced-apart relationship from the portable device in a current orientation.

In a further aspect of the present invention, in a system including a boring tool that is movable underground using a drill string which extends from the boring tool to a drill rig that operates at the surface of the ground, a transmitter is configured for above ground use and for rotating at least two static magnetic fields that are produced by a first magnet and a second magnet rotating about a first axis and a second, different axis, respectively, in a way which produces a first rotating magnetic dipole field and a second rotating magnetic dipole field such that the first and second rotating dipole fields are distinguishable, one from the other. A receiver, that is provided as part of the boring tool, is used to at least periodically sense the first and second rotating magnetic dipole fields, to produce a receiver output responsive thereto. A positional relationship between the transmitter and the boring tool is monitored by using at least the receiver output to establish an actual position of an overhead point that is directly above the receiver in a laterally spaced-apart relationship from the transmitter.

In an additional aspect of the present invention, in a system including a boring tool that is movable underground using a drill string which extends from the boring tool to a drill rig that operates at the surface of the ground, a transmitter is configured for above ground use and for rotating at least two static magnetic fields that are produced by a first magnet and a second magnet rotating about a first axis and a second, different axis, respectively, in a way which produces a first rotating magnetic dipole field and a second rotating magnetic dipole field such that the first and second rotating magnetic dipole fields are distinguishable, one from the other. A receiver, that is provided as part of the boring tool, is used to at least periodically sense the first and second rotating magnetic dipole fields, to produce a receiver output responsive thereto. A positional relationship between the transmitter and the boring tool is monitored by using at least the receiver output to establish an actual position of an overhead point that is directly above the receiver in a laterally spaced-apart relationship from the transmitter.

In another aspect of the present invention, in a system including a boring tool that is movable underground using a drill string which extends from the boring tool to a drill rig that operates at the surface of the ground, a transmitter, located aboveground, is configured for rotating at least two static magnetic fields that are produced by a first magnet and a second magnet rotating about a first axis and a second, different axis, respectively, in a way which produces a first rotating magnetic dipole field and a second rotating magnetic dipole field such that the first and second rotating dipole fields are distinguishable, one from the other. A receiver, that is provided as part of the boring tool, is used to at least periodically sense the first and second rotating magnetic dipole fields, to produce a first set of receiver outputs by measuring a first plurality of total flux intensities, in three dimensions, associated with the first rotating magnetic dipole as the first magnet rotates through a first plurality of rotation angles which occur over at least one-half of a revolution of the first magnet such that each one of the first plurality of total flux intensities corresponds one-for-one with each one of the first plurality of rotation angles and to produce a second set of receiver outputs by measuring a second plurality of total flux intensities, in three dimensions, associated with the second rotating magnetic dipole as the second magnet rotates through a second plurality of rotation angles which occur over at least one-half of a revolution of the second magnet such that each one of the second plurality of total flux intensities corresponds one-for-one with each one of the second plurality of rotation angles. A positional relationship between the boring tool and the transmitter is monitored at least by using the first set of receiver outputs and the second set of receiver outputs associated with the first plurality of rotation angles and the second plurality of rotation angles, respectively, to establish a position of the receiver in relation to a current position and orientation of the transmitter.

In still another aspect of the present invention, a calibration procedure includes positioning a transmitter, which is configured for rotating a magnet about an axis in a way which produces a rotating magnetic dipole field, in an at least temporarily fixed position and orientation. A receiver is arranged at a distance D from the transmitter at least approximately in a predetermined positional relationship with the transmitter. The receiver is used to periodically sense a set of total flux intensities in three dimensions, of the rotating magnetic dipole field, successively through a plurality of angularly distributed rotation angles of the magnet sufficient to characterize the total flux intensity with rotation of the rotating magnetic dipole field. Using the set of total flux intensities in conjunction with distance D, a dipole strength m of the rotating magnetic dipole field is determined.

In a further aspect of the present invention, in a system for use in locating a receiver at a receiving position that is underground within a region, at least a first, a second and a third transmitter are spaced apart in the region such that the transmitters produce first, second and third rotating dipole fields, respectively, each of which fields is distinguishable with respect to the others. A location of each of the transmitters is established. The first, second, and third rotating dipole fields are received at the receiving position to produce a first, a second and a third received signal. The first, second and third received signals are used to determine a first, a second and a third radial distance, respectively, from the receiving position to each of the transmitters. Using the first, second and third radial distances, in conjunction with the location of each transmitter, at least two potential locations of the receiving position are determined in relation to the transmitters.

In an additional aspect of the present invention, in a system including a boring tool that is movable underground using a drill string which extends from the boring tool to a drill rig that operates at the surface of the ground, a transmitting device is configured for producing at least one rotating dipole field which rotates about an axis in relation to the surface of the ground such that the transmitting device may emanate the rotating dipole field from a tilted orientation with respect to a vertical direction. The tilted orientation is measured using a tilt sensor forming part of the transmitting device to produce a tilt signal. The rotating magnetic dipole field is sensed at a receiving position to produce a set of flux measurements responsive to the rotating dipole field when the transmitting device is in the tilted orientation. Using the set of flux measurements, a position of the receiver relative to the transmitting device is determined in a tilted coordinate system that is defined by the tilted orientation of the transmitting device. The position of the receiver is determined in a level coordinate system in relation to the transmitting device based on the position of the receiver, as established in the tilted coordinate system, and the tilt signal.

In a continuing aspect of the present invention, a transmitting device is configured for emanating a locating signal such that the transmitting device may be in a tilted orientation with respect to a vertical direction and for measuring the tilted orientation to produce a tilt signal. The locating signal is sensed using a receiver that is underground at a receiving position to produce one or more flux measurements responsive to the locating signal when the transmitting device is in the tilted orientation. Using the flux measurements, the receiving position of the receiver is determined relative to the transmitting device in a tilted coordinate system that is defined by the tilted orientation of the transmitting device. Thereafter, the position of the receiver is established in a level coordinate system in relation to the transmitting device, based on the position of the receiver as defined in the tilted coordinate system in conjunction with the tilt signal.

BRIEF DESCRIPTION OF THE DRAWINGS

The present invention may be understood by reference to the following detailed description taken in conjunction with the drawings briefly described below.

FIG. 1 is a diagrammatic plan view of a magnet that is supported for rotation for use as a transmitter in accordance with the present invention.

FIG. 2a diagrammatically illustrates, in elevation, a rotating magnet having an at least generally vertically oriented axis of rotation.

FIG. 2b diagrammatically illustrates, in elevation, a rotating magnet having an at least generally horizontally oriented axis of rotation.

FIG. 2c diagrammatically illustrates, in elevation, a transmitter arrangement having both generally vertically oriented and generally horizontally oriented rotating magnets in a side-by-side configuration.

FIG. 2d diagrammatically illustrates, in elevation, a rotating magnet that is rotated about two obliquely oriented axes of rotation.

FIG. 6b is a diagrammatic view, in elevation, of the system of FIG. 6a.

DETAILED DESCRIPTION

Figure 2E:
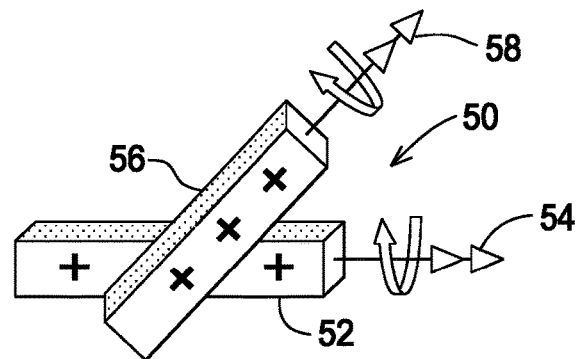
FIG. 2e diagrammatically illustrates, in elevation, a transmitter arrangement having a pair of rotating magnets in which the axes of rotation of the respective magnets are non-normal with respect to one another.

The following disclosure describes methods for tracking positions of people and objects with applications in the following areas:

Tracking of Personnel and Vehicles in Buildings

An important example of this kind resides in monitoring firefighters, police and medical aid personnel in buildings. A suitable tracking method should have sufficient range for accurate position monitoring across a large single story warehouse or diagonally across several floors of a multistory apartment or commercial building. Here, speed of equipment deployment is of utmost importance, leaving little time for calibration and other set-up tasks. Reliability is also an important design consideration.

Tracking positions of employees in large stores will improve customer service by more quickly dispatching needed personnel. For this application, ease of use and system reliability is more important than position accuracy and length of set-up time.

There is also much need to monitor positions of load carrying vehicles such as forklifts in warehouses or to track robots.

Tracking of Underground Boring or Surveying Tools

The installation of underground utilities using horizontal directional drilling requires accurate data for boring tool position and heading directions. In this application, any underground component of the tracking system should be small enough to fit into standard size drillheads and very durable to survive the harsh operating conditions. Tracking accuracy should be sufficient to avoid collision with underground utilities and to stay within assigned boundaries.

Surveying of existing underground pipes carrying freshwater or sewage is a related field of application.

Surveying Buildings and Outdoor Job Sites

Adopting described tracking methods to survey buildings can be a time saving tool for interior designers since required building dimensions can be automatically recorded and transferred to a computer aided design program. The same mapping techniques can also be utilized by city building departments to prepare fire departments and police for emergency situations.

Similarly, the topography of outdoor job sites can be efficiently mapped with one of the tracking methods described below without the need for a professional surveyor.

Special Tracking Tasks

A system for monitoring positions of scuba divers, especially in dangerous conditions such as diving under surface ice, will serve professional rescue and construction divers as well as recreational scuba divers.

The task of tracking children, club members and groups of travelers in crowded places like amusement parks and airports can be facilitated by a tracking system.

This disclosure includes a detailed description of two generally applicable embodiments of the invention. One embodiment is used for tracking personnel or movable equipment, for example, in buildings and the other embodiment is used for determining the position of an underground object such as, for example, a boring tool. These methods and associated apparatus are customized for their respective applications. As will be appreciated in view of the disclosure below, one of ordinary skill in the art will recognize many design options for the main system components that can be assembled in a variety of ways to modify the two basic embodiments and their associated methods for use in other applications.

Components of Tracking Systems

The tracking systems described in this disclosure employ four types of components called transmitter (synonyms include "beacon" and "sonde"), receiver, base-station and telemetry. Listed below are various component design options enabling the user to assemble tracking systems suitable for many different applications.

Transmitter

The function of the transmitter is to generate a three-dimensional rotating magnetic dipole field. Transmitter design and number of transmitters to be used depends on the intended application, tracking distance and required position accuracy. The designer can choose from a number of options to be described immediately hereinafter.

The dipole field can either be generated by a rotating magnet or by electromagnetic coils. Rare earth magnets are preferred over coils since, at low frequencies, they produce a stronger dipole field for the same input power. Suitable magnets for this application include Samarium Cobalt and Neodymium Iron Boron magnets that are usually produced in a sinter process.

Throughout this disclosure, the term magnet may be used instead of the more general term transmitter, but it should be emphasized that described applications of magnets carry over to coils and wire loops with only minor modifications.

Turning now to the figures in which like reference numbers are used to refer to like items whenever possible, it is noted that the figures are diagrammatic for purposes of enhancing the reader's understanding. Moreover, terminology such as vertical/horizontal, left/right and up/down is used for descriptive purposes only and is in no way intended as being limiting.

Referring to FIG. 1, a magnet 10 is diagrammatically illustrated for use in the transmitter of the present invention. Each magnet to be used in a transmitter is polarized, as shown, and rotates at a constant frequency (revolutions per second) about a longitudinal axis 12. Rotation frequencies from a fraction of 1 Hz to over 500 Hz (over 30,000 rpm) are feasible. At distances from the magnet that are larger than its largest dimension, the field approximates that of a three-dimensional rotating magnetic dipole. The dipole field includes an axis of symmetry 14 which is shown in a instantaneous position during rotation. A bearing 16 supports magnet 10 for such rotation. It is noted that, throughout the figures, the north pole of a magnet may be indicated using one or more plus (+) signs while the south pole of a magnet may be indicated by one or more minus (−) signs.

As will be further described, the type of motor controller used to actuate a motor that is used to rotate the magnet or magnets can vary depending on the application. There are several PID (Proportional Integral Derivative) type controllers that may be used, although most of the off-the-shelf PID controllers have many more features than are necessary to rotate a mass at a constant rate. One such PID is available from the Dr. Fritz Faulhaber GmbH, Germany, as part of a Sine Wave Commutated Servomotor with Integrated Motion Controller. In one actual implementation, a control system uses an encoder output of the motor to measure its rotation frequency. A suitable microprocessor then compares the rotation frequency to a crystal standard and makes appropriate corrections to the motor power. With respect to this microprocessor and all other programmable devices described in this disclosure, it is considered that one having ordinary skill in the art is readily capable of providing the required programming for these devices in view of this overall disclosure. By adjusting the frequency measuring rate and the motor power adjustment rate, the speed of the motor is kept within an acceptable range, despite differences in supply voltage, temperature and bearing changes. This type of controller is adequate for a system that uses only radial distance to calculate a position and can readily be implemented by one having ordinary skill in the art in view of this disclosure. If the phase of the transmitter (rotating magnet angle) is also used in the position calculations, then the rotation of the magnet should be even more precisely controlled. In particular, at lower rpm, the "compass effect" comes into play. As the motor rotates the magnet, the Earth's magnetic field will tend to increase the speed during half the revolution and decrease it during the other half. To overcome this, it is necessary to use a PID or other suitable controller with a motor of adequate torque to keep the rotation constant. Such an implementation can readily be constructed by one having ordinary skill in the art in view of this description, when coupled with literature accompanying readily available PID's.

In the instance of using two magnets in a single transmitter enclosure, each magnet may be rotated by an independent drive mechanism such as described immediately above. Alternatively, an appropriate gearbox can be used to drive the second magnet using drive power from the drive mechanism of the first magnet. In this way, the second magnet can readily be rotated at a different frequency than that at which the first magnet is rotated. It is considered that one having ordinary skill in the art is capable of implementing such magnet rotation arrangements in view of this overall disclosure.

Turning to FIGS. 2a-2e, one or more rotating magnets can be packaged in different ways or configurations, each designed for a specific application. For example, referring in particular to FIG. 2a, the task of tracking receivers in a level plane can be performed with two or more transmitter units where each transmitter unit houses a single magnet 10 rotating, as indicated by an arrow 18, about a predominantly vertical axis 20.

FIG. 2b comprises one example in which magnet 10 rotates about an at least generally horizontal axis 22. This embodiment is useful, for example, in tracking an inground receiver.

Referring to FIG. 2c, for the purpose of tracking receivers in three-dimensional space, a single transmitter unit, generally indicated by the reference number 30, may be used containing magnets 32 and 34 with a vertical axis 36 and a horizontal axis 38 of rotation, respectively. This latter transmitter configuration may feature vertical and horizontal magnets positioned adjacent to each other, as illustrated, for example in a horizontal plane or stacked vertically (not shown). A system designed for use in three dimensions (not shown) can also consist of two or more separate transmitter units with a combination of vertical and horizontal single magnets distributed among the separate transmitter units. Furthermore, a magnet rotation axis need not be limited to vertical or horizontal positions. For some applications, orienting the magnet at other angles might improve tracking accuracy or result in more compact transmitter designs.

Referring to FIG. 2d, a magnet 40 is shown undergoing simultaneous rotation about a first axis 42 and a second axis 44 such that the first and second axes are at least approximately orthogonal with one another. It is noted that rotation about each of these axes produces rotation of the dipole axis of the magnet. Bearings and motor control of a magnet can also be designed to spin the magnet about two axes at a different frequency for each axis. That is, magnet 40 can be made to spin at different frequencies about the first and second axes, for example, at 20 Hz about the first, longitudinal axis 42 and at 1 Hz about axis 44. Suitably chosen distinct rotation frequencies assure that the dipole axis sweeps a sufficiently large number of points of the three-dimensional space surrounding the magnet. There are a number of ways available in the prior art to accomplish such dual axis rotation, as will be further described. As one example that is described in further detail below, a magnet may be arranged for rotation by a motor about a first axis. This motor and magnet arrangement may then be positioned, for example, on a turntable for rotation about a second, turntable axis.

FIG. 2e illustrates a transmitter arrangement 50 having a first magnet 52 with a horizontal axis 54 of rotation and a second magnet 56 with an obliquely angled axis 58 of rotation. Such mutual orientations can be rotated to any overall desired position.

In a system including multiple transmitters, each magnet of each transmitter can be assigned a different rotation frequency so that the tracking system is able to distinguish between transmitters on the basis of frequency.

In many applications, the position of a moving receiver is tracked while the transmitter is stationary. However, other types of tracking methods are readily implemented in view of this disclosure wherein the transmitter is mobile and receivers are stationary or where transmitter and receivers are mobile. In this regard, the present application enables a high degree of flexibility in describing a portable walkover transmitter/locator for tracking a movable underground receiver house, for example, in a boring tool. Thus, both the walkover locator and the boring tool can influence the positional relationship therebetween.

A transmitter unit should be in a level position during tracking. Since leveling the unit manually could delay system deployment or for purposes of convenience, the transmitter unit can be equipped with a mechanism to physically self-align. Alternatively, the transmitter unit can be fitted with tilt sensors in order to provide compensation for magnet tilt.

Receiver

Receivers may either be stationary or attached to moving personnel, vehicles or inanimate objects whose positions are to be tracked. The principal function of the receiver is to measure the components of dipole flux from which the total flux magnitude is derived. In addition, the receiver can transfer data to and from other components of the tracking system and processes information. Design features include the following.

Receivers might either transmit raw flux data or receiver position coordinates to a base station. The computation of the coordinates can be performed by the digital electronics in the receiver in real-time before transmitting back to the base station, thus saving data bandwidth on a telemetry system.

The flux-sensing element of a receiver may be a set of tri-axial electromagnetic coils or a tri-axial magnetometer, e.g., of the fluxgate type, a giant magnetoresistive sensor (GMR) or any other suitable type sensor, either currently available or yet to be developed. The choice of sensing element depends on many factors including required accuracy, signal frequency, size, weight and cost. For example, in a boring tool implementation, it may be desirable to use a tri-axial magnetometer rather than a coil arrangement since the latter generally requires more space, which could adversely necessitate an increase in the diameter of the boring tool. In an instance in which enhanced accuracy is of concern, as opposed to available space, a larger coil arrangement can be used. If sensor size and cost are overriding design considerations, the receiver will most likely feature GMR's since their high sensitivity results in the smallest sensor size for a given receiver application and they can be manufactured inexpensively.

When using magnetometers for mobile receivers, the vector sum of the Earth's magnetic DC field can be monitored. Strong local variations will warn the system operator of nearby ferromagnetic material, such as steel, possibly resulting in erroneous receiver position determinations.

Stationary receivers fall into two categories: Receivers used for tracking a transmitter attached to a moving object and receivers used for determining position and dipole strength of stationary transmitters. The latter are used in a calibration process to be described below.

In those cases where magnet dipole strength is not available from a previous calibration in a personnel tracking implementation, three receivers may be used to calibrate a system for tracking in a level plane. This will facilitate rapid deployment and eliminate any time consuming manual system calibration. A system equipped with three such calibration sensors/receivers can also be used to indicate the expected placement error of rotating magnets. The mathematical calibration technique is given below, followed by a discussion of how to obtain magnet placement errors.

Each receiver must be uniquely characterized, for example, by a unique alphanumeric identification code, if more than one moving and/or stationary receiver is in use.

Base-Station

The function of a base-station is generally to process and display receiver and transmitter positions for monitoring by the system operator. Other types of data such as floor maps of buildings or the topography of an outdoor job site where objects are being tracked may also be displayed to facilitate monitoring. In addition, the base-station includes the capability of communicating with other system components. In some implementations, as will be self evident in view of the particular implementation that is being described, a base-station is not required.

Telemetry

Telemetry enables data transmission from the receivers to the base station and from transmitter units to receiver and/or base-station. Of course, if a base station is not required, communication between the receiver and transmitter is useful, for example, where the transmitter is a portable walkover locator for use in identifying the position of a boring tool. The combined use of telemetry and rotating magnets is heretofore unseen by Applicants and is considered to be a highly advantageous feature of the tracking systems and methods described herein. In this regard, it is important to understand that a static magnetic field is being rotated. This static magnetic field cannot be modulated with data of interest in the way that an electromagnetic field can be modulated.

There are many small size and low-power communication transceivers that will meet this application requirement. In view of this overall disclosure, those having ordinary skill in the telecommunications arts are considered as capable of designing and/or selecting from many off-the-shelf telecommunication sub-systems that are suitable for this application.

To ensure the integrity of the data being transmitted to the base station and generally between system components, many industry standard wireless network protocols with forward error-correction coding (FEC) can be used. The forward error-correction coding is a type of digital signal processing that improves data reliability by introducing a known structure into a data sequence prior to transmission. This structure enables a receiving system to detect and possibly correct errors caused by corruption from the channel and the receiver. This coding technique enables the decoder to correct errors without requesting retransmission of the original information. Furthermore, each receiver can have a dynamically assigned identification from the base station and this identification is used to identify the unique receiver during its operation. This unique identification is included in the data structure for the communication protocol.

During normal operation, the base station displays the locations of each of the active receivers, based on the reported coordinates and identifications from the receivers.

A Method and System for Tracking Personnel in a Building

Overview of System

This embodiment of the invention is suited for monitoring a group of firefighters and/or other rescue personnel located on the same floor of a building. Occasionally, the method will therefore be referred to as a personnel tracker. If needed, its application can be repeated for every floor of a multistory building. Of course, this embodiment is readily adaptable to tracking store personnel, people in general and inanimate movable objects such as, for example, robots.

Figure 3:
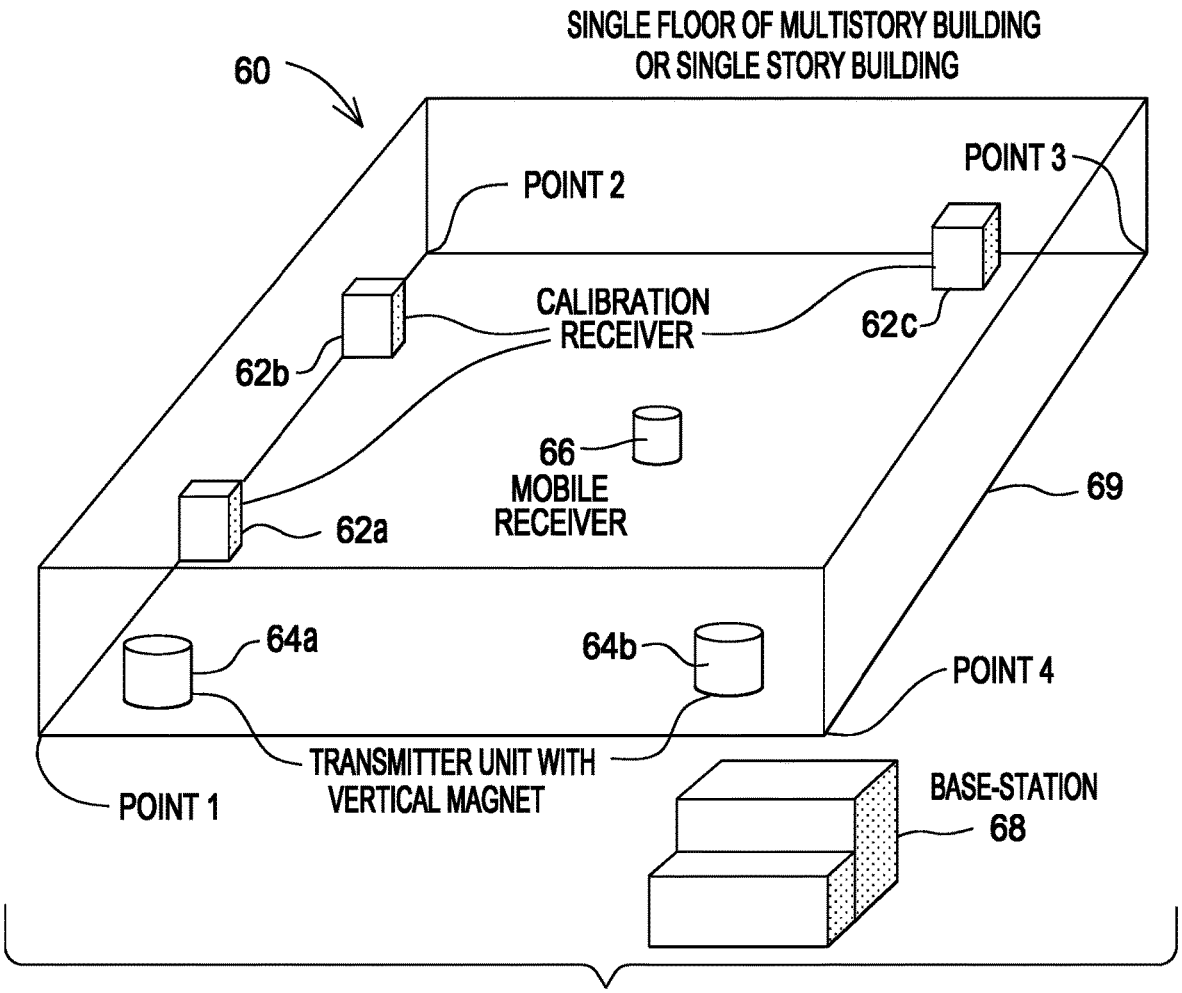
FIG. 3 is a diagrammatic, perspective view of a personnel tracking system implemented on one floor of a building in accordance with the present invention.

Referring to FIG. 3, a tracking system, produced in accordance with the present invention, is generally indicated by the reference number 60. Tracking system 60 and its method employs three stationary calibration receivers 62a-c, two transmitter units 64a-b, each containing a single magnet rotating about a vertical axis, an unlimited number of mobile personnel receivers 66 (only one of which is shown) and a base-station 68. The transmitter and receiver are positioned, for example, on a floor 69 of a building while the base station is located at a safe position with respect to the building. Stationary receivers 62a-c should be permanently installed and their position coordinates recorded before the use of the system becomes necessary in an emergency situation. The function of the three stationary calibration receivers is to rapidly calibrate transmitters to obtain their position coordinates and dipole strength. While the system is illustrated as being implemented on a rectangular-shaped floor space with points 1-4 at its corners, it is to be understood that this is not a requirement and that the system may be implemented using any shape of floor space. There is no requirement that the calibration receivers be stationed about the periphery of the tracking space, but rather they should be sufficiently spaced apart and should not be arranged linearly. That is, in the present example, a triangular shape of sufficient dimensions is defined by the three calibration receiver positions in relation to the size of the tracking area.

Nomenclature for Personnel Tracker

Figure 4:
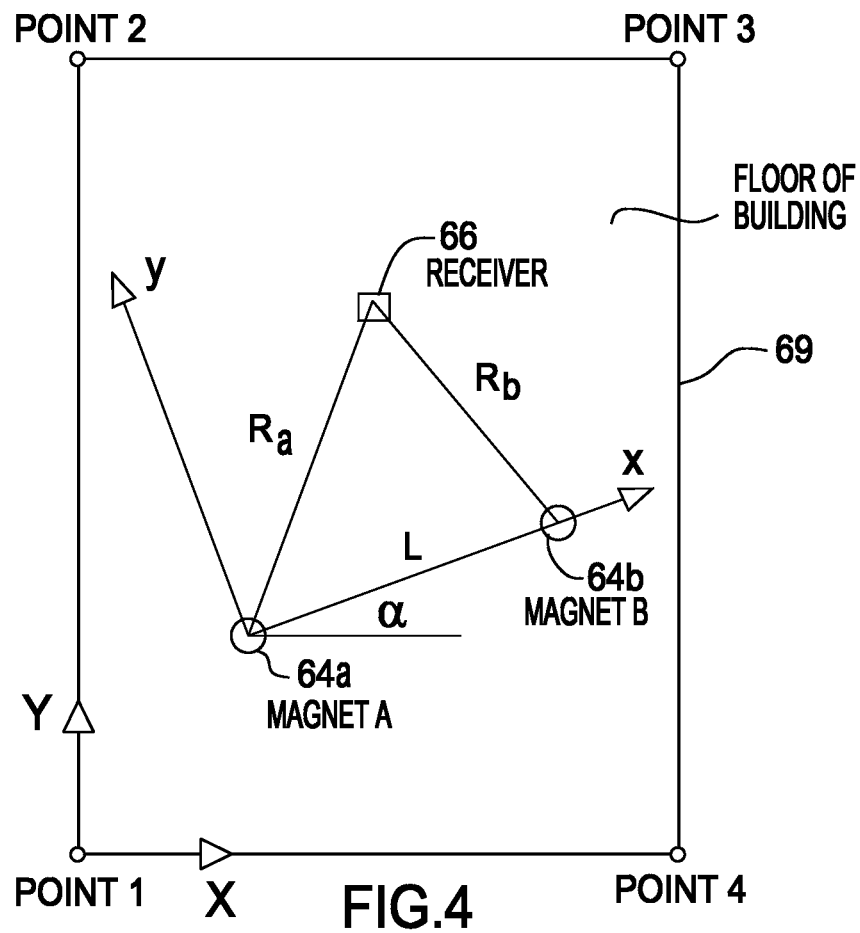
FIG. 4 is a diagrammatic, plan view of one floor of a building in which a personnel tracking system is implemented in accordance with present invention.

With reference to FIG. 4 in conjunction with FIG. 3, nomenclature used in describing the positional relationships of the system components will now be described. In order to further the reader's understanding, transmitters 64a and 64b, also labeled "magnet a" and "magnet b", respectively, are shown in different positions in FIG. 4. It should be appreciated that this nomenclature can be modified in many ways while continuing to embrace the spirit of the invention.

α=angle defined as shown in FIG. 4
B=magnitude of total flux at one point
$B_1$, $B_2$, $B_3$=measured orthogonal components of receiver flux at one point
L=distance between magnets a & b
m=magnet dipole strength of an individual magnet
R=distance from center of each magnet to receiver
X, Y=global two-dimensional coordinate system in a level plane
x, y=local two-dimensional coordinates with origin at magnet "a"
Subscripts
a=magnet "a"
b=magnet "b"
max=maximum flux measured by receiver
r=receiver position

Measured Data

The three orthogonal components of flux $B_1$, $B_2$, $B_3$ induced at receiver 66 by magnet "a" or "b" are measured in any convenient orthogonal coordinate system incrementally over at least one half of a magnet revolution, so as to create a measured set of fluxes at each rotation angle. The total flux is obtained from:

$$B = \sqrt{B_1^2 + B_2^2 + B_3^2} \quad (1)$$

The maximum value of flux $B_{max}$ can be extracted from the measured set of fluxes using standard numerical techniques. Additional details with regard to the rotation angle are given below in conjunction with discussions relating to the boring tool implementation of the present invention. It is understood, however, that these discussions are equally applicable with respect to the personnel tracker implementation presently under discussion.

Knowing maximum flux, the radial distance from either magnet "a" or "b" to the receiver can be calculated using the magnetic dipole equation.

$$R = \left(\frac{2m}{B_{max}}\right)^{1/3} \quad (2)$$

Here, m denotes dipole strength known from prior magnet calibration.

Receiver Position

FIG. 4 defines the positional relationship between movable receiver 66, magnet a and magnet b. These magnets or transmitters are assumed to be stationary for purposes of the present example. It is to be understood that the specific positional relationship shown in the figure is not intended as being limiting but is used only for purpose of providing an understanding of the defined terminology and that the illustrated relationship represents one of an unlimited number of possible variations, all of which variations can be characterized using the defined terminology. Since magnet position coordinates $(X_a, Y_a), (X_b, X_b)$ are known from transmitter calibration, receiver position coordinates $(x_r, y_r)$ in a local system can be calculated using the following triangulation.

$$L^2 = (X_b - X_a)^2 + (Y_b - Y_a)^2 \quad (3)$$

$$x_r = \frac{L^2 + R_a^2 - R_b^2}{2L} \quad (4)$$

$$y_r = \pm\sqrt{R_a^2 - x_r^2} \quad (5)$$

Note that the above equations contain two possible solutions for the receiver position, from which the correct one can be chosen based on known magnet positions. For example, placing (not shown) magnet "a" in the corner of point 4 and magnet "b" in the corner of point 3, respectively, of the rectangular floor shown in FIG. 4 assures $y_r > 0$. It is for purposes of removing this ambiguity that the transmitters/magnets of FIG. 3 have been positioned at least approximately in corners.

These receiver coordinates can be transformed to global coordinates using $$\tan\alpha = \frac{Y_b - Y_a}{X_b - X_a} \quad (6)$$

$$\begin{Bmatrix} X_r \\ Y_r \end{Bmatrix} = \begin{Bmatrix} X_a \\ Y_a \end{Bmatrix} + \begin{bmatrix} \cos\alpha & -\sin\alpha \\ \sin\alpha & \cos\alpha \end{bmatrix} \begin{Bmatrix} x_r \\ y_r \end{Bmatrix} \quad (7)$$

Transmitter Calibration

Transmitter calibration must be performed during deployment of the system, but can also be applied repeatedly during tracking. The calibration method assumes that position coordinates of the three stationary receivers (62a-c) are known, given as $(X_r)_i$, $(Y_r)_i$, where (i=1,2,3). In addition, magnet and stationary receivers should be at about the same height above the floor.

Figure 5:
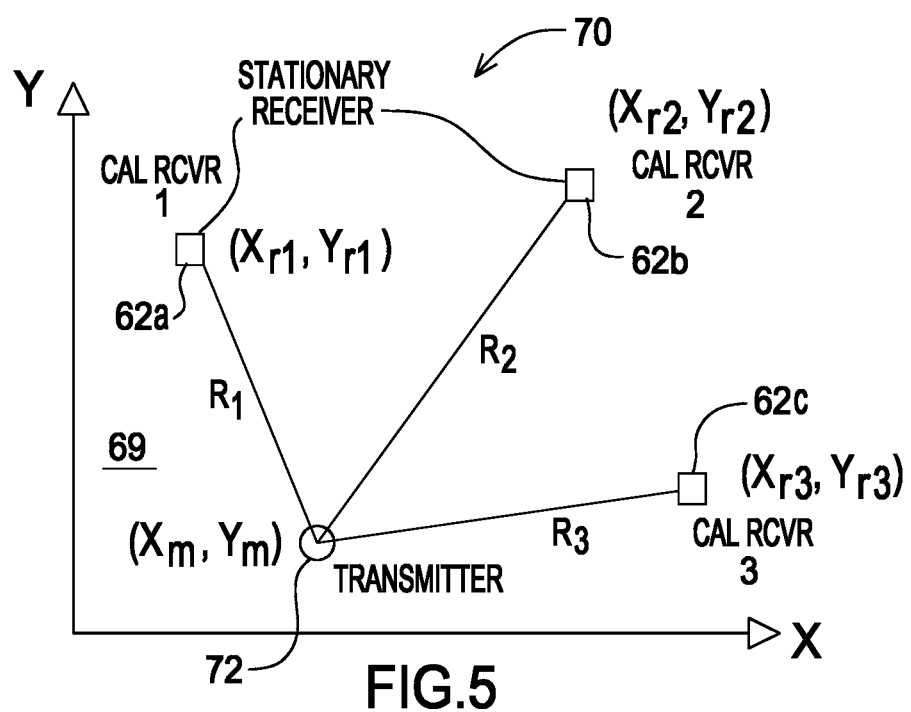
FIG. 5 is a diagrammatic, plan view of one floor of a building, shown here to illustrate calibration nomenclature.

Referring to FIG. 5, a geometric relationship is illustrated, generally indicated by the reference number 70, between calibration receivers 62a-c and one transmitter 72 which can represent any transmitter that is used in the system. The calibration receivers are additionally designated in the figure as "CAL RCVR 1" through "CAL RCVR 3". Having recorded the maximum fluxes induced by each magnet at the three receivers, termed $B_{max1}$, $B_{max2}$, $B_{max3}$, magnet position coordinates are given by the following quadratic equations derived from dipole equation (2) and the geometric relations illustrated in FIG. 5.

$$\left(\frac{B_{max2}}{B_{max1}}\right)^{2/3} = \frac{(X_{r1} - X_m)^2 + (Y_{r1} - Y_m)^2}{(X_{r2} - X_m)^2 + (Y_{r2} - Y_m)^2} \quad (8)$$

$$\left(\frac{B_{max3}}{B_{max1}}\right)^{2/3} = \frac{(X_{r1} - X_m)^2 + (Y_{r1} - Y_m)^2}{(X_{r3} - X_m)^2 + (Y_{r3} - Y_m)^2} \quad (9)$$

Equations (8) and (9) implicitly relate magnet position to calibration receiver coordinates. They can be used in a standard error analysis to find expected errors of magnet position as functions of known receiver position uncertainties.

Dipole strength of the rotating magnet is given by $$R_1^2 = (X_{r1} - X_m)^2 + (Y_{r1} - Y_m)^2 \quad (10)$$

$$m = 0.5 B_{max1} R_1^3 \quad (11)$$

The number of stationary receivers can be reduced to two and the calibration analysis can be simplified if dipole strength is determined independently prior to using the tracking system. In this separate determination of dipole strength, the receiver is placed a known distance $R_1$ away from the magnet and the above equation for m is employed with measured $B_{max1}$.

Magnet position coordinates are obtained by calculating radial distances from the magnet to the receivers using equation (2) and $$R_1^2 = (X_{r1} - X_m)^2 + (Y_{r1} - Y_m)^2 \quad (12)$$

$$R_2^2 = (X_{r2} - X_m)^2 + (Y_{r2} - Y_m)^2 \quad (13)$$

A Method for Tracking Underground Boring Tools

Figure 6A:
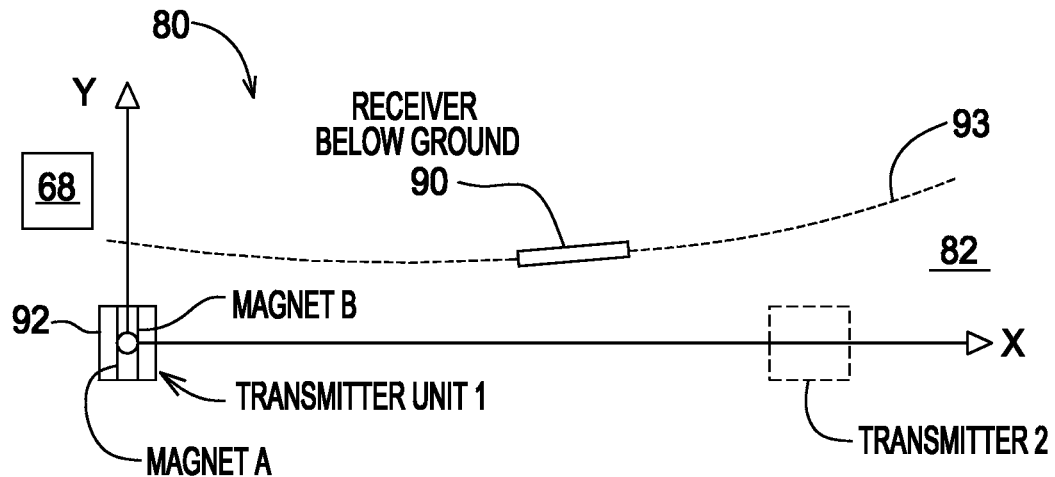
FIG. 6a is a diagrammatic, plan view of a region in which a system for tracking an inground device such as, for example, a boring tool is implemented using at least one transmitter having at least one rotating magnet.
Figure 6B:
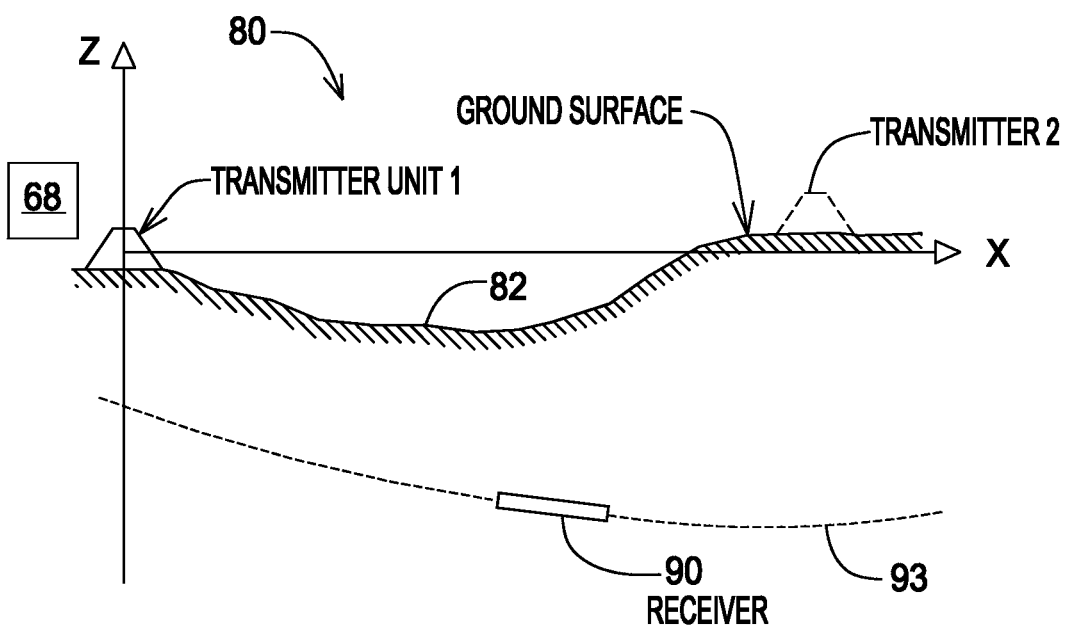

Referring to FIGS. 6a and 6b, a boring tool tracking system is generally indicated by the reference number 80. FIG. 6a illustrates a plan view of the system, while FIG. 6b illustrates an elevational view of the system. System 80 consists of one or more transmitter units above a surface 82 of the ground, one of which transmitters is shown at drill begin (transmitter 1) and one of which is shown in phantom along the drill path (transmitter 2), a receiver 90 installed in the underground boring tool and base-station 68 for data communication, processing and display. As seen in the plan view of FIG. 6a, for transmitter 1, each transmitter unit houses two magnets termed magnets "a" and "b". Here, the primary magnet "a" rotates about a horizontal axis and, hence, may be referred to as a horizontal magnet whereas magnet "b" features a vertical rotation axis and, hence, may be referred to as a vertical magnet. A heavy box 92 around the magnets of transmitter 1 in FIG. 6a indicates that the magnets are installed in the same unit together with a power supply, telemetry components, a display, keypad, CPU and motor controller. As mentioned, one transmitter unit is placed near the point of drill begin where the drill head enters the ground, others are positioned strategically along the intended drill path such that at least one transmitter unit is always in range of the receiver. Alternatively, the user could rely on a single transmitter unit that is repositioned during drilling. A convenient method for repositioning transmitter units is outlined below. Each transmitter unit can be equipped with tilt sensors to avoid manual leveling. A drill path 93 is indicated as a dashed line.

Figure 7A:
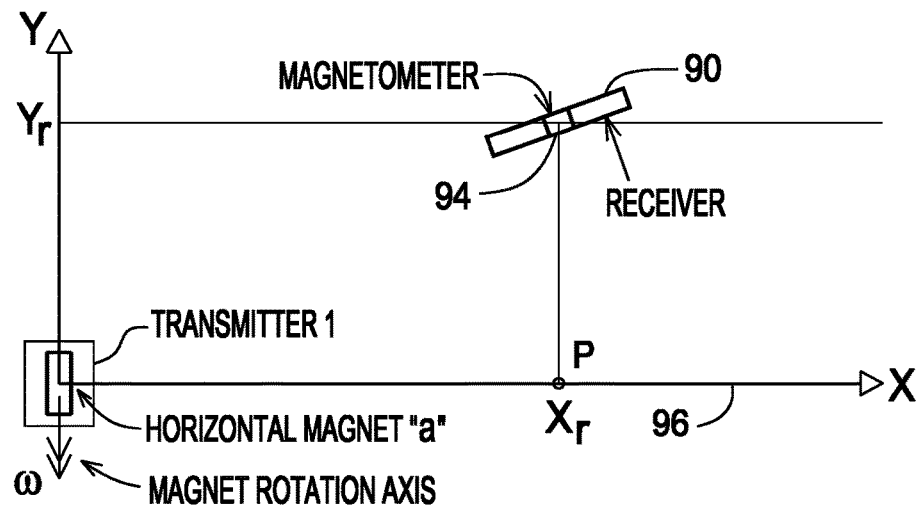
FIG. 7a is a diagrammatic, plan view illustrating the transmitter and receiver of FIGS. 6a and 6b, shown here to illustrate further details with respect to the relationship between these components.
Figure 7B:
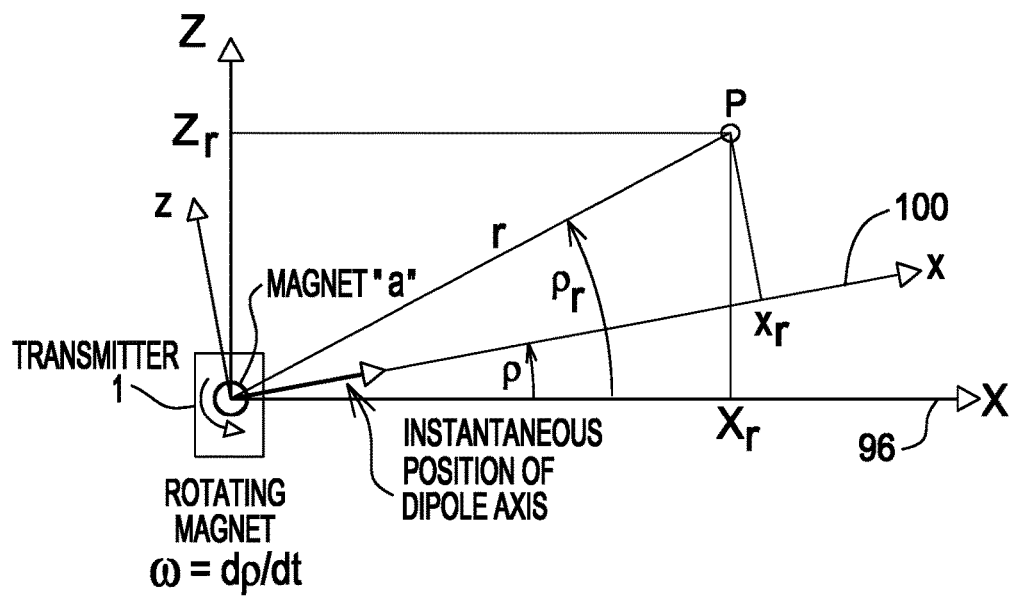
FIG. 7b is a diagrammatic view, in elevation, illustrating the transmitter and receiver of FIG. 7a, shown here to illustrate still further details with respect to the relationship between these components, as well as descriptive nomenclature.

Referring to FIGS. 7a and 7b, the former illustrates a plan view of system 80 while the latter illustrates an elevational view of system 80 for purposes of illustrating details with respect to the positional relationship between magnet "a" in transmitter 1 and receiver 90. The surface of the ground has not been shown since the relationship between the transmitter and receiver is of specific interest. A magnetometer 94 is shown as part of receiver 90. Transmitter 1 is placed on the ground, in the defined coordinate system, by orienting the axis of rotation of the horizontal magnet in a direction normal to a chosen initial drilling direction 96. That is, this positioning defines a global X axis. Stated in a slightly different way, the axis of rotation of magnet "a" is along a horizontal, global Y axis. It is to be understood, however, that alternative coordinate system arrangements may readily be used which relate to the described coordinate system through translation and/or rotation. The axis of rotation of magnet "b" is arranged along a global Z axis, as shown in the elevational view of FIG. 6b normal to the plane of the figure. In this regard, magnets "a" and "b" may be arranged in a manner that is consistent with FIG. 2c. It is noted that the spacing between the magnets results in insignificant error so long as motor drive and controller are able to overcome magnetic interactions and maintain a sufficiently uniform magnet rotation. Any other suitable arrangement may be employed such as, for example, one where the horizontal magnet is placed below the vertical magnet.

Receiver 90, installed in an underground boring tool (see, for an example of such an installation, FIG. 15, described below), features a cluster of three orthogonally arranged magnetometers to measure magnetic fluxes emitted by transmitter 1 or 2 in three-dimensional space. For some applications, coils could be used instead of magnetometers. Tri-axial accelerometers (not shown) or other suitable sensors are utilized for measuring boring tool pitch and roll angles in a manner that is known in the art. Furthermore, the system features base-station 68 for data communication, processing and display. Telemetry is thought to be convenient as a method for data transfer, but it is to be understood that data can readily be transmitted by wire up a drill string to which the boring tool is connected, using an electromagnetic signal that is emanated directly from the boring tool or in some combination with wireless transmission.

Each magnet should be arranged, for example, with a sensor at least to indicate the time at which its dipole axis points in a known direction and should include a suitable arrangement for communicating this to receiver 90 such as, for example, via telemetry.

Nomenclature for Tracking Underground Boring Tools

Referring to FIGS. 7a and 7b, the nomenclature that is used as a framework for describing the positional relationship between each transmitter and the receiver will now be described. It is again noted that the terminology that is used is not intended as being limiting and may be modified in any suitable way.

Figure 7C:
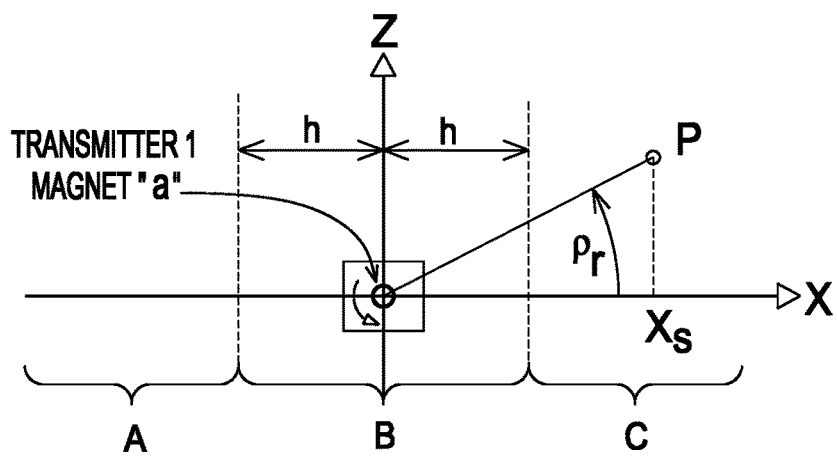
FIG. 7c is a diagrammatic view, in elevation, illustrating the transmitter and receiver of FIG. 7a, within the framework of an empirical tracking technique employing three regions that are arranged around the transmitter.

B=magnitude of total flux
b=total flux for unit dipole strength
D=calibration distance
f=flux curvefit function
h=horizontal distance between magnets "a" and "b"
m=dipole strength
N=number of data sets (pointing angle, flux magnitude)
P=projection of receiver position onto X, Z-plane
R=distance from center of magnet to receiver
r=distance from magnet to point P projected on X, Z-plane
t=time
X,Y,Z=global coordinate system, origin at center of magnet "a"
x,y,z=rotating dipole coordinates, x-axis along dipole axis
ρ=rotation angle
w=magnet rotation frequency
Subscripts
a=magnet "a"
b=magnet "b"
g=ground surface
r=receiver position As shown in FIGS. 7a through 7c, the global X,Y,Z coordinate system is defined by the placement of the rotating magnet unit (transmitter 1) on the ground, as described above, wherein magnet "a" is specifically shown in these figures. The X,Y-axes are level and Z is upward (i.e., normal to the plane of the figure). The origin of the global coordinate system can be shifted to any other convenient location on the ground surface but the coordinates of this new origin must be recorded prior to tracking.

Referring to FIG. 7b, for each magnet, a rotating x,y,z-coordinate system is defined as shown, by the instantaneous position of a dipole axis 100 for that magnet. Note that the x-axis of the system points in the direction of the rotating dipole axis of the horizontal magnet at all times whereas the y-axis (normal to the plane of the figure) is parallel to the axis of magnet rotation of the horizontal magnet. The angle of magnet rotation ρ is the angle between the x-axis of this rotating system and the global X-axis. When the dipole axis points at point P in the X, Z-plane the rotation angle has the value $\rho_r$. It is noted that point P is the projection of the position of receiver 90 (also see FIG. 7a) onto the X, Z-plane.

Measured Data

Receiver flux components, defined along three orthogonal axes, are measured at N rotation angles over at least one half of a magnet revolution. Note that the purpose of measuring flux components is to obtain the magnitude of the total flux at the location of the receiver based on equation (1). It is assumed that the dipole strength m of each rotating magnet is determined by calibration as outlined below. Hence, the total flux for unit dipole strength becomes $$b = \frac{B}{m} \quad (14)$$

Rotation angles $\rho_i$ (i=1, 2, . . . N) of the rotating dipole axis are derived from measurements of rotation frequency ω, time $t_0$ at which the dipole axis is horizontal (ρ=0) or at some other known rotation angle and the time t at which the dipole pointing direction is to be calculated using $$\rho = \omega(t - t_0) \quad (15)$$

In order to determine the position of receiver 90 with respect to the rotating magnet (RM) "a", information regarding the rotational position (phase signal) of the RM is used. The phase or instantaneous magnet position signal can be determined, for example, using a magnetic sensor close to the RM or an encoder connected to the shaft of the RM. The phase signal is transmitted to receiver 90 via a telemetry link between the RM and receiver being used in an above ground application. For use in underground guidance applications, the telemetry signal can be converted to a suitable form and sent through the drill string to and/or from the receiver in the drillhead. Phase signal data and measured fluxes can be used at receiver 90, at a base station or remote, at an above ground handheld receiver or even at the RM unit. The system designer can choose a location that results in the most efficient and economical form of data transfer and processing. If the rotational frequency is suitably high, the power driving the receiver can be AC phase locked to the RM. If the rotational frequency is too low, the phase signal can be modulated onto the power line feeding the receiver.

Flux Equation

The tracking method is based on the following flux equation derived from the well-known magnetic dipole equations.

$$b^2 = \frac{3r^2}{R^8}\cos^2(\rho_r - \rho) + \frac{1}{R^6} \quad (16)$$

Here, $b^2$ is the square of the flux magnitude for unit dipole strength. The symbol R denotes the radial distance from the center of the magnet to the receiver defined by $$R^2 = X_r^2 + Y_r^2 + Z_r^2 \quad (17)$$

The quantity r is the distance from the magnet to point P in the X, Z-plane $$r^2 = X_r^2 + Z_r^2 \quad (18)$$

FIGS. 8a-d comprise examples of how flux changes with rotation angle for typical tracking scenarios and magnet calibrations. The horizontal axes of all four of these figures show rotation angles in degrees, while the vertical axes are representative of flux intensity.

Figure 8A:
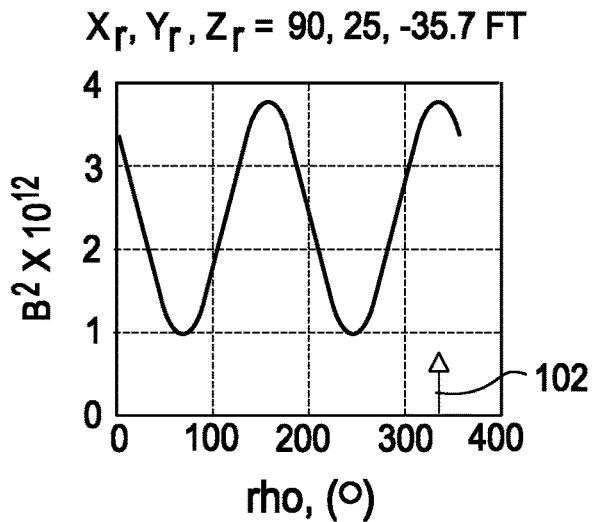
FIGS. 8a-d are plots of magnetic field intensity versus magnet rotation angle showing how flux changes with rotation angle for typical tracking scenarios and magnet calibrations.

FIG. 8a is a first example of exact total flux induced by a rotating dipole with a typical tracking position wherein R=100 ft and r=93.4 ft. ($X_r$, $Y_r$, $Z_r$=90, 25, −35.7 ft). The vertical axis shows $10^{12}$ times the square of flux for unit dipole strength. This value (indicated as $B^2 \times 10^{12}$) is plotted against rotation angle ρ, as given in equation 10. An arrow 102 is used to indicate rotation angle $\rho_r$.

Figure 8B:
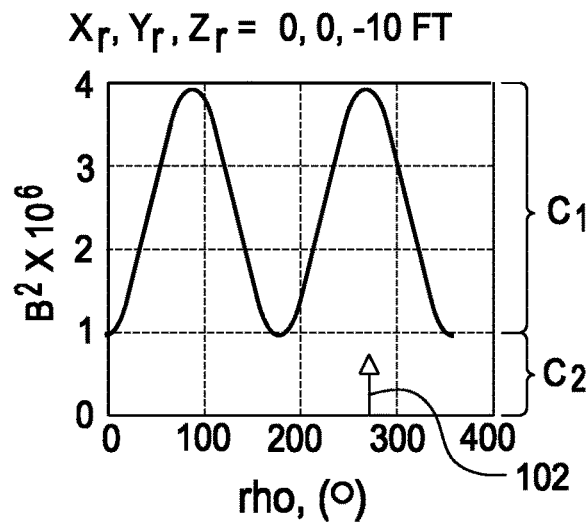

FIG. 8b is a second example of total flux induced by a rotating dipole directly overhead of the receiver wherein depth=10 ft, R=10 ft, and r=10 ft. ($X_r$, $Y_r$, $Z_r$=0, 0, −10). The vertical axis shows $10^6$ times the square of flux for unit dipole strength. This value (indicated as $B^2 \times 10^6$) is plotted against rotation angle ρ, as given in equation 10. Arrow 102 is again used to indicate rotation angle $\rho_r$.

Figure 8C:
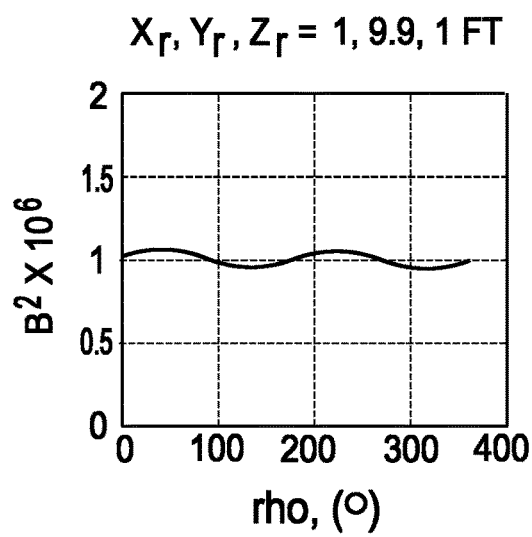

FIG. 8c is a third example of total flux induced by a rotating dipole showing magnet calibration with inaccurate placement of the receiver. ($X_r$, $Y_r$, $Z_r$=1, 9.9, 1). The vertical axis shows $10^6$ times the square of flux for unit dipole strength. This value (indicated as $B^2 \times 10^6$) is plotted against rotation angle ρ.

Figure 8D:
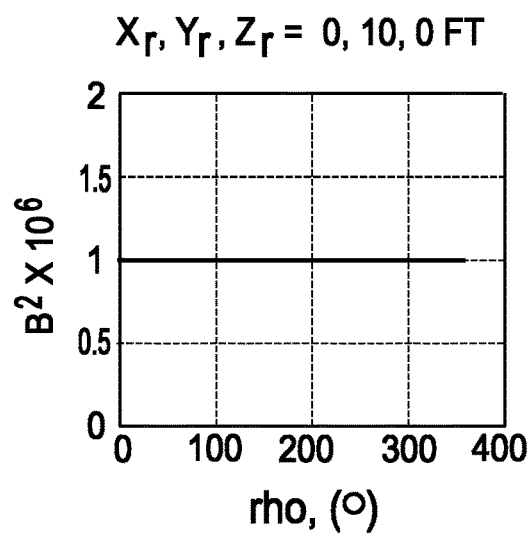

FIG. 8d is a fourth example of total flux induced by a rotating dipole, illustrating magnet calibration with an accurate placement of the receiver wherein D=10 ft. $(X_r, Y_r, Z_r)=(0,10,0)$. The vertical axis shows $10^6$ times the square of flux for unit dipole strength. This value (indicated as $B^2 \times 10^6$) is plotted against rotation angle $\rho$.

Receiver Position Coordinates

Figure 9A:
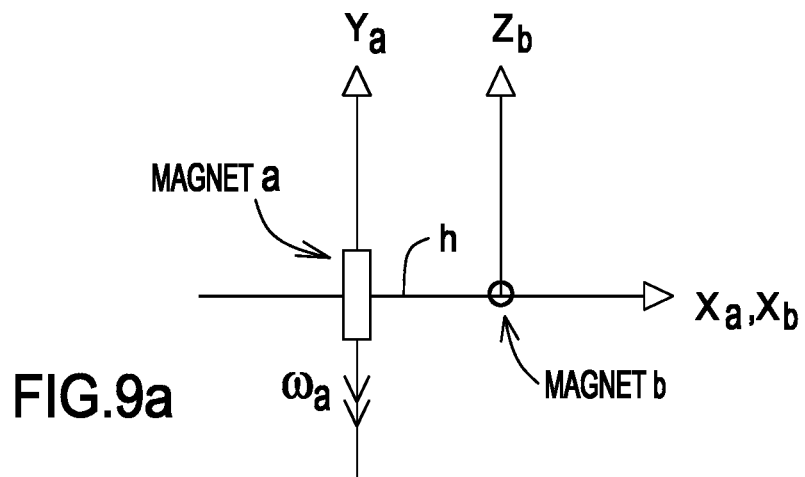
FIG. 9a is a diagrammatic plan view of the rotating magnets of the transmitter shown in FIGS. 6a and 6b, shown again here for purposes of characterizing the relationship between these two rotating magnets.
Figure 9B:
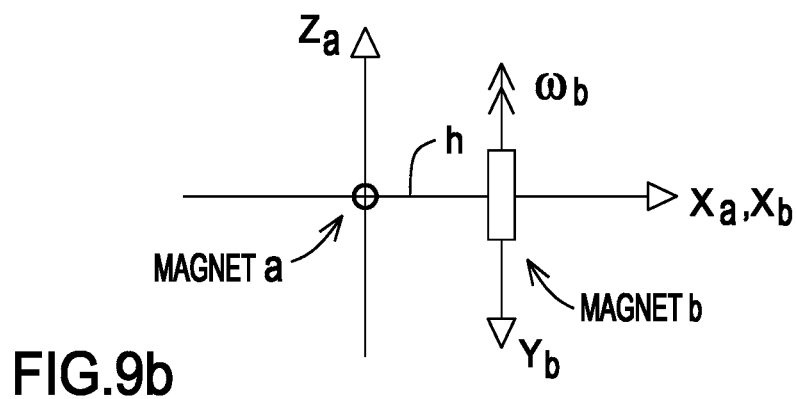
FIG. 9b is a diagrammatic view, in elevation, showing the rotating magnets of FIG. 9a in order to illustrate further details in characterizing the relationship between these two rotating magnets.
Figure 9C:
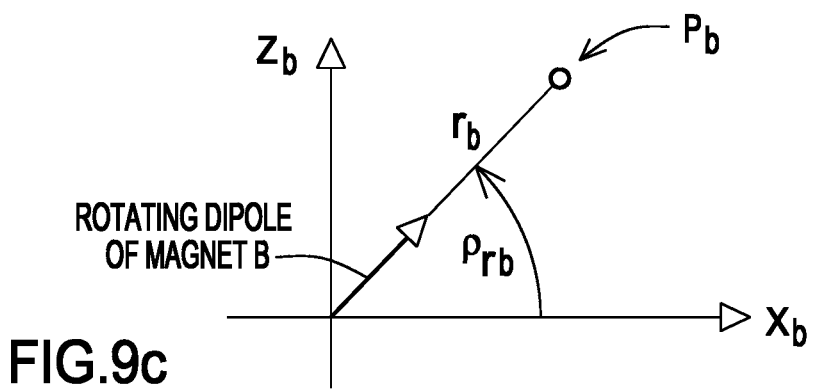
FIG. 9c is a diagrammatic view, in elevation, showing nomenclature used in determination of a rotation angle for the second one of the magnets used in the magnet pair of FIGS. 9a and 9b.

Turning to FIGS. 9a-c, magnet "a" and magnet "b" are diagrammatically illustrated in relation to the global or overall coordinate system. In this regard, the above equations are now applied to analyze fluxes induced by magnets "a" and "b" to obtain the receiver position in global coordinates. Notice that magnet "a" coordinates $X_a, Y_a, Z_a$ are identical with global X,Y,Z-coordinates but magnet "b" coordinates are defined differently, as seen below. The analysis begins by processing magnet "a" fluxes.

Equation (16) suggests the following curvefit of the measured fluxes $$f = c_1 \cos^2(c_3 - \rho) + c_2 \quad (19)$$

Comparing flux equation (16) and curvefit (19) yields the following formulas for the radii R,r.

$$R^2 = \left(\frac{1}{c_2}\right)^{1/3} \quad (20)$$

$$r^2 = \frac{c_1 R^8}{3} \quad (21)$$

In order to calculate rotation angle $\rho_r$ from coefficient $c_3$, it is noted that two possible values of this coefficient exist: $c_3$ and $c_3 + \pi$. Therefore, two solutions for angle $\rho_r$ (see FIG. 7b) are given as:

$$\rho_r = c_3 \quad (22)$$

$$\rho_r = c_3 + \pi \quad (23)$$

The correct value can be determined, for example, by employing an empirical technique which is similar to the one disclosed in U.S. Pat. No. 6,727,704, entitled BORING TOOL TRACKING/GUIDING SYSTEM AND METHOD WITH UNCONSTRAINED TARGET LOCATION GEOMETRY (hereinafter the '704 patent) which is commonly owned with the present invention and incorporated herein by reference. It is most often the case that the drillpath is below the elevation of the magnet with a generally level ground surface. In this case, the value of $\rho_r$ is selected to place the receiver relatively lower than the rotating magnets. FIG. 7c repeats the framework shown in FIG. 6 of the '704 patent which illustrates magnet "a" and receiver P in an elevational view. For purposes of the present, simplified discussion, the ground around magnet "a" is divided into three regions that are designated as A, B and C. The X, Z-coordinate system includes the rotating magnet at its origin. In most drilling scenarios, the receiver within the boring tool travels below the magnet(s) along a path nearly parallel to the X-axis. The half-width h of region B is chosen such that it is much larger than the distance traveled by the underground receiver between two consecutive positions at which data are recorded. For many applications, a value for h of 15 feet is an appropriate choice. Magnet position and region B must be chosen such that, in this region, the drillpath is either entirely below or above the magnet. The user notifies the tracking system whether the drillpath is above or below the magnet in region B. Table 1 defines regions A, B, C in terms of the receiver P position X-coordinate, denoted by the symbol $X_r$.

TABLE 1

| Region | $X_r$ - coordinate |
|---|---|
| A | $-\infty < X_r < -h$ |
| B | $-h \leq X_r \leq h$ |
| C | $h < X_r < \infty$ |

In each region of regions A-C, rotation angle $\rho_r$ is uniquely defined by limiting the possible receiver positions to two quadrants, as seen in Table 2. Drilling can begin in any of the regions defined by Table 1 and proceeds such that the distance between two consecutive data readings is always less than the half-width of region B. Therefore, tracking the drillhead receiver from region A or from the left part of region B to C will always yield some position data in region B and clearly defines rotation angle $\rho_r$ when the receiver crosses the boundary between regions B and C.

TABLE 2

| Region | Receiver coordinate $X_r$ | Rotation angle $\rho_r$ |
|---|---|---|
| A | $-\infty > X_r < -h$ | $90° \leq \rho_r \leq 270°$ |
| B | $-h \leq X_r \leq h$ drillpath above magnet | $0° \leq \rho_r \leq 180°$ |
|  | $-h \leq X_r \leq h$ drillpath below magnet | $180° \leq \rho_r \leq 360°$ |
| C | $h < X_r < \infty$ | $-90° \leq \rho_r \leq 90°$ |

Referring to the notation illustrated in FIGS. 7a-b and equations (17) and (18), receiver position coordinates are obtained from $$X_r = r \cos \rho_r \quad (24)$$

$$Z_r = r \sin \rho_r \quad (25)$$

$$Y_r = \pm \sqrt{R^2 - r^2} \quad (26)$$

As seen in the last equation, there is not sufficient information available from measurements of fluxes of magnet "a" to decide if the receiver is to the right or left of the transmitter unit. However, when flux data emitted by magnet "b" are taken into account, the correct lateral position can be determined, as will be shown immediately hereinafter.

As shown in FIGS. 9a and 9b, in the present example, magnet "b" is installed adjacent to the primary magnet "a". A horizontal offset between the two magnets is labeled h. Both magnets rotate at different frequencies (e.g., 7 and 11 Hz) so that their respective signals can be distinguished by the receiving magnetometers. FIGS. 9a-c illustrate the following relations between the coordinates of magnets "a" and "b":

$$X_a = X_b + h \quad (27)$$

$$Y_a = Z_b \quad (28)$$

$$Z_a = -Y_b \quad (29)$$

Fluxes of magnet "b" are measured as a function of magnet "b" rotation angle, similar to the data acquisition of magnet "a". They are curvefitted as described above for magnet "a" in order to obtain $r_b$, $R_b$ defined as the radii from the center of magnet "b" to point $P_b$ in the $X_b, Z_b$-plane and the receiver, respectively, as shown in FIG. 9c. The radii $r_b$, $R_b$ are expressed in terms of receiver coordinates by $$R_b^2 = X_b^2 + Y_b^2 + Z_b^2 \quad (30)$$

$$r_b^2 = X_b^2 + Z_b^2 \quad (31)$$

However, the determination of rotation angle $\rho_{r_b}$ (see FIG. 9c) of magnet "b" is different from that of magnet "a". Since the $X_a$-coordinate of the receiver is already known from the magnet "a" analysis, $\rho_{r_b}$ follows from $$\cos \rho_{r_b} = \frac{X_a - h}{r_b} \tag{32}$$

Finally, the $Y_a$-coordinate of the receiver in the global system is given by $$Z_b = r_b \sin \rho_{r_b} \tag{33}$$

$$Y_a = Z_b \tag{34}$$

Notice that the main purpose of adding a second magnet to the tracking system is to determine the left/right position of the receiver. In addition, the second magnet provides redundant data that may be utilized to monitor data acquisition and processing.

Calibration of Rotating Magnet

Figure 10A:
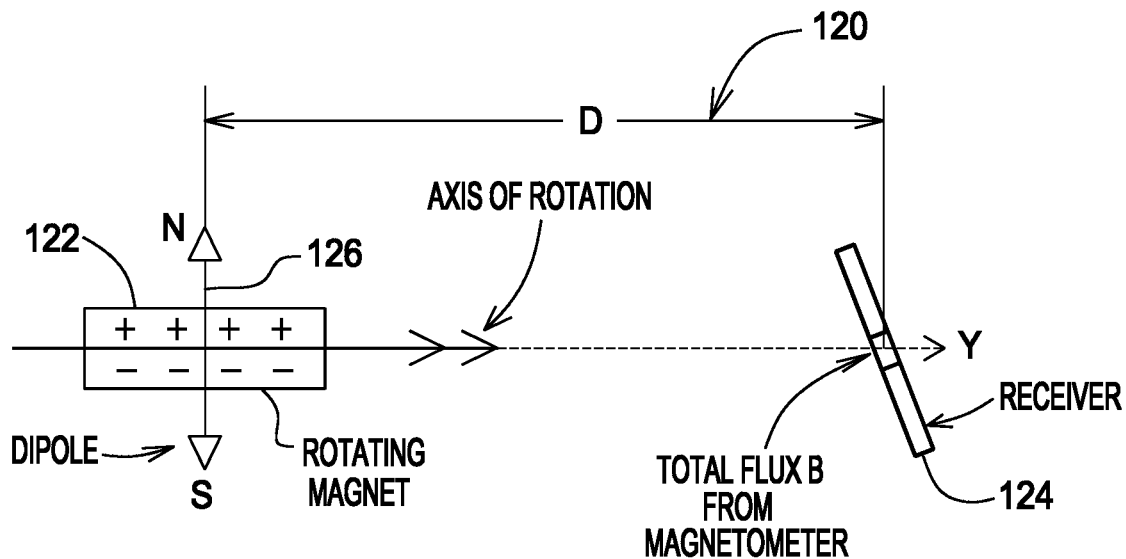
FIGS. 10a and 10b are diagrammatic plan views illustrating a rotating magnet and receiver of the present invention, shown here for purposes of describing calibration procedures using this system.
Figure 10B:
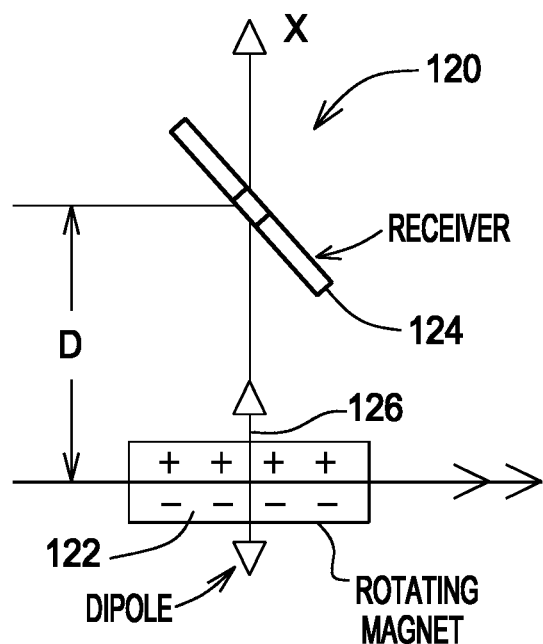

Referring to FIGS. 10a and 10b, a calibration arrangement is shown in plan view for calibration of a rotating magnet system and is generally indicated by the reference number 120. A rotating magnet 122 is diagrammatically shown along with a receiver 124. The dipole field axis is indicated by reference number 126. FIG. 10a illustrates receiver 124 at a distance "D" from the magnet along its axis of rotation (i.e., the Y axis). FIG. 10b illustrates receiver 124 at a distance "D" from the magnet along the X axis. As will be seen, either of these spatial configurations can be used for calibration. It is noted that this procedure is similar to a one-point transmitter calibration used in walkover locating systems. Each magnet of a tracking system, employing two or more magnets, must be calibrated separately. The calibration can be conducted by placing the rotating magnet on the ground (not shown), with its axis of rotation leveled, as shown. Receiver 124 is then placed on the axis of magnet rotation a distance D (e. g., 10 ft) to the side of the magnet, as shown in FIG. 10a. Alternatively, the receiver may be placed on the global X-axis as seen in FIG. 10b. Note that the receiver may be positioned at any angle with respect to the magnet rotation axis or the X-axis.

Referring to FIG. 10a, calibration includes placing the receiver on the magnet rotation axis, for example, and measuring the magnitude of total flux as described above for a large number of rotation angles. Generally, twelve angles is sufficient, however, the use of more angles equates with further enhancement of accuracy. An average flux $B_{av}$ is used to determine dipole strength m from $$m = D^3 B_{av} \tag{35}$$

It is of interest that, for perfect receiver positioning, relative to the transmitter, during calibration, only one measurement is required. Multiple measurements effectively accommodate receiver positioning errors when used to determine an average flux. Magnet calibration with the receiver on the global X-axis, as shown in FIG. 10b, uses slightly different formulas to obtain dipole strength. This is due to the variation of flux magnitude, showing distinct flux minima and maxima, labeled $B_{max}$, $B_{max}$, over one magnet revolution. Specifically, dipole strength is determined in this configuration using $$m = D^3 B_{min} \tag{36}$$

$$m = 0.5 D^3 B_{max} \tag{37}$$

Relocation of Transmitter Unit

Figure 11:
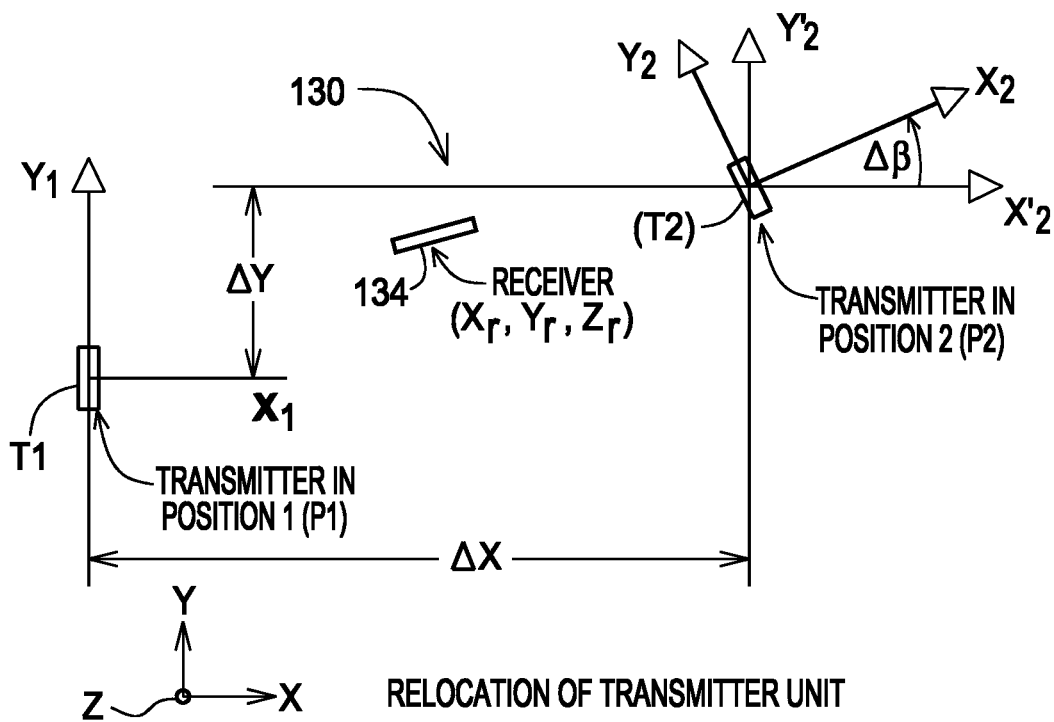
FIG. 11 is a diagrammatic plan view of the boring tool tracking and monitoring system of the present invention showing one transmitter and one receiver and further illustrating a procedure for moving the transmitter from a first position to a second position such that the transmitter remains within range of the receiver as the receiver moves, for example, with a boring tool.

Turning to FIG. 11, transmitter relocation is generally illustrated in a plan view, as indicated by the reference number 130. Accordingly, transmitter 1 (T1) is to be relocated relative to a receiver 134 from a position 1 (P1) to a position 2 (P2). Such relocation of the transmitter becomes necessary when the receiver approaches the range limit for accurate flux measurements. It is noted that the plane of the figure represents the global X,Y plane with Z being normal thereto. The following procedure applies.

Receiver 134 coordinates $X_{1r}$, $Y_{1r}$, $Z_{1r}$ are recorded with the transmitter in one position, as shown. The receiver is kept in this location until the transmitter relocation is completed.

Still referring to FIG. 11, the transmitter is moved to position 2 where it either may be placed with its $X_2$-axis pointing in the same direction as $X_1$ (shown as $X'_2$, along with $Y'_2$) or the transmitter may be rotated by $\Delta\beta$. Any change of heading angle must be measured in a suitable manner.

The receiver coordinates $X_{2r}$, $Y_{2r}$, $Z_{2r}$ are recorded with the transmitter in position 2 (P2).

If $X_2$ is not aligned with $X_1$, receiver coordinates must be rotated to the $X'_2$, $Y'_2$, $Z'_2$-system using $$\begin{Bmatrix} X'_{2r} \\ Y'_{2r} \\ Z'_{2r} \end{Bmatrix} = \begin{bmatrix} \cos \Delta\beta & -\sin \Delta\beta & 0 \\ \sin \Delta\beta & \cos \Delta\beta & 0 \\ 0 & 0 & 1 \end{bmatrix} \begin{Bmatrix} X_{2r} \\ Y_{2r} \\ Z_{2r} \end{Bmatrix} \tag{38}$$

The translation of transmitter position follows from $$\Delta X = X_{1r} - X'_{2r} \tag{39}$$

$$\Delta Y = Y_{1r} - Y'_{2r} \tag{40}$$

$$\Delta Z = Z_{1r} - Z'_{2r} \tag{41}$$

Subsequent tracking of the receiver may be conducted in the $X_2, Y_2, Z_2$ system. If necessary, coordinates are rotated to the $X'_2, Y'_2, Z'_2$-system using equation (38). Transformation to the $X_1, Y_1, Z_1$-coordinate system utilizes $\Delta X$, $\Delta Y$, $\Delta Z$ obtained during relocation of the transmitter.

Depth Measurement

Continuing to refer to FIG. 11, the rotating magnet provides for determination of the vertical position of receiver 134, $Z_r$, that is generally not the same as depth, depending upon the topology of the ground. Since depth is defined as the vertical distance from the ground surface to the drill path, ground topography can be mapped in order to obtain depth. For this purpose, the rotating magnet methodology described above can be used without modification. Prior to drill begin, the magnet is placed on the ground and the receiver or another device containing a cluster of tri-axial magnetometers is placed at a number of points on the ground that is sufficient to determine the surface coordinates, as will be described with reference to FIG. 12. The latter can either be recorded by pausing at each surface point, taking discrete measurements or by acquiring streaming data continuously.

Figure 12:
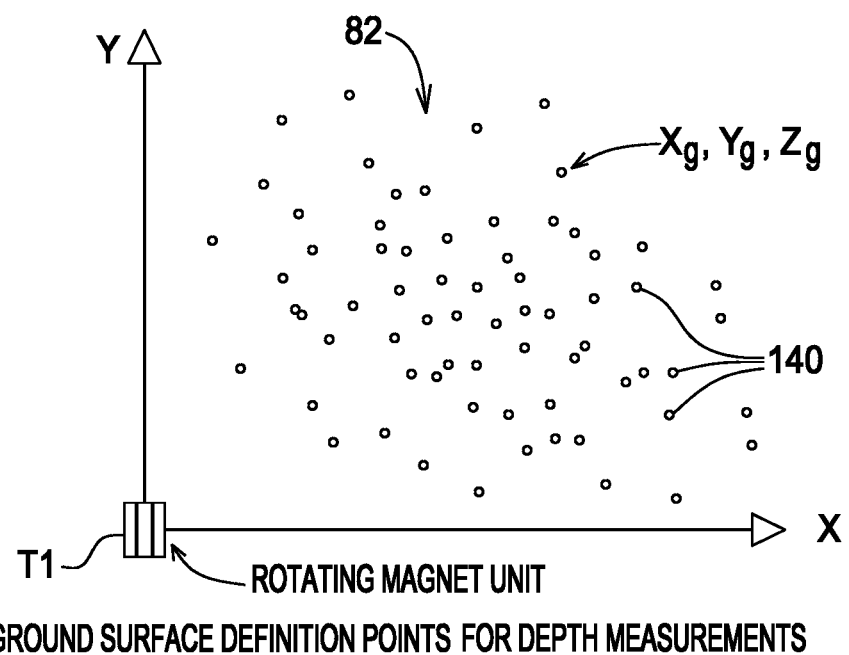
FIG. 12 is a diagrammatic plan view of a region in which a boring operation is to be performed, shown here to illustrate the use of a rotating magnet transmitter for purposes of mapping a plurality of ground surface points in this region.

Turning to FIG. 12, ground surface 82 is shown referenced to the overall X,Y coordinate axes in a plan view, along with transmitter T1. Using either discrete or continuous measurements, ground surface 82 is mapped at a large number of points 140, one of which is labeled $X_g$, $Y_g$, $Z_g$. The points can be recorded in any convenient order and with unequal spacing, as shown. Notice that only a few points are needed to define a nearly level ground, whereas much denser point spacing is generally required for rapidly sloping surfaces. The rotating magnet can be moved, using the same procedure described above for tracking, to extend the range.

During drilling beneath the exemplary surface of FIG. 12, receiver coordinates $X_r, Y_r, Z_r$ (FIG. 11) are determined as discussed previously. Since the $X_r, Y_r$-coordinates will usually fall between the measured ground surface points $X_g, Y_g$, the ground elevation $Z_g$ above the actual receiver position should be determined by interpolation. Standard methods such as the interpolation of scattered data based on Delaunay triangulation are available in the open literature to accomplish this efficiently. The desired receiver depth becomes simply the difference $Z_g - Z_r$.

Figure 13:
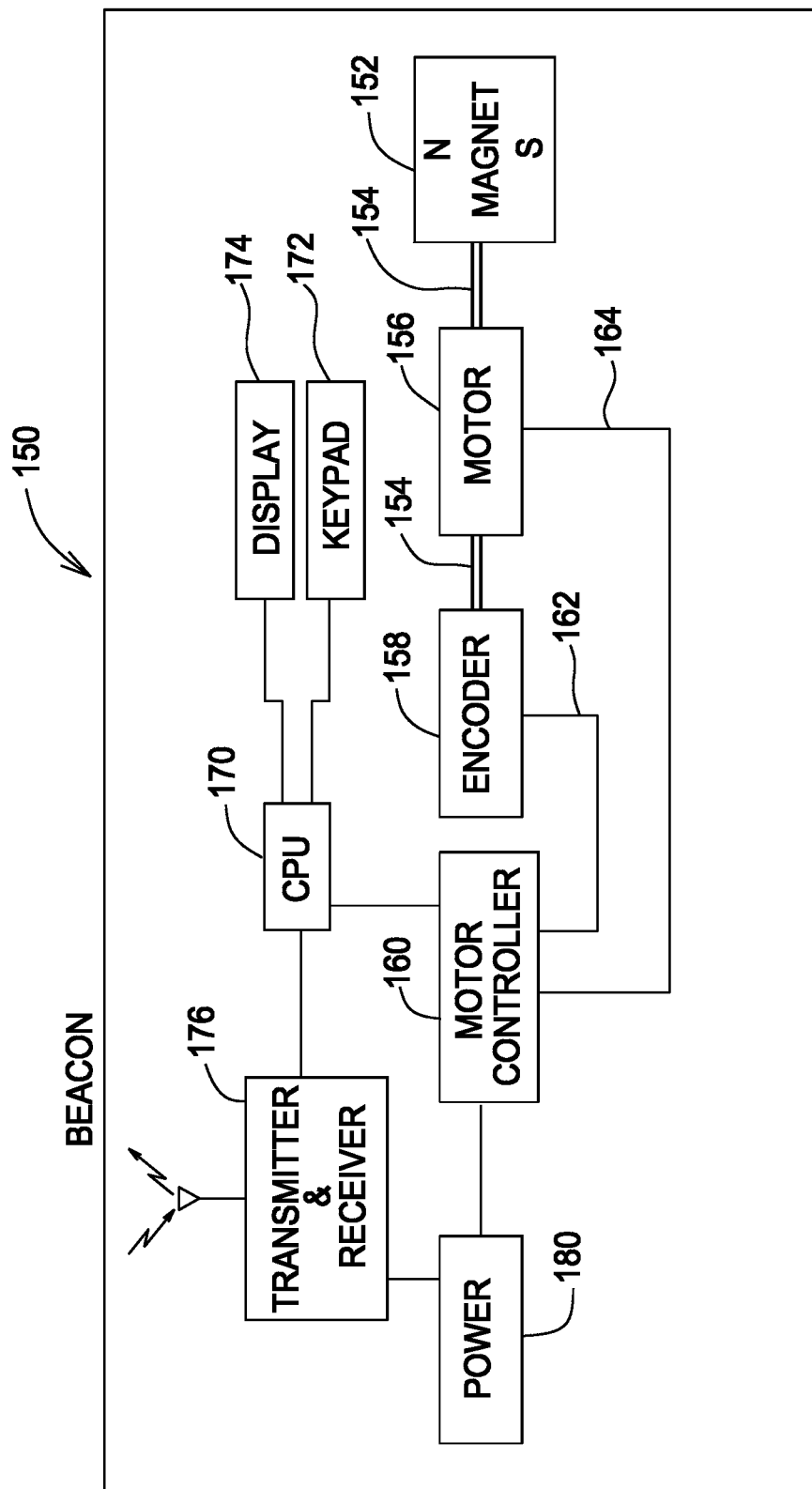
FIG. 13 is an electromechanical block diagram of a transmitter or beacon including a rotating magnet which is rotated about a single axis of rotation which may be used, for example, in a boring tool or personnel tracker implementation.

FIG. 13 is an electromechanical block diagram illustrating one embodiment of a transmitter or beacon which is produced in accordance with the present invention and generally indicated by the reference number 150. The latter includes a magnet 152 that is connected to a motor shaft 154 and motor 156 for rotation thereby. Motor shaft 154 is, in turn, connected to an encoder 158. A motor controller 160 which may be a PID or other suitable controller, in view of a particular application, receives the encoder signals on a line 162 and provides drive signals to the motor via a line 164. Additionally, the encoder information can be used to determine instantaneous magnet position in applications where the phase of the rotating magnet is necessary. A CPU 170 is interfaced with an input device such as a keypad 172 and provides overall control to the motor controller, a display 174 and a telemetry transceiver 176. The display may provide information including, but not limited to diagnostics, information about user data input which, for example, may assign a beacon number and telemetry parameters. Telemetry transceiver 176 is used for a number of purposes including, but not limited to communication with other beacons, base stations and mobile position receivers, shown in subsequent figures. The type of information communicated can include, but is not limited to instantaneous rotational position of magnet 152, magnet position synchronization signals, diagnostic and control information. A power supply section 180 distributes power, as needed, throughout the beacon.

Figure 14A:
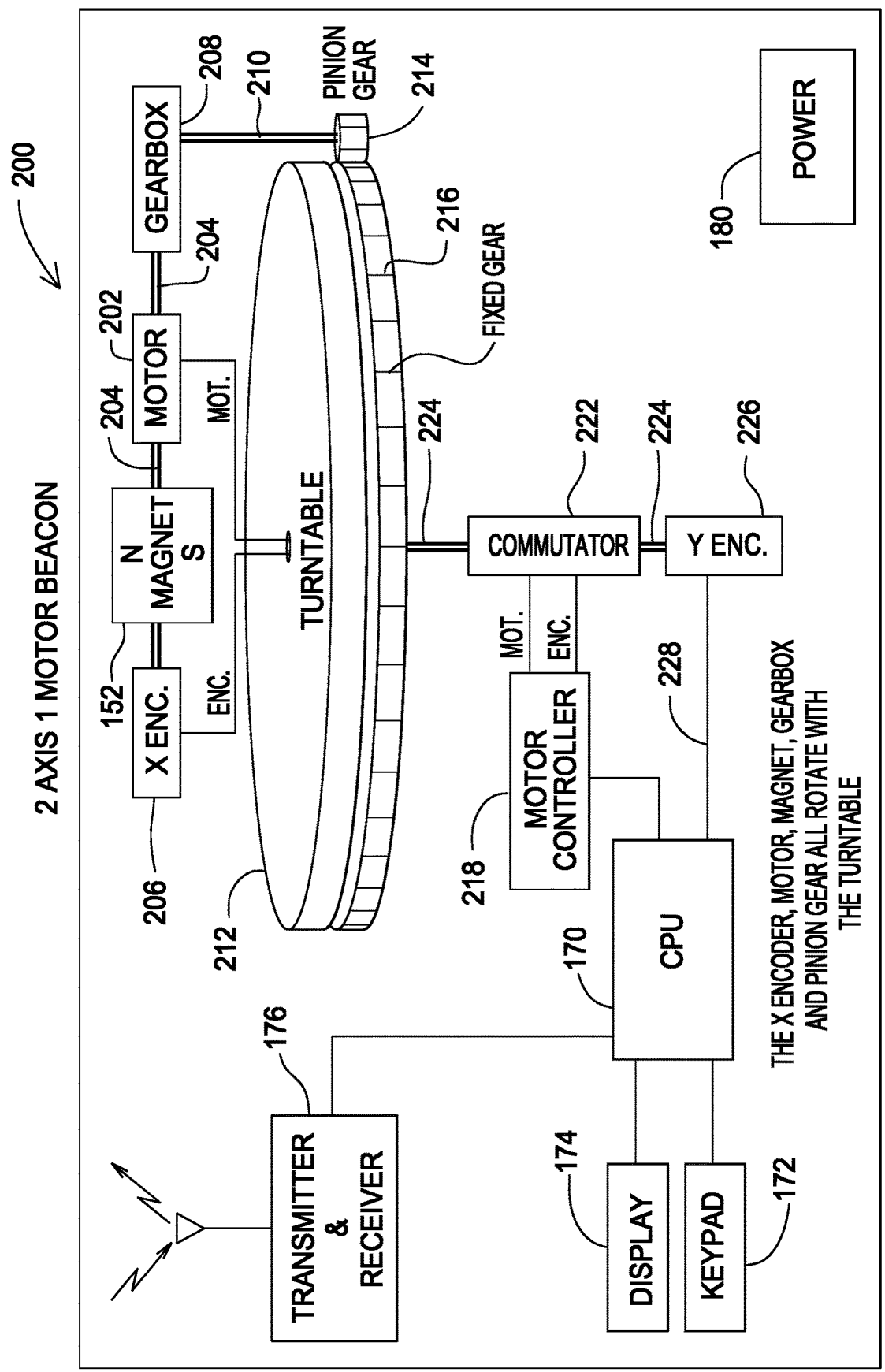
FIG. 14a is an electromechanical block diagram of a transmitter or beacon including a rotating magnet which is rotated simultaneously, by a single motor, about two orthogonal axes of rotation which may be used, for example, in a boring tool or personnel tracker implementation.

FIG. 14a is an electromechanical block diagram illustrating one embodiment of a dual axis beacon that is produced in accordance with the present invention and generally indicated by the reference number 200. In this embodiment, a drive motor 202 includes an output shaft 204 which directly spins magnet 152 as well as an x encoder 206. The motor further drives a gearbox 208 having a gearbox output shaft 210 which is used to rotate a turntable 212 using a pinion gear 214 positioned against a fixed gear 216. The turntable supports motor 202, magnet 152 and x encoder 206 for rotation thereon. Motor 202 is electrically driven by a motor controller 218 responsive to CPU 170. It should be appreciated that x encoder 206, motor 202, magnet 152, gearbox 202 and pinion gear 214 all rotate with turntable 212. Motor drive and x encoder signals are passed through a turntable shaft commutator 222. Turntable shaft 224 also drives a y encoder 226 having an output 228 that is provided to CPU 170. The latter also operates telemetry transceiver 176 and display 174 while receiving user inputs from an input device such as keypad 172. Power supply section 180 provides electrical power to the various components, as needed.

Figure 14B:
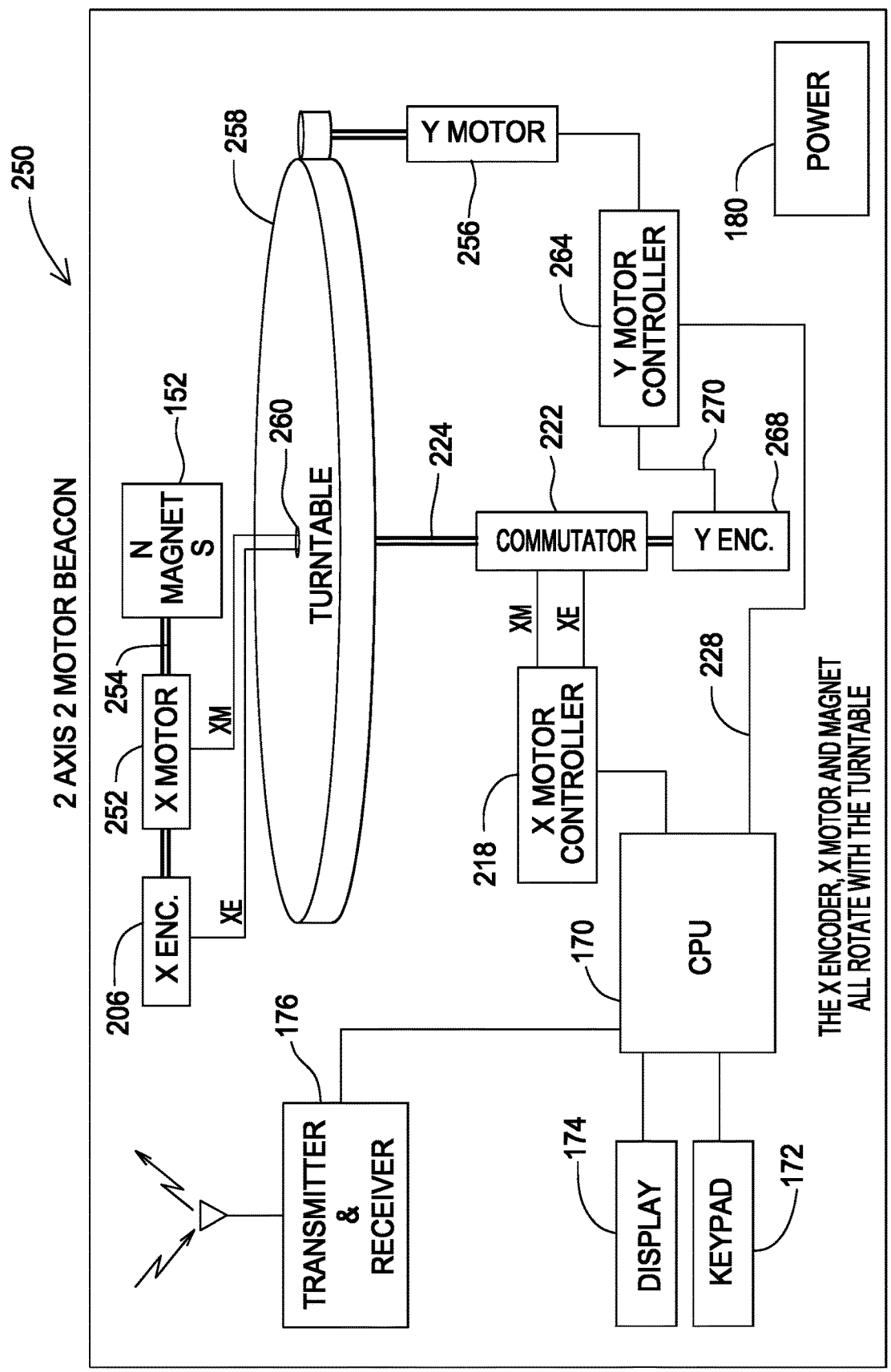
FIG. 14b is an electromechanical block diagram of a transmitter or beacon including a rotating magnet which is rotated simultaneously about two orthogonal axes of rotation using two separate motors, one of which is dedicated to each axis of rotation, which may be used, for example, in a boring tool or personnel tracker implementation.

FIG. 14b is an electromechanical block diagram illustrating another embodiment of a dual axis beacon that is produced in accordance with the present invention and generally indicated by the reference number 250. In this embodiment, a first, x drive motor 252 includes an output shaft 254 which directly spins magnet 152 as well as x encoder 206, all of which is mounted on a turntable. A second, y motor 256 drives a turntable 258 which is supported for rotation at a center of rotation 260 in a suitable manner. Motors 252 and 256 are electrically driven by respective x and y motor controllers, indicated by the reference numbers 218 and 264, responsive to CPU 170. Motor drive and x encoder signals are passed through turntable shaft commutator from x motor controller 218. Turntable shaft 224 also drives a y encoder 268 having an output 270 that is provided to CPU 170 for use in driving a y motor controller 272. The latter also operates telemetry transceiver 176 and display 174 while receiving user inputs from an input device such as keypad 172. All of x encoder 206, x motor 252 and magnet 254 rotate with turntable 258. Power supply section 180 provides electrical power to the various components, as needed. It should be appreciated that any number of alternative structures can be provided for purposes of implementing dual axis rotation of a magnet and that the present descriptions are not limited to the described embodiments.

Figure 15:
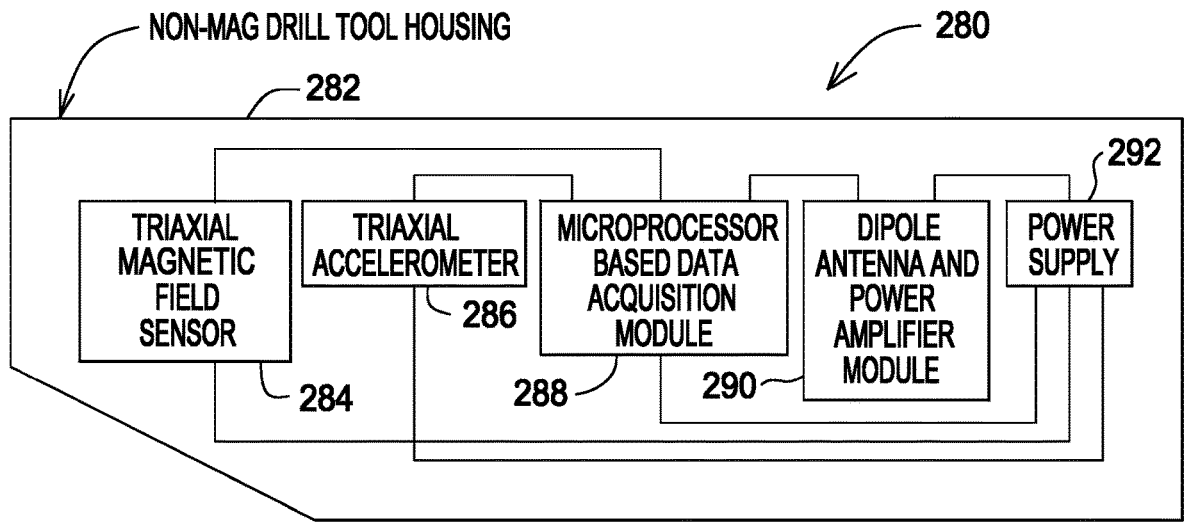
FIG. 15 is an electromechanical block diagram illustrating one embodiment of a boring tool that is configured with a receiver which is produced in accordance with the present invention for receiving rotating magnet signals.

FIG. 15 is an electromechanical block diagram illustrating one embodiment of a boring tool that is configured in accordance with the present invention and generally indicated by the reference number 280. Boring tool 280 includes a slotted non-magnetic drill tool housing 282. A triaxial magnetic field sensing arrangement 284 is positioned in housing 282. For this purpose, a triaxial magnetometer or coil arrangement may be used depending on considerations such as, for example, space and accuracy. A triaxial accelerometer 286 is also located in the housing. Outputs from magnetic field sensing arrangement 284 and accelerometer 286 are provided to a processing section 288 having a microprocessor. A dipole antenna and associated transmitter 290 are located in the boring tool which can be used, responsive to the processing section, for telemetry purposes, for transferring encoded data such as roll, pitch, magnetometer readings and accelerometer readings to above ground locations and for locating determinations such as, for example, determining a distance to the boring tool. Generally, the dipole axis of the dipole antenna is oriented coaxially with an elongation axis of the boring tool in a manner which is well-known in the art. Of course, all of these functions are readily supported by the processing section which reads appropriate inputs from the magnetometer and accelerometer, performs any necessary processing and then performs the actual encoding of information that is to be transmitted.

Still referring to FIG. 15, a regulated power supply 292, which may be powered using batteries, is provided for providing appropriate power to all of the components in the boring tool, as shown. It is noted that magnetic field sensor 284 can be used to measure the field generated by a rotating magnet as well as measuring the Earth's magnetic field. The later may be thought of as a constant, much like a DC component of an electrical signal. In this instance, the Earth's magnetic field may be used advantageously to determine a yaw heading. Further, the magnetic field sensor can be used to pick up magnetic fields that are of interest and which are generated by other sources, for example a signal that is generated by a buried line for purposes of collision avoidance. As an alternative to sending information above ground from the dipole antenna, a wire-in-pipe approach may be used wherein a conductor in a drill string, which moves the boring tool, transfers the information above ground as described, for example, in commonly owned U.S. Pat. No. 6,223,826 entitled AUTO-EXTENDING/RETRACTING ELECTRICALLY ISOLATED CONDUCTORS IN A SEGMENTED DRILL STRING, which is incorporated by reference in its entirety. It is noted that this approach may also be used to provide power to power supply 292 from above ground, as an alternative or supplemental to the use of batteries.

Figure 16:
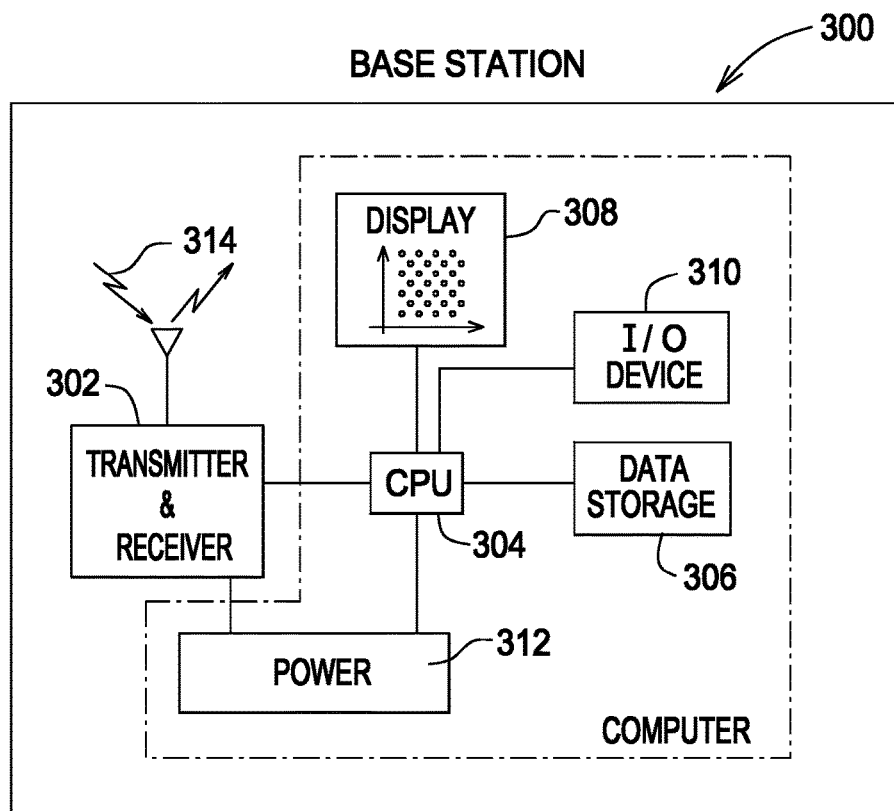
FIG. 16 is a block diagram illustrating one embodiment of a base station which may be used, for example, in a boring tool or personnel tracker implementation.

FIG. 16 is a block diagram illustrating one embodiment of a base station that is configured in accordance with the present invention and generally indicated by the reference number 300. It is noted that the illustrated configuration is generally applicable to both the personnel tracker and boring tool implementations of the present invention. Of course, display sizes and specific display information is readily changed to best suit each application. Base station 300 includes a telemetry transceiver section 302 that is in electrical communication with a processing section (CPU) 304. The processing section utilizes a data storage section 306 which may comprise any suitable form of digital data storage including but not limited to ROM, RAM and hard disks. Further, processing section 304 generates drive signals for a display 308. Any suitable display may be utilized including, but not limited to LCD, LED and plasma displays. An input device such as, for example, a keypad or keyboard 310 is interfaced with the processing arrangement in order to provide for user input. A power supply 312 provides power to base station components, as illustrated. In the personnel tracking implementation, the base station may receive "raw" data through telemetry signals 314 from one or more portable position receivers. That is, signals received by a position receiver may be passed to the base station, as compared to the position receiver actually determining its position. The base station uses the raw data to determine the position of an associated one of the receivers. Alternatively, the base station may be sent receiver determined position coordinates.

Figure 17:
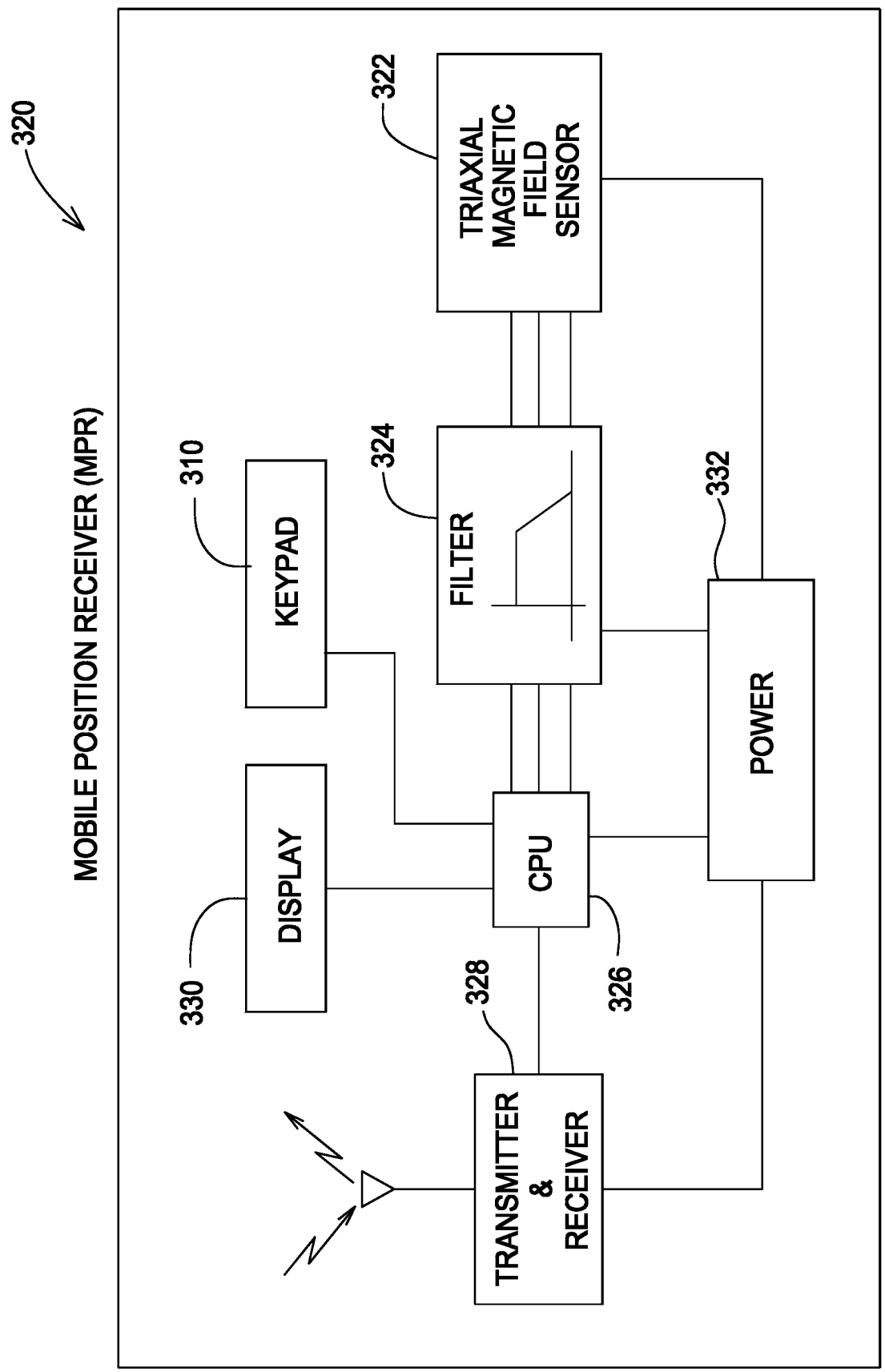
FIG. 17 is a block diagram illustrating one embodiment of a mobile position receiver that is configured for use in a personnel tracker implementation.

FIG. 17 is a block diagram illustrating one embodiment of a mobile position receiver (MPR) that is configured in accordance with the present invention and generally indicated by the reference number 320. The MPR includes a triaxial magnetic field sensor 322 such as, for example, triaxial magnetometers or coils (if space permits). The field sensor is interfaced with a hardware filter 324 which removes frequencies that are higher than the magnet frequency, including 50/60 cycle noise. In the present example, a low pass filter is used, as depicted in the figure. Additional filtering may be performed by a processing section 326, interfaced with the filter, to provide for narrow, bandpass capability that can be centered on a specific magnet frequency of interest. Of course, frequencies associated with different magnets can be discriminated in this way. The processing section is also interfaced with a telemetry transceiver 328 and a suitable display 330. The latter can be used to show a display which is similar to that of a base station such as, for example, base station 300 of FIG. 16, with which it is in communication. For example, MPR 320 can show its own determined location. It is noted that display 330 is optional. In the case where a display is provided, data entry device 310 can be provided. A power section 332 provides power to the various components, as necessary, and may be configured for battery operation. As noted above, the MPR may be configured to send raw data to an associated base station using telemetry transceiver 328. Alternatively, the MPR may be configured to determine its actual location. In this instance, the MPR must have available to it beacon positions in absolute coordinates. This information can be provided, for example, via telemetry.

Having described a dual magnet boring tool tracking/monitoring system in detail above with reference to the foregoing figures, a description of such a system will now be provided which uses a single rotating magnet. To that end, attention is immediately directed to FIGS. 18*a* and 18*b*, which illustrate a portable walkover locator produced in accordance with the present invention and generally indicated by the reference number 400. Locator 400 is configured with a handle 402 for hand-carried use, shown in a diagrammatic plan view in FIG. 18*a* and in a diagrammatic perspective view in FIG. 18*b*.

Figure 18A:
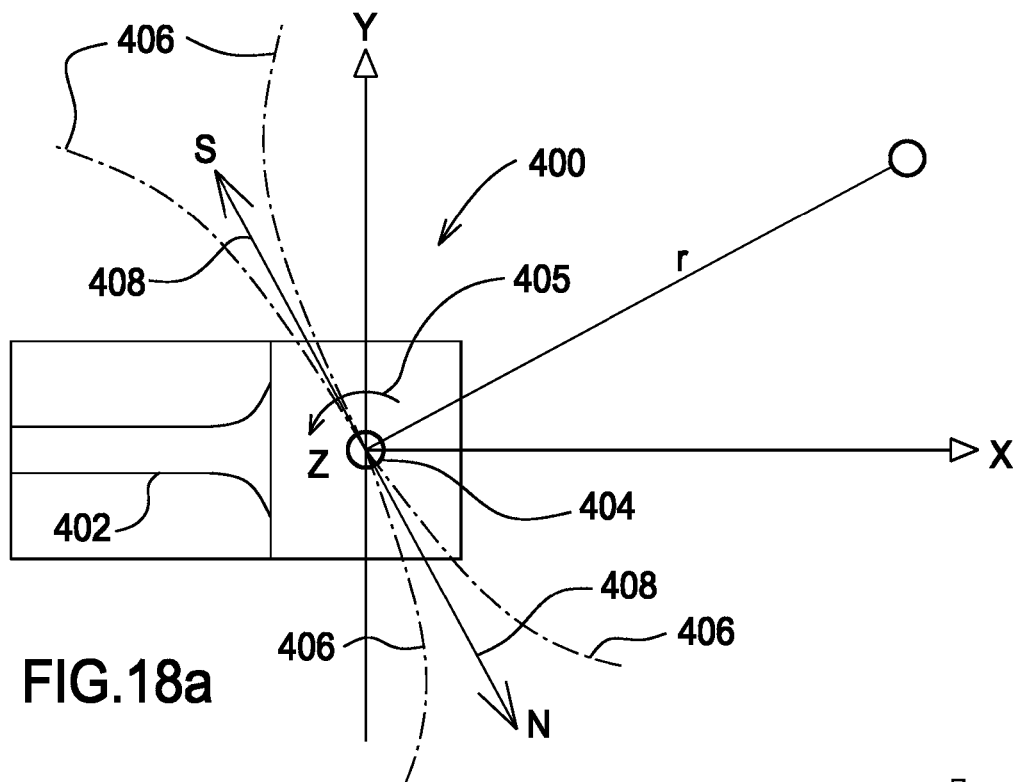
FIG. 18a is a diagrammatic plan view, in elevation, of a portable walkover locator, produced in accordance with the present invention, including a single rotating magnet that is arranged, for example, having an at least generally vertically oriented axis of rotation.

Referring to FIG. 18*a*, locator 400 houses a single magnet 404 that can rotate slowly, for example, at about 20 revolutions per second (20 Hz), as indicated by an arrow 405 thereby emitting a rotating magnetic dipole field 406 (only partially shown) having a dipole axis 408. It is noted that the rotational axis of magnet 404 is coaxial with an overall Z axis and is centered in an X,Y plane of this coordinate system which moves with locator 400. With locator 400 held in a level orientation, X and Y are in the plane of the figure and Z is normal thereto.

Figure 18B:
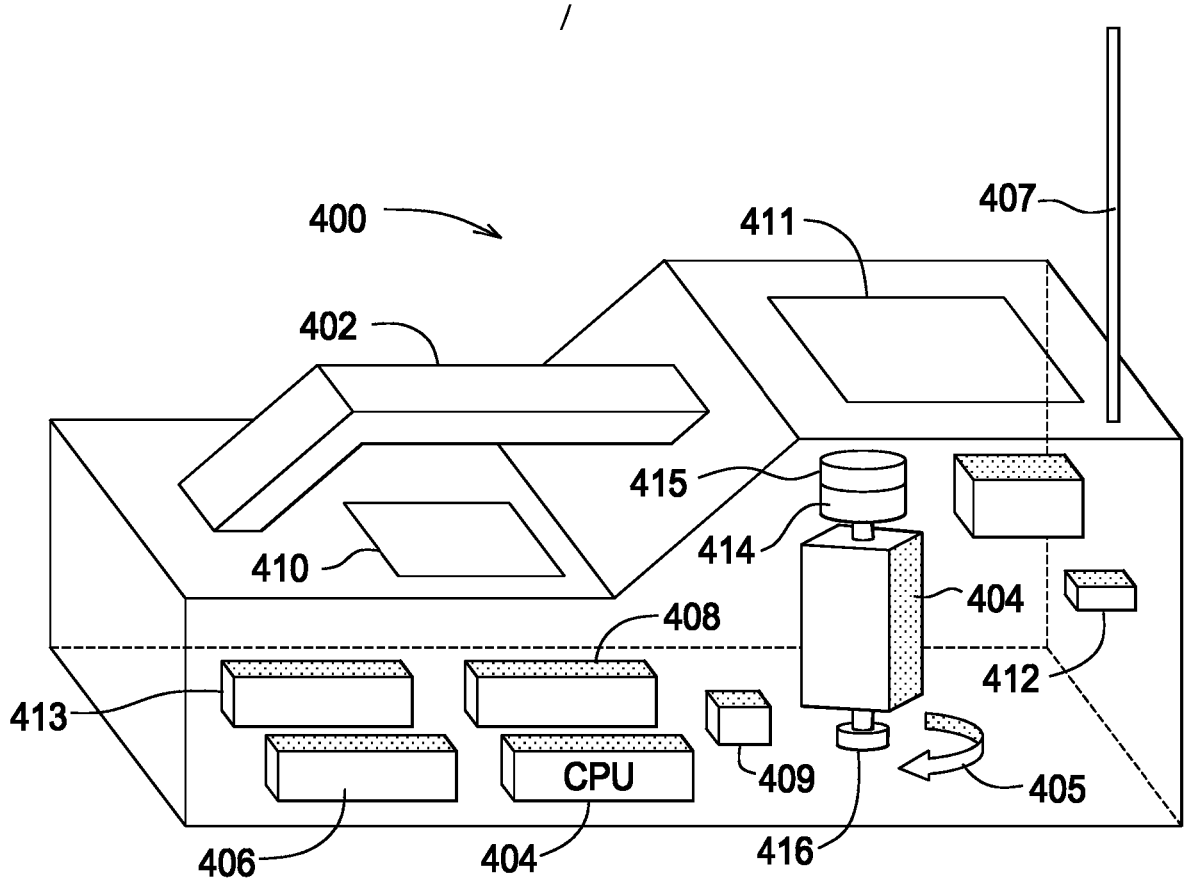
FIG. 18b is a diagrammatic view, in perspective, of the locator of FIG. 18a, shown here to illustrate its various components.

FIG. 18*b* diagrammatically illustrates further details with respect to the components which make up locator 400. In particular, a data processing and control or CPU section 404 is provided and interfaced appropriately with other described components in a known way. These interface connections have not been illustrated for purposes of illustrative clarity at least for the reason that configuring such an arrangement is considered to be within the capability of one having ordinary skill in the art. Additional components include a telemetry section 406 that is interfaced with a telemetry antenna 407. A signal acquisition section 408 serves to amplify and digitize the signal from multi-axis dipole antenna 409 before passing it to the CPU. The magnetic flux components from the rotating magnets measured by the sensors are digitized and encoded before being transmitted by a dipole antenna or wire-line. The multi-axis dipole antenna in handheld receiver 409 is used to measure the underground dipole antenna's flux components. The CPU extracts the encoded digital signal that contains the measured magnetic flux components emitted by the rotating magnet. User inputs are provided by a suitable device such as, for example, a keypad 410, while information can be displayed to the user on a display 411. An audio output device 412 may be used to provide audio indications such as, for example, alarms and to indicate actuation of the various keys which make up keypad 410. Keypad 410, display 411 and audio device 412 are operated using an interface 413. A motor 414 rotationally drives magnet 404 and an encoder 415, suitably supported for rotation using a bearing arrangement 416.

Figure 19:
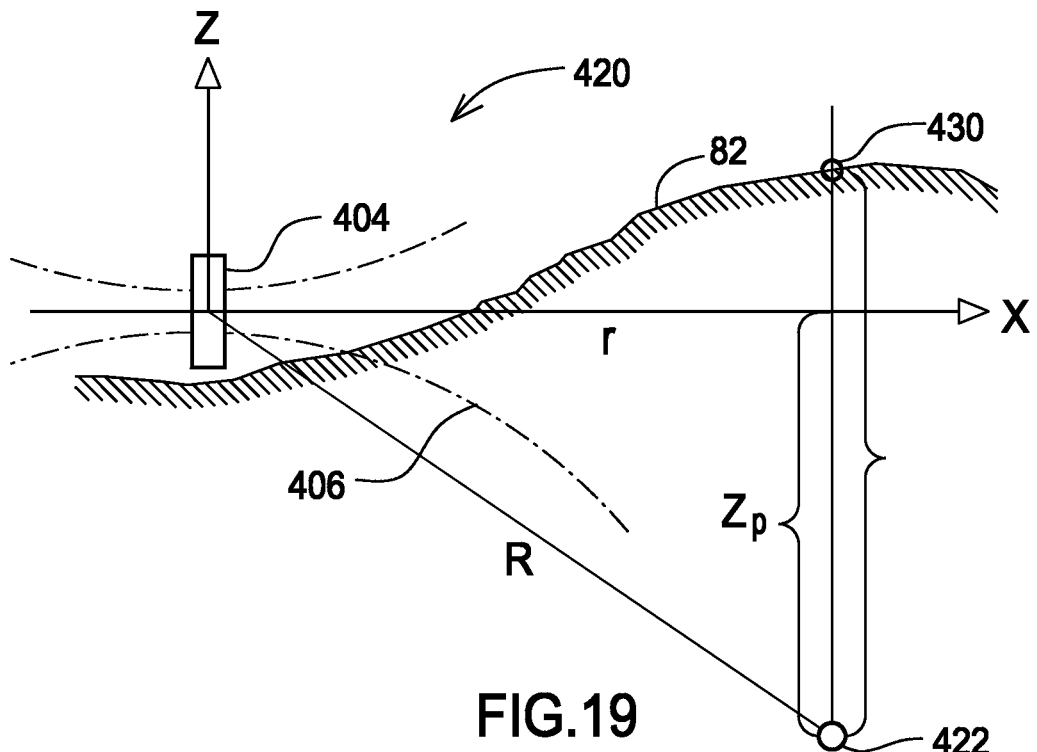
FIG. 19 is a diagrammatic view, in elevation, showing the portable walkover locator of FIG. 18 in relation to an inground probe or receiver which is carried, for example, by a boring tool.

Referring to FIG. 19 in conjunction with FIGS. 18*a* and 18*b*, locator 400 is part of a tracking system, generally indicated by the reference number 420, that also includes a receiver 422 that is installed in an underground probe such as, for example, a steering tool or boring tool (see FIG. 15). Fluxes are measured at the probe by tri-axial magnetometers or coils 284. FIG. 19 is an elevational view showing probe 422 beneath ground surface 82. It should be appreciated that this highly advantageous system improves drillhead tracking, over prior art systems, for a number of reasons to be described immediately hereinafter.

This should provide accurate tracking under rebar (i.e., steel concrete reinforcement bar) due to the very low frequency of the rotating dipole field. It is considered that a frequency of approximately 20 Hz is orders of magnitudes below the frequencies at which present-day locating systems operate. For example, current systems produced by Digital Control, Inc. operate at a low frequency of approximately 1.5 kHz. For this reason, rebar effects should be dramatically reduced.

An improved locating capability is provided since actual probe position relative to the locator can be determined and displayed. The locating procedure focuses on finding an over-the-head position 430 on ground surface 82 immediately above probe 422. For this purpose, the new locator uses a highly intuitive "ball-in-the-box" display, however, the "ball" is a representation of the actual over-the-head coordinates, a technique which has never heretofore been available to Applicant's knowledge.

The following disclosure describes three different types of rotating magnet locators, of which two utilize a single magnet having a vertical rotation axis, and the third employs a single horizontal magnet. Other embodiments can be designed featuring a single magnet with an oblique rotation axis. A multiple magnet embodiment is described above. Data acquisition and analysis, locating procedure, tilt corrections and other design features of the vertical magnet locator described below are applicable to all of these rotating magnet locators with only minor modifications.

Vertical Magnet Locator

Referring again to FIGS. 18a, 18b and 19, locator 400, as will now be appreciated, comprises a vertical magnet embodiment. Nomenclature used in characterizing system 420 is described immediately hereinafter. It is noted that this nomenclature is in no way intended as limiting and may be modified in any number of suitable ways by one having ordinary skill in the art in view of this overall disclosure.

Nomenclature b=total flux at probe for unit dipole strength
f=flux curvefit function
OH=over-the-head position
P=probe
R=total distance from center of magnet to flux sensor
r=horizontal distance from magnet to over-the-head position
t=time
X,Y,Z=leveled locator coordinate system, origin at center of magnet, X-axis in plane of locator symmetry, X,Y-axes are level
X",Y",Z"=tilted locator coordinate system, origin at center of magnet, X-axis in plane of locator symmetry
x,y,z=rotating dipole coordinates, x-axis along dipole axis, z-axis along vertical magnet rotation axis
$Z_p$=vertical distance between locator and probe, depth of probe below a level ground
$\rho$=rotation angle
$\gamma_x,\gamma_y$=tilt-pitch and tilt-roll angles
$\lambda,\theta$=Euler pitch and roll angles
$\omega$=magnet rotation frequency The symbol r defines the horizontal distance from magnet 404 to a projection of the over-the-head location onto a level plane that passes through the magnet (FIG. 19), whereas R denotes the total distance from the magnet to the probe. True depth of the probe, defined as the vertical distance between ground and probe, is usually different from depth $Z_p$, but becomes equal when the locator is over-the-head (normally including some distance above the actual surface of the ground at which the locator is held). It is noted that FIG. 19 illustrates a situation in which $Z_p$ is less than the actual depth since overhead point 430 is vertically higher than overhead point 430.

Figure 20:
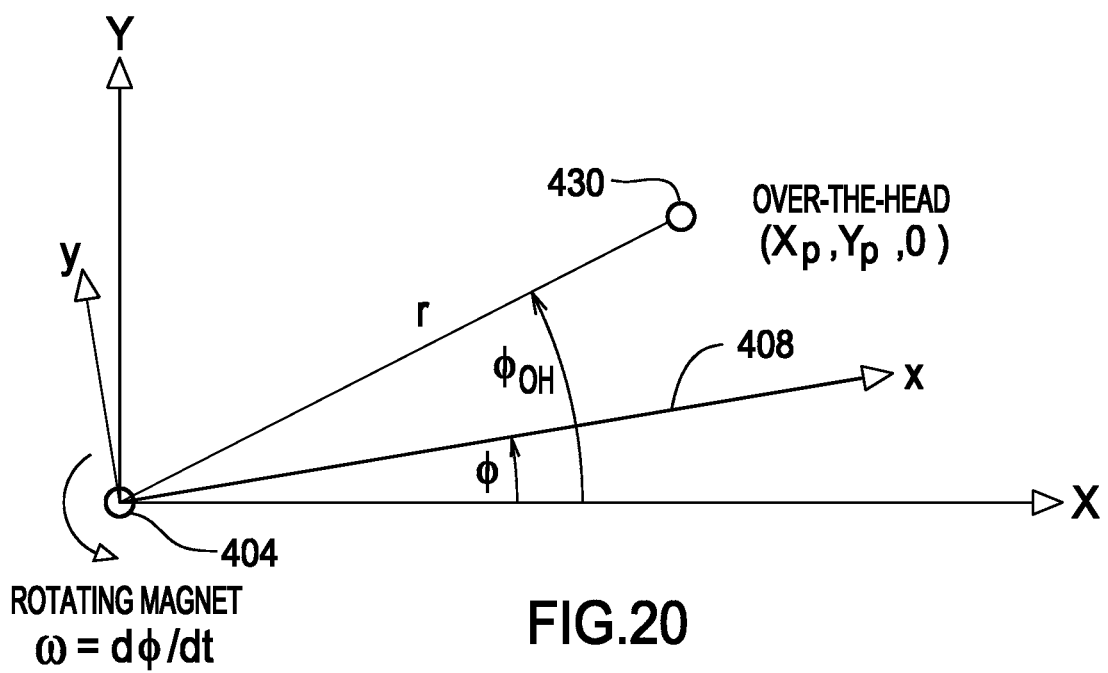
FIG. 20 is a diagrammatic plan view of the vertically oriented magnet of the portable walkover locator of FIG. 18 in relation to an over-the-head position which is at the surface of the ground directly above the inground receiver of FIG. 19.

Referring to FIG. 20, a diagrammatic plan view of system 420 is provided, showing overhead point 430 with probe 422 (FIG. 19) therebeneath. A rotation angle $\rho$ is defined in a horizontal plane of the figure, measured from the X-axis of the locator coordinate system to dipole axis 408. Angle $\rho$ has the value $\rho_{OH}$ when the dipole axis points or aligns in the direction of the over-the-head position. In this aligned condition, maximum flux is present at the probe, with minimum flux present when the dipole axis is normal to a line which extends between the locator and the over-the-head position.

Measured Data

Flux magnitude b for unit dipole strength is measured. Note that magnet calibration is required to determine dipole strength before using the locator. Rotating magnet calibration methods are discussed in detail above.

Magnet rotation angles $\rho$ for at least half of a magnet revolution are measured, with corresponding total flux magnitudes at these angles. The minimum number of required rotation angles depends on desired curve-fit accuracy. Accurate curve-fits can often be achieved with 12 angles or fewer, but modern data acquisition and processing techniques readily permit use of much larger data sets consisting of several hundred angles.

It is noted that walkover locators, as described herein, do not require knowledge of the locator position itself, since only the relative position between locator and probe or receiver is of interest. However, some users might want to log drillhead position data in an Earth fixed coordinate system that would require measurement of locator position. Methods for logging probe positions are discussed at an appropriate point below.

Data Analysis

The data analysis proposed for the locator of the present invention may be referred to as a "phase method", described above, but is summarized here for easy reference and with modifications suiting the nomenclature of a single vertical magnet system.

A flux b induced by the magnet at the probe varies according to $$b^2 = \frac{3r^2}{R^8}\cos^2(\rho_{OH} - \rho) + \frac{1}{R^6} \quad (42)$$

Figure 21:
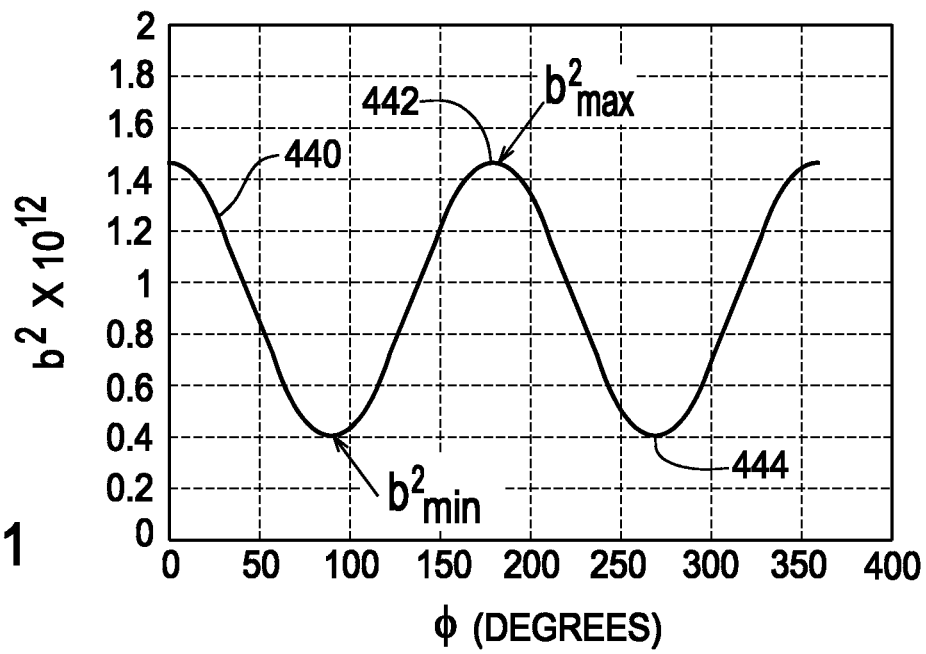
FIG. 21 is a plot of the square of magnetic field intensity versus rotation angle shown here to illustrate the way in which received flux changes with rotation angle of a rotating magnet.

Referring to FIG. 21, a plot 440 is presented showing the square of the flux magnitude for unit dipole strength $b^2$ multiplied by $10^{12}$, along the vertical axis of the figure plotted against $\rho$, illustrating how flux changes with rotation angle according to equation (42). Flux plot 440 exhibits a $b_{max}^2$ value 442 and a $b_{min}^2$ value 444. Hence, a suitable curvefit for measured square fluxes can be written as $$f = c_1 \cos^2(c_3-\rho) + c_2 \quad (43)$$

Equations (20) and (21), for R and r, described above, are again obtained by comparing equations (42) and (43).

In order to determine rotation angle $\rho_{OH}$ from coefficient $c_3$, it is noticed that two possible values of this coefficient exist, $c_3$ and $c_3+\pi$. Therefore, the following two solutions for rotation angle are obtained $$\rho_{OH_1} = c_3 \quad (44)$$

$$\rho_{OH_2} = c_3 + \pi \quad (45)$$

With reference to FIG. 20, probe position coordinates can be determined using $$X_p = r \cos(\rho_{OH}) \quad (46)$$

$$Y_p = r \sin(\rho_{OH}) \quad (47)$$

$$Z_p = \pm\sqrt{R^2 - r^2} \quad (48)$$

Equations (45)-(48) reveal ambiguities in calculating probe position that are due to multiple values for rotation angle and probe depth. The valid solutions for over-the-head position $X_p, Y_p$ and depth $Z_p$ can be determined by applying the locating procedure outlined below in a consistent manner.

Locating Procedure

Referring to FIG. 19, this procedure focuses on finding the over-the-head position for which coordinates $X_p, Y_p$ are determined as described above. Over-the-head position is displayed, for example, on a suitable display, as will be shown in FIGS. 23 and 24, using an intuitive, "ball-in-the-box" display, as described in more detail below. It is important to understand, however, that this new procedure is thought to be fundamentally different from any prior techniques, at least for the reason that the actual over-the-head position, defined by its coordinates $X_p, Y_p$, is displayed relative to the locator. That is, flux line curvature does not cause the displayed location to become an approximated location of the over-the-head point. In the past, such an approximated positional display was used to find a forward or rear locate point as described in U.S. Pat. No. 6,496,008 which is incorporated herein by reference and is commonly owned with the present application. At the time of its discovery, the "ball-in-the-box" display of an approximated locate point position represented a sweeping improvement over the then-existing state-of-the-art, and served as an aid in displaying further, more accurate positions of the locate point with subsequent movement of the locator. Further, this approach remains in use at the time of this writing. Here, however, the "ball" represents the location of the over-the-head position in actual coordinates relative to the locator. In some circumstances, this feature is particularly advantageous such as, for example, when the operator is unable to move the locator closer to the over-the-head point due to an obstacle such as a building. The present approach remains equally intuitive wherein the operator moves the locator while observing the display and adjusts this movement to move the "ball" toward and into the "box."

Figure 22:
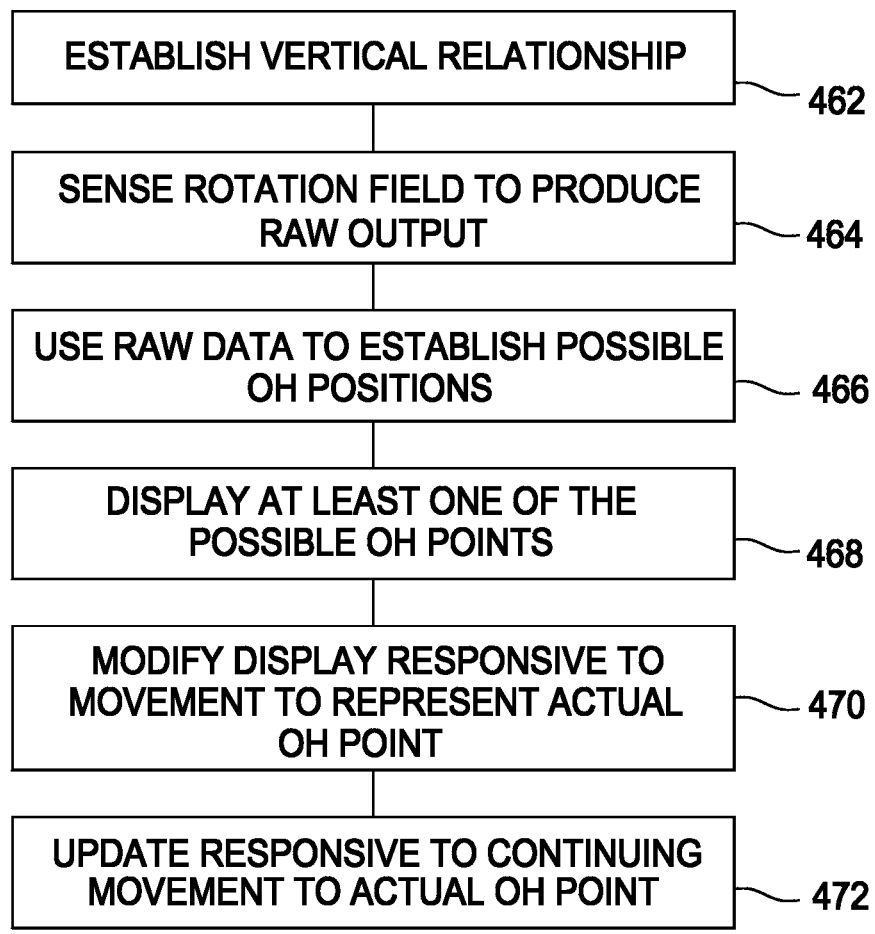
FIG. 22 is a flow diagram illustrating one procedure for using a vertical magnet locator to identify the location of the overhead position corresponding to an associated inground receiver.

Referring to FIG. 22 in combination with FIGS. 18a and 19, the locating procedure is generally indicated by the reference number 460 and begins with step 462 for establishing a vertical positional relationship between probe 422 and transmitter magnet 404. In other words, the relationship is limited to specifying whether the locator is above or below a level plane that extends through the probe, characterized as a direction of vertical offset of the locator with respect to the probe. With specific reference to FIG. 19, it should be appreciated that in a majority of cases, this relationship is readily ascertainable, if not already known, by the operator. Moreover, for directional drilling the handheld locator is most often vertically higher than the receiver in the drillhead (i.e., an upward vertical offset), as is illustrated by FIG. 19, although there can be exceptions such as in the instance of drilling into the side of a hill. If the later is the case, the approach to the over-the-head point may start from an elevated point such as, for example, on the hill, necessarily above the probe.

Having eliminated the vertical ambiguity, probe 422 senses rotating magnetic field 406 in step 464 to produce raw sensor output data. The system uses the sensed field data to determine, in step 466, the position of the probe/receiver, as outlined above, bearing in mind the one remaining ambiguity in the X, Y plane. This solution, therefore, includes two possible positions of the over-the-head point, on opposite sides of the locator. It should be appreciated that the determination of this solution can be physically distributed in a number of ways, all of which are considered to be appropriate. For example, probe 422 of FIG. 19 can detect dipole field 406 and transfer the raw sensor data to locator 400 in an appropriate manner, such as described above. The locator then uses the raw data information to establish the position determination. Alternatively, the probe can determine its position, based on the sensed, raw data, and then transmit the position information to the locator. As another alternative, a base station can be used to receive data from the probe and then pass appropriate information along to the locator. The base station can receive raw sensor data, determined position information from probe 422 or some combination of raw and processed data.

Figure 23:
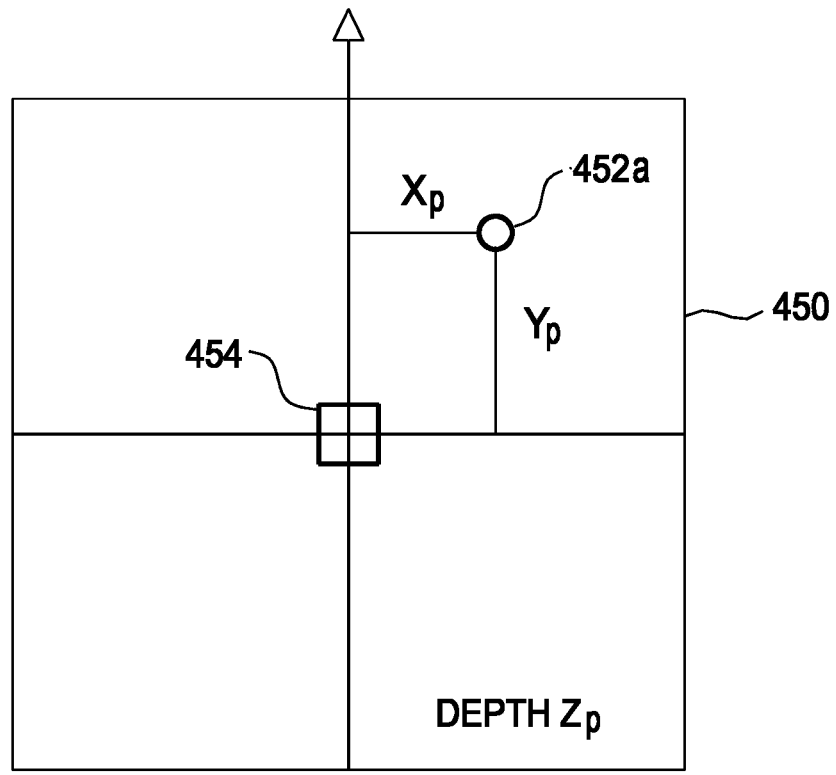
FIGS. 23 and 24 are diagrammatic views of a display which may be provided, for example, on a single vertical magnet locator, shown here to accompany the flow diagram of FIG. 22 in implementing the locating procedure when, at least initially, the boring tool may be in one of two possible positions in relation to the locator.

Referring to FIG. 23, along with FIGS. 18, 19 and 22, at least one of these possible over-the-head points, shown as a "ball" 452a in FIG. 23 is indicated in step 468. It is noted that this initial display could place the "ball" in any one of the quadrants based upon the current orientation of locator 400, relative to probe 422. The position has been illustrated in one of the two upper quadrants of a display 450 for purposes of convenience. It is further noted that locator 400 can be configured to arbitrarily select one of the possible OH points or may always display that possible OH point which appears in the upper (or lower) display quadrants. Display 450 is diagrammatically illustrated and may readily be provided on locator 400 of FIG. 18 using any suitable display type such as, for example, LCD, plasma and/or LED. Display 450 shows "box" 454 approximately at its center and may provide additional information such as, for example, the values of $X_p, Y_p$ and $Z_p$. As will be seen, the possible or potential displayed over-the-head point may or may not coincide with the actual over-the-head point. Generally, the X axis is arranged to project straight forward when the locator is held comfortably by its operator. Further, the X axis of displayed 450 can be aligned with this direction.

Figure 24:
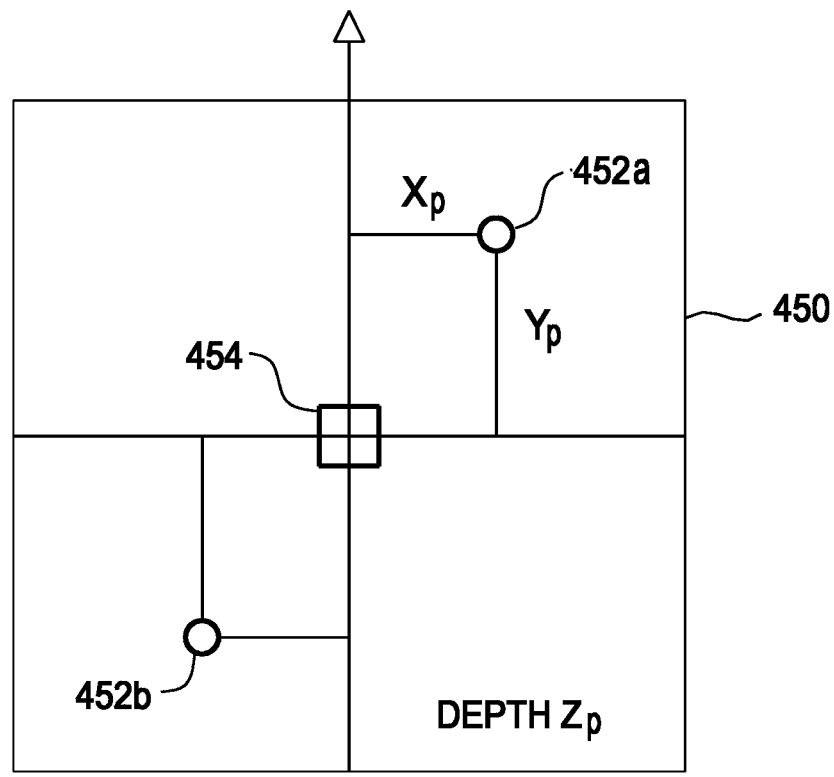

Referring to FIG. 24, display 450 is shown in a modified form, with respect to FIG. 23, wherein both possible over-the-head points are indicated as 452a and 452b. The points are distinguishable by a slightly different outward appearance. One of these points corresponds to the actual over-the-head point. As will be seen below, the operator can select and initially use either one of these possible OH points.

Having a suitable display presented, such as is represented, for example, by FIGS. 23 and 24, in step 470, the operator rotationally orients locator 400 toward the displayed position of the selected one of the possible OH points. Responsive to this rotation, the possible OH point of interest will move to one of the upper display quadrants, if it is not already in such position. The operator then moves locator 400 at least generally toward the selected one of the possible over-the-head points 452a,b. Responsive to this movement, the selected possible OH point will move closer to the box at the center of the display, if it is the actual OH position. In this regard, since the distance change may be small, and therefore difficult to detect on the screen monitor, the appearance of the "ball" and/or display values can be changed by step 470 based on a current change in the value of distance and/or signal strength. For example, the "ball" can change from a lightly shaded circle to a solid dot when the distance to the OH location decreases. Similarly, flashing symbols or color changes can also indicate a distance decrease. It should be appreciated that the signal strength will increase when the actual OH location is approached.

If the "shadow" OH position is initially selected, as determined by the "ball" moving farther from the box when the locator is moved toward the shadow possible OH point, the locator is rotated by 180 degrees so that it faces the actual OH point. At the same time, locator 400 reconfigures display 450 to illustrate the actual OH point in one of the upper display quadrants. Irrespective of whether the actual or shadow OH point is initially selected, the actual OH point is readily identified by this process.

Having identified the actual OH point, in step 472, the operator continues to move locator 400 toward the actual OH point until the locator is indicated as being directly overhead. That is, "ball" 452 is in box 454. Again, since actual coordinates of the OH point are determined, it may not be necessary to physically move the locator all the way to the actual OH point.

Locator 400 is particularly advantageous with respect to the accuracy of the depth determinations which it produces. In particular, depth accuracy increases as the overhead point is approached. In view of equation (48) above, the error of estimating depth using measured distances R,r can be written as:

$$e_{Z_p} = \frac{1}{Z_p}\sqrt{R^2 e_R^2 + r^2 e_r^2} \tag{49}$$

where $e_R, e_r$ are the corresponding distance measurement errors. Clearly, for a given value of depth $Z_p$, depth measurement accuracy increases (i.e., $e_{Z_p}$ decreases), as R and r decrease with approaching the overhead point.

Tilt Correction

The foregoing descriptions are premised upon maintaining a vertical magnet position or compensating, in some manner, for variations from vertical. The former can be achieved by either manually leveling the locator or using a magnet suspension designed to keep the magnet vertically oriented, irrespective of locator tilt, while the latter can be achieved using a mathematical tilt correction. It is to be understood that this tilt compensation technique is applicable to both stationary transmitters operating at an at least temporarily fixed position at the surface of the ground as well as portable devices including those which are hand carried by an operator. The same mathematical tilt correction may be applied to both stationary and portable devices.

It is considered that one having ordinary skill in the art may readily implement manual leveling or an appropriate magnet suspension, for example, using a weighted gyroscopic-type gimbal. The mathematical tilt correction approach is outlined immediately hereinafter.

Figure 25:
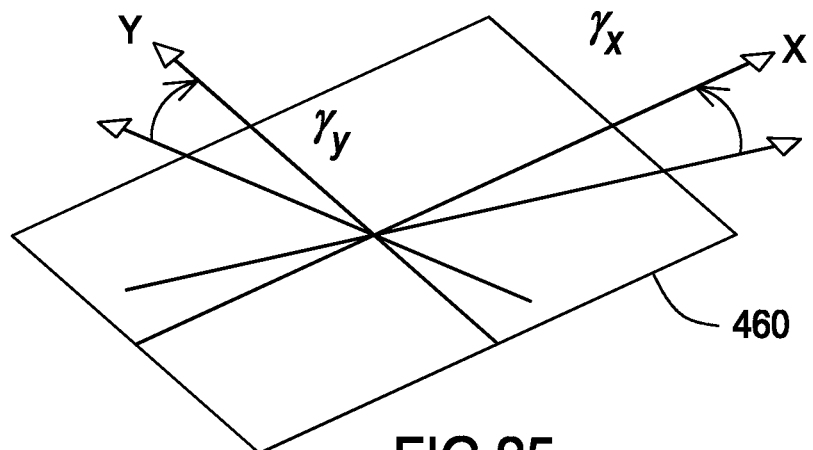
FIG. 25 is a diagrammatic view, in perspective, showing a level plane as well as a pair of tilt angles that are used to characterize tilt of the magnet with respect to this level plane.

Referring to FIG. 25, a level X,Y reference plane 460 is diagrammatically illustrated in a perspective view. Tilt angles, sometimes referred to as gravitational angles, are defined and measured with respect to this plane using a tilt sensor in locator 400. Here, a tilt-pitch angle $\gamma_x$ is a rotation about the Y-axis whereas a tilt-roll angle $\gamma_y$ is a rotation about the X-axis.

Figure 26:
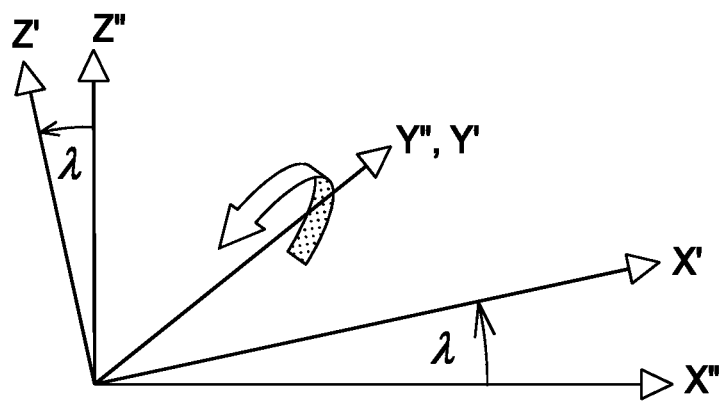
FIG. 26 illustrates a tilted coordinate system which has undergone a roll rotation and a pitch rotation with respect to the level coordinate plane illustrated by FIG. 25 and specifically illustrating correction of the pitch rotation.
Figure 27:
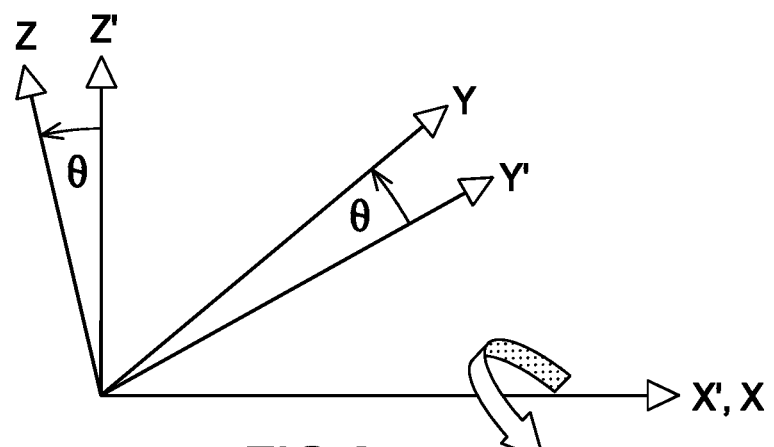
FIG. 27 illustrates a modified tilted coordinate system, following the roll correction and rotation of FIG. 26, and specifically illustrating correction of the roll rotation.

Referring to FIGS. 26 and 27, a tilted Cartesian coordinate system (X", Y",Z") is illustrated that changes orientation with the locator and which is associated with the X, Y, Z system by two rotations, one about the X axis (FIG. 27), given by an angular value θ, and another about the Y' axis (FIG. 26), given by an angular value λ. This system coincides with a level coordinate system (X, Y, Z) when the locator is in a level position.

Prior to mathematically correcting for locator tilt, probe coordinates are determined in tilted coordinates X", Y", Z" employing the analysis of sensed rotating dipole field data, as given above. Specifically, the over-the-head position is $(Y''_p, Y''_p)$ and vertical probe position is $Z''_p < 0$ if the X",Y"-plane of the tilted locator is above the probe, otherwise $Z|_p > 0$.

Still referring to FIGS. 26 and 27, a roll Euler transformation and a pitch Euler transformation convert probe coordinates from a tilted to a level system. The required Euler angles for pitch and roll can be derived from the measured tilt angles using $$\lambda = \gamma_x \tag{50}$$

$$\theta = \arcsin\left(\frac{\sin \gamma_y}{\cos \gamma_x}\right) \tag{51}$$

Note that for small tilt angles the Euler roll angle θ is approximately given by the tilt-roll angle $\gamma_y$. Finally, probe coordinates in a level system follow from $$\begin{Bmatrix} X_p \\ Y_p \\ Z_p \end{Bmatrix} = \begin{bmatrix} 1 & 0 & 0 \\ 0 & \cos\theta & \sin\theta \\ 0 & -\sin\theta & \cos\theta \end{bmatrix} \begin{bmatrix} \cos\lambda & 0 & \sin\lambda \\ 0 & 1 & 0 \\ -\sin\lambda & 0 & \cos\lambda \end{bmatrix} \begin{Bmatrix} X''_p \\ Y''_p \\ Z''_p \end{Bmatrix} \tag{52}$$

Logging Probe Position Data

Figure 28:
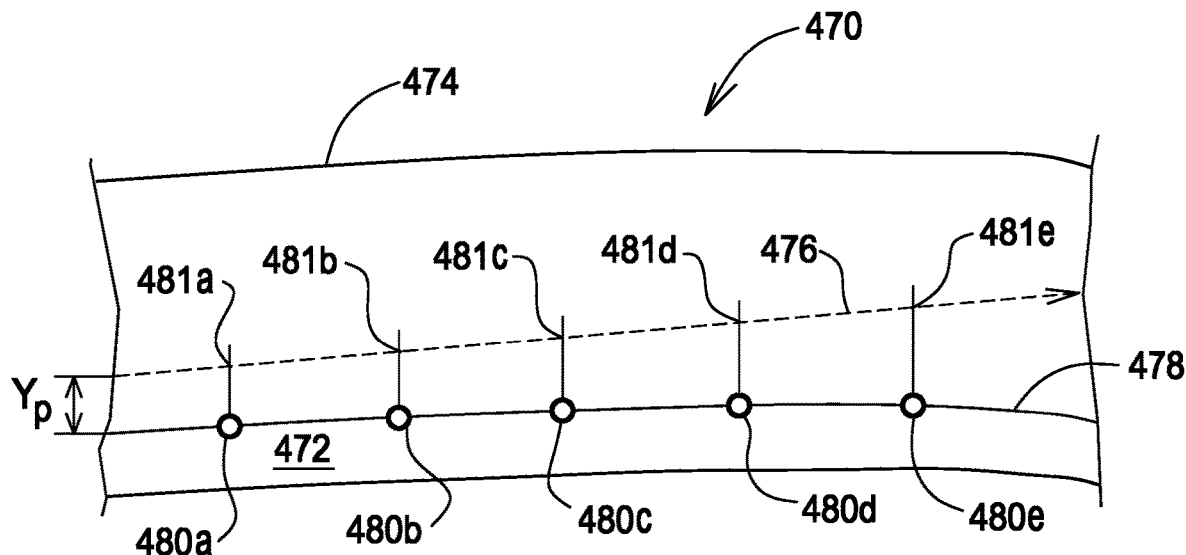
FIG. 28 is a diagrammatic plan view of a region in which a data logging operation is performed using the locating system of the present invention.
Figure 29:
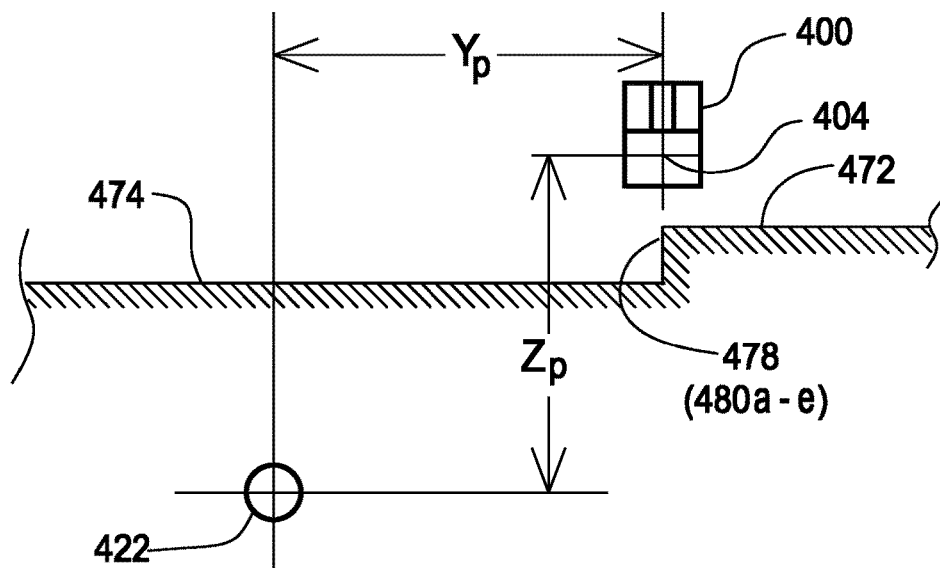
FIG. 29 is a diagrammatic view, in elevation, of the data logging operation of FIG. 28, illustrating further details of the region and the arrangement of the locator and probe in relation to one another.

Referring to FIGS. 28 and 29, logging of drillpath data will now be described. FIG. 28 illustrates a region, generally indicated by the reference number 470, in a diagrammatic plan view in which data logging is to take place. Region 470 includes a sidewalk 472 adjacent to a street 474. An intended drill path 476, beneath the street, is shown using a dashed line. This technique is useful from any convenient reference line such as, for example, an edge or curb 478 of sidewalk 472. FIG. 28 also illustrates region 470, but in an elevational view, including locator 400 positioned above curb 478 and probe 422 shown at some point along drill path 476. A series of reference locations 480*a-e* is designated along a length of curb 478. Such reference locations can be marked and measured employing either standard surveying techniques or using a global positioning system (GPS). With locator 400 held immediately above each of these reference locations as probe 422 progresses along drill path 476, a series of corresponding OH points 481*a-e* is identified in a one-to-one correspondence with reference points 480*a-e*.

As shown in FIG. 29, $Y_p$ and $Z_p$ are determined based on the position of magnet 404 (shown as an intersection in locator 400). FIG. 28 illustrates $Y_p$, as determined for points 480*a* and 481*a*. The vertical offset of the locator above the surface of the ground may be compensated for in any suitable manner such as, for example, pre-mapping the surface of the ground in the vicinity, as described above. While each of the OH points is shown at a normal angle in relation to curb 478, it should be appreciated that this is not a requirement. It is noted that this procedure is advantageous with respect to the fact that the operator is not required to walk to the OH position. In this regard, the present technique benefits from the determination of the actual location of the overhead point relative to the locator, as described above.

Figure 30:
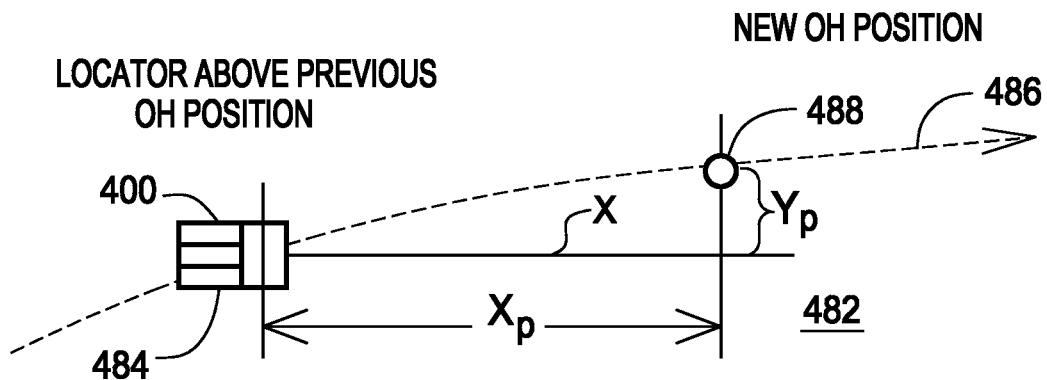
FIG. 30 is a diagrammatic plan view of a region in which a data logging operation is performed using the locating system of the present invention wherein the locator is moved incrementally from a prior overhead to a new or current overhead point.
Figure 31:
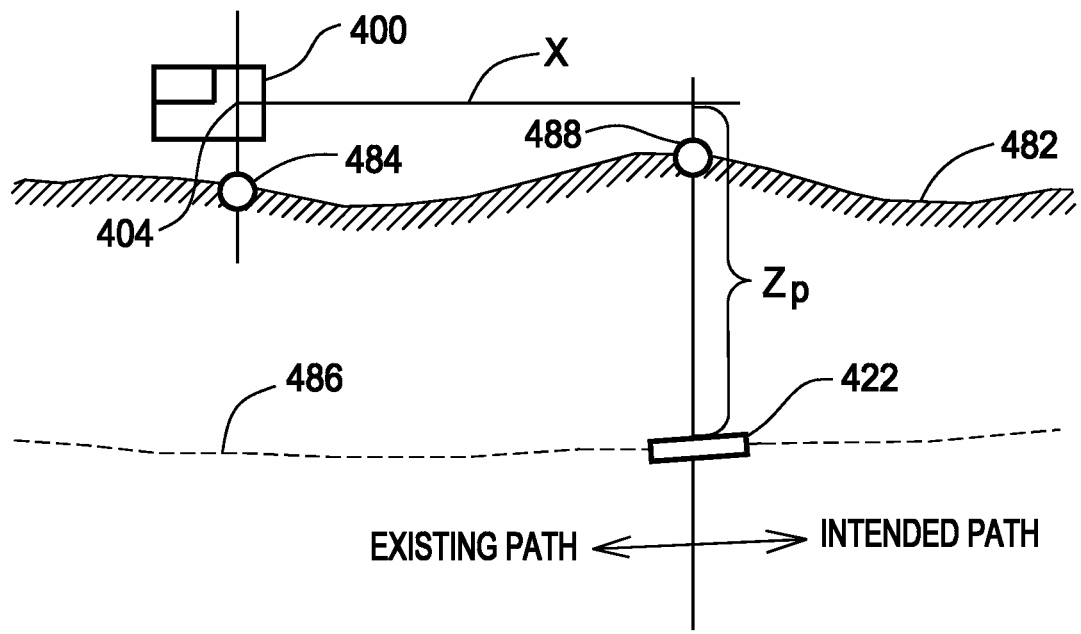
FIG. 31 is a diagrammatic view, in elevation, illustrating further details with respect to the data logging operation of FIG. 30.

Referring now to FIGS. 30 and 31, a logging procedure will now be described which relies only on the determined over-the-head positions. That is, there is no need to use a GPS or other survey apparatus, although this method assumes that the locator features some mechanism for orienting the locator in a specified compass direction. One choice would be to use a magnetometer for detecting compass direction by filtering out the rotating magnetic field generated by the rotating magnet. Another approach would rely on deducing the magnet orientation with respect to the Earth field by extracting compass direction from voltage and current driving the rotation motor for the magnet.

FIG. 30 is a plan view of a region 482 in which this logging operation is to take place, showing locator 400 at a prior over-the-head point 484 above a drill path 486. FIG. 31 is an elevational view of region 482 showing locator 400 (i.e., magnet 404) positioned at prior OH point 484. Accordingly, probe 422, traveling from left to right in the view of the figure has already traveled through prior OH point 484 and has reached a current OH point 488. Thus, the drill path shown to the right of probe 422 (see FIG. 31) is an intended path. Probe position data $X_p, Y_p, Z_p$ are recorded while the locator is at prior OH position 484. Again, throughout this data logging process the locator should always be pointed in the same compass direction which, in the present example, is to the right in the view of these figures. Probe position data are determined before moving locator 400 from prior OH point 484 to current OH position 488 in order to locate and log data in an efficient manner. The current OH position then becomes a prior OH position such that the described process is repeated to incrementally log the probe positions across the region of interest. It is noted that data can be logged at arbitrary rod length intervals. Furthermore, rod identification numbers do not need to be recorded. Drillpath positions are obtained by adding all previous recorded probe position data, either in real time while drilling or after completion of the bore. Once again, this procedure relies on the highly advantageous capability of this system to remotely determine the actual coordinates of the OH position.

Another embodiment of locator 400 will now be described which does not provide a complete set of probe position coordinates but which, nonetheless, should provide very accurate depth determination, for example, in the presence of rebar.

Data Acquisition and Analysis

Data acquisition, in the context of this embodiment, relies only on measured magnitude of flux, but does not require measurement of magnet rotation angles corresponding to flux measurements. Accordingly, flux measurements can be performed over at least one half of a magnet rotation such that these flux measurements provide for determination of maximum and minimum values $b_{max}$, $B_{min}$. Such minimum and maximum flux values can be seen in FIG. 21. The measured data can be processed in two ways, denoted as Method a and Method b, as described immediately hereinafter.

Method a

From the recorded set of fluxes, maximum and minimum values $b_{max}, b_{min}$ are extracted. As described with respect to FIG. 20 above, a maximum flux is measured when dipole axis 408 points at the over-the-head position or in the opposite direction ($\rho=\rho_{OH}$, $\rho=\rho_{OH}+\pi$). A minimum value occurs when $\rho=\rho_{OH}\pm\pi/2$. That is, the dipole axis is perpendicular to the direction that is toward the over-the-head position. Introducing this information to equation (42) yields $$b_{max}=R^{-4}\sqrt{3r^2+R^2} \tag{53}$$

$$b_{min}=R^{-3} \tag{54}$$

Hence, the following equations are obtained for the determination of $r, R, Z_p$ $$R = b_{min}^{-1/3} \tag{55}$$

$$r = \frac{1}{\sqrt{3}} b_{min}^{-4/3} \sqrt{b_{max}^2 - b_{min}^2} \tag{56}$$

$$Z_p = \pm \sqrt{R^2 - r^2} \tag{57}$$

Method b

Figure 32:
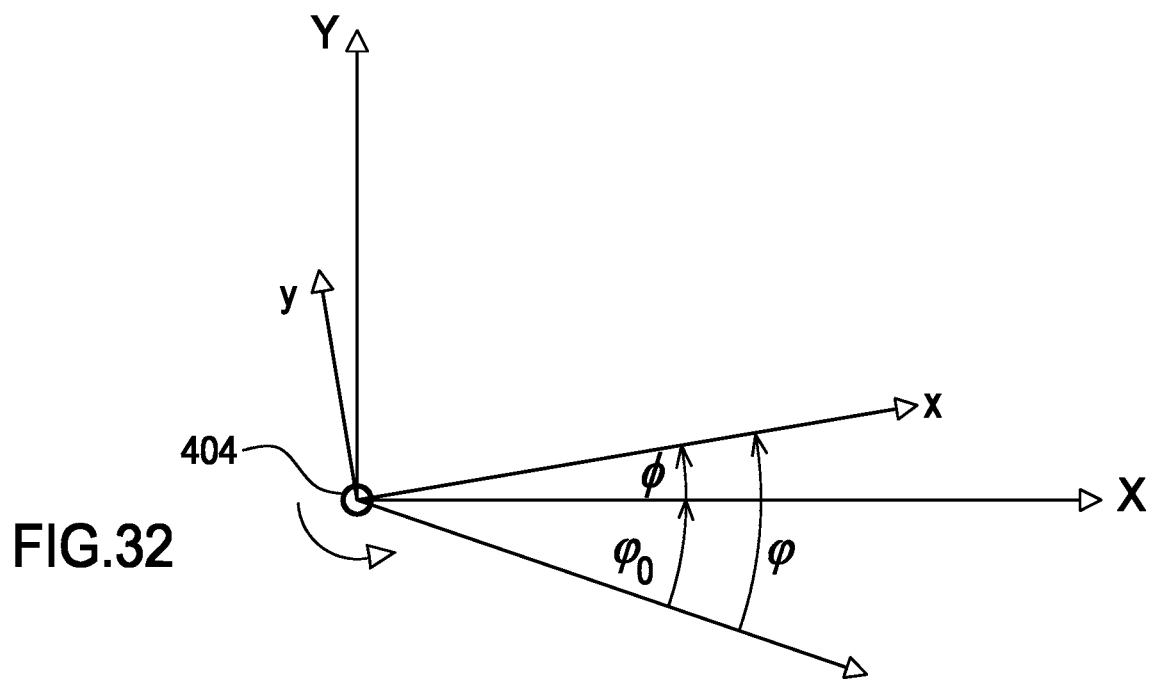
FIG. 32 is a diagrammatic plan view of the vertically oriented magnet of the portable walkover locator of FIG. 18, shown here for purposes of illustrating an alternative angular nomenclature.

Referring to FIG. 32, a diagrammatic plan view of magnet 404 is provided, illustrating the use of a rotation angle φ. This approach is similar to the phase method described above by equations (19) to (23). However, instead of measuring rotation angle φ, angle φ is used from a recorded time t and magnet rotation frequency f based on $$\varphi=2\pi ft \tag{58}$$

According to this definition, rotation angle φ=0 at time t=0 when a first set of fluxes is measured. Angle φ has the value $\varphi_0$ when dipole axis aligns in the X-direction of the locator coordinate system. It should be noted that it is easier to obtain rotation angle φ than to measure angle ρ, which would require a measurement of $\varphi_0$. Radii r, R and depth $Z_p$ are obtained from a curvefit of the measured square fluxes $b^2$ $$g=c_1 \cos^2(\overline{c}_3-\varphi)+c_2 \tag{59}$$

and the following equations.

$$R^2 = \left(\frac{1}{c_2}\right)^{1/3} \tag{60}$$

$$r^2 = \frac{c_1 R^8}{3} \tag{61}$$

$$Z_p = \pm \sqrt{R^2 - r^2} \tag{62}$$

Note that Methods a and b do not provide $X_p, Y_p$ coordinates of the over-the-head position, however, these coordinates are not needed in the context of finding the OH point, as described immediately hereinafter.

Locating Procedure

Locating the over-the-head position with this embodiment is somewhat different from that of the aforedescribed embodiment which yields the actual $X_p, Y_p$ coordinates. While the described technique uses the minimum flux $b_{min}$ and distance r from the locator to the over-the-head point, it should be appreciated that any one of the variables $r, R, b_{min}, b_{max}$ or additional dependent variables, derived from these variables, could form the basis of a locating procedure. The choice of $b_{min}$ and r does, however, appear to be well-suited to the task.

Figure 33:
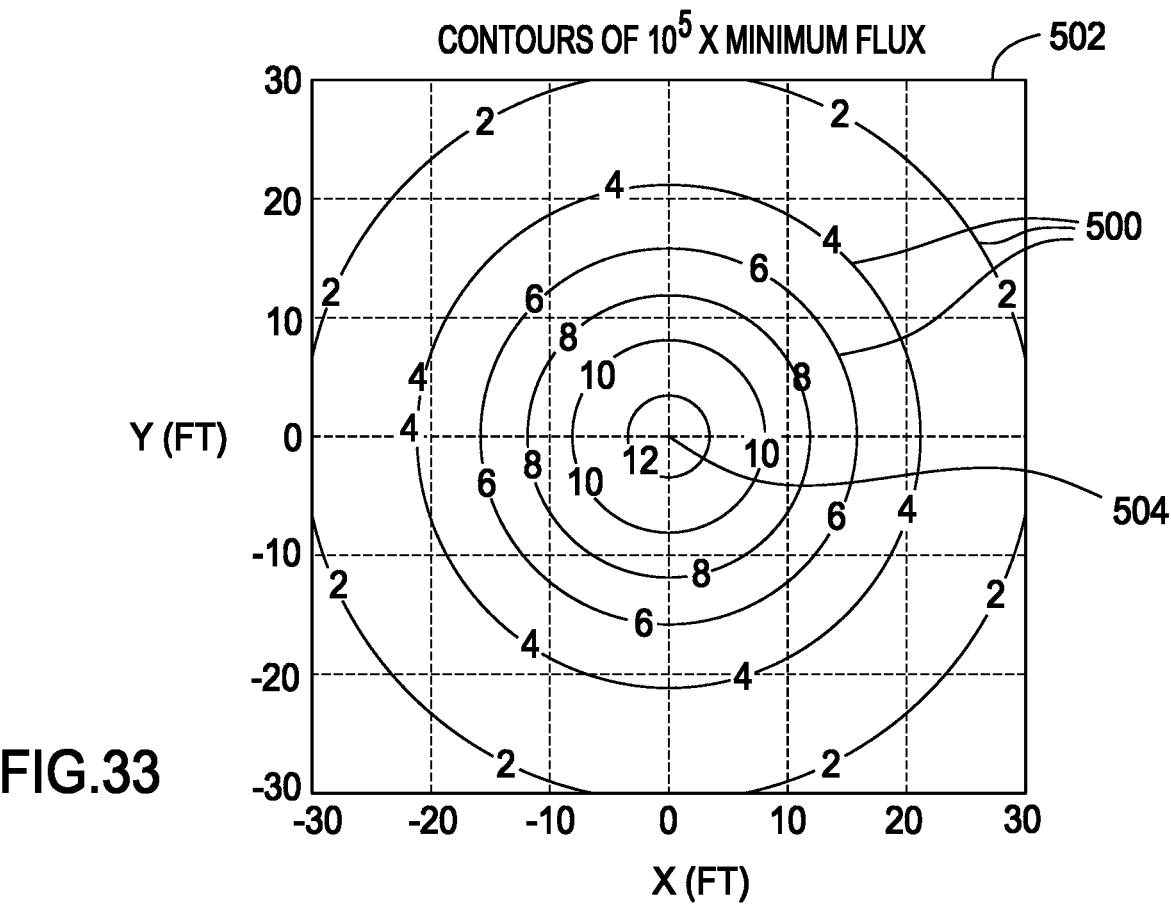
FIG. 33 is plot of minimum flux contour lines defined around an overhead point that is directly above an inground probe with circumferential movement of the locator around the overhead point.

Referring to FIG. 33, contours 500 of constant minimum flux on a level ground 502 form concentric circles around an OH point 504. FIG. 33 shows the flux for a probe depth of 20 feet. Each circular gradient line would be observed by moving locator 400 radially around OH point 504. In this regard, it is noted that these gradient lines are a construct, forming part of the locating technique, and do not exist in a temporal sense. When approaching the OH point from a distance of 30 feet, for example, along a path 506, the gradients of minimum flux become increasingly closer to one another until the locator is moved to within approximately 10 feet of the OH point. Closer to OH point 504, flux changes are still sufficiently large to locate this point with confidence, particularly in conjunction with monitoring distance r to pinpoint this position exactly.

FIG. 33 is a plot 510 of minimum flux times $10^5$ versus radial distance r from OH point 504, further illustrating the suitability of using minimum flux in locating this point. In particular, a relatively sharp gradient and flux intensity is seen from 30 feet out, continuing up to a relatively small distance from the OH point. Accordingly, a peak in minimum flux intensity will be observed upon passing through the OH point.

In most situations, the user will follow the drill string in the direction of an assumed over-the-head position. Frequent sweeping in all directions allows the user to determine the direction of largest flux gradient which can readily be tracked to the OH position. For example, locator 400 can display $b_{min}$ flux intensity and/or distance r. If the user is relying on displayed flux intensity, the user simply moves the locator in a way which causes a continuously increasing value of $b_{min}$. In the case of using r, the user simply moves the locator in a way which causes a continually decreasing value of r.

Horizontal Magnet Locator

Figure 34:
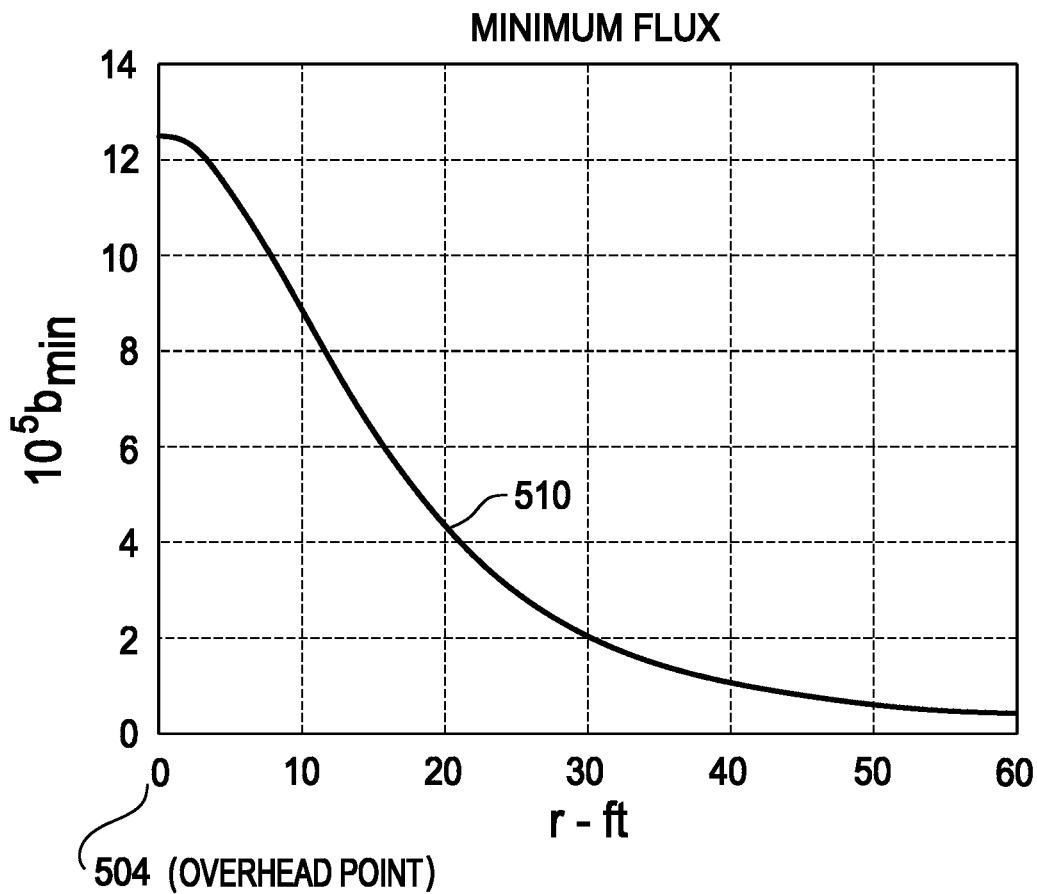
FIG. 34 is a plot of rotating magnetic flux minimum intensity versus distance from an associated overhead point, shown here to illustrate the suitability of the use of minimum flux in tracking and locating the overhead point.
Figure 35:
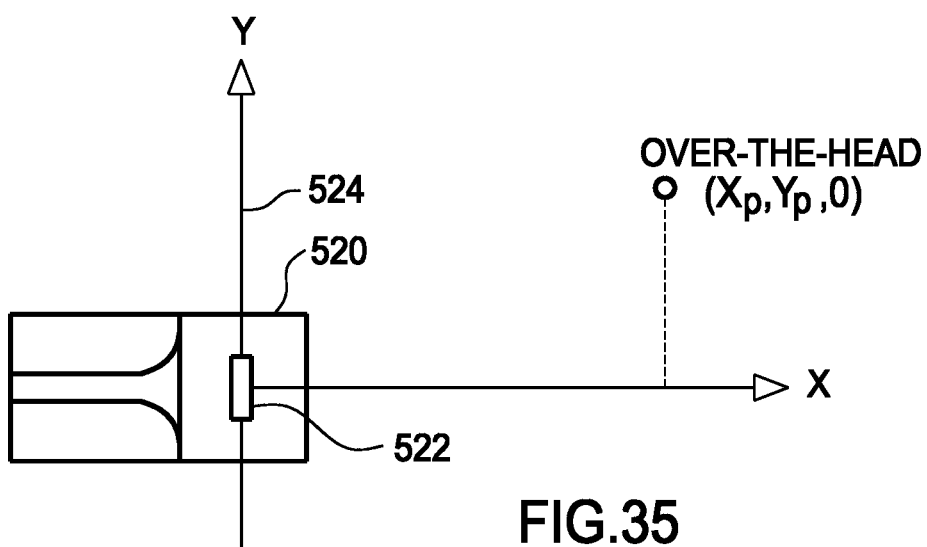
FIG. 35 is a diagrammatic plan view illustrating a system including a locator having a single rotating magnet wherein the rotation axis of the magnet is at least generally horizontally arranged and showing the locator in relation to an overhead point which is directly above an inground probe or receiver that forms another part of the system.
Figure 36:
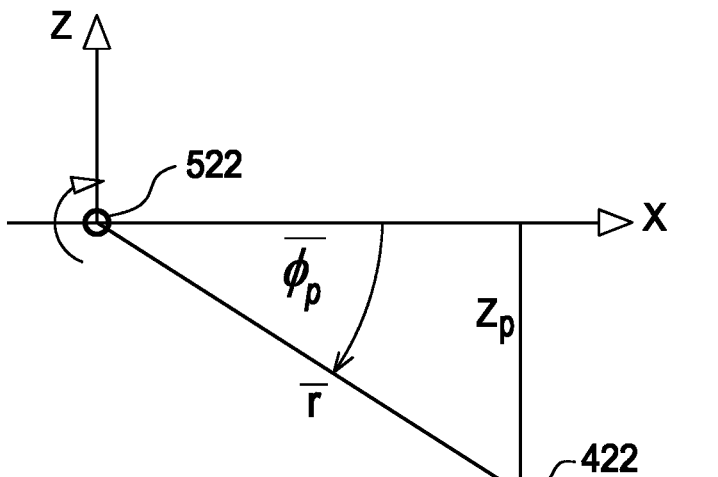
FIG. 36 is a diagrammatic view, in elevation, illustrating the system of FIG. 35, shown here to illustrate further details with respect to the positional relationship between the locator and inground receiver.

FIG. 34 illustrates another embodiment of a single magnet locating system. Specifically, a locator 520 is shown having a horizontal magnet 522. The latter and locator 520 are shown in a plan view such that magnet 522 has a horizontal axis of rotation 524 that is coincident with the Y axis. FIG. 35 is a diagrammatic view, in elevation, showing horizontal rotating magnet 522 in relation to probe 422 in order to further characterize their relationship. It should be appreciated, in this regard, that a magnet with a horizontal axis of rotation can be mounted in the locator in any number of different ways and alignment of the magnet rotational axis with some other horizontal direction may readily be accommodated in view of the present disclosure. Data acquisition, specifically the measurement of fluxes and rotation angles, is nearly identical to that of the vertical magnet locator. Further, data analysis closely follows the procedure that is described in detail above. Accordingly, these discussions will not be repeated for purposes of brevity. For locator 520 depicted in FIG. 34, probe position coordinates are obtained from $$X_p = r\cos(p_p) \tag{63}$$

$$Y_p = \pm\sqrt{R^2 - r^2} \tag{64}$$

$$Z_p = -r\sin(p_p) \tag{65}$$

Here, radii $R, \bar{r}$ are calculated from the curvefit coefficients of the measured square fluxes, as described above for the vertical magnet locator.

Having described a number of embodiments using a single magnet in a vertical or horizontal orientation, it should be mentioned that a particular advantage is shared by these embodiments. In particular, as described above, as the over-the-head point is approached, the accuracy with which depth is determined actually increases.

The locator of the present invention improves drillhead tracking at least in the following areas. It allows accurate tracking under rebar, due to the very low frequency of the rotating dipole field. Presently, the DCI Eclipse® system (by Digital Control, Inc.) utilizes operating frequencies of about 12 kHz and 1.5 kHz, respectively. Notice a magnet rotation frequency of 2 Hz is three orders of magnitude lower than 1.5 kHz and is therefore expected to reduce rebar effects significantly. An improved locating capability is provided since probe position relative to the locator can be displayed. The locating procedure focuses on finding the over-the-head position on the ground surface immediately above the probe. For this purpose, the new locator uses a "ball-in-the-box" display and method reminiscent of the Eclipse® display but here the "ball" is a display of actual over-the-head coordinates, a technique which could not be implemented for the Eclipse® system. In addition, by varying the frequency of the rotating magnet and analyzing the sensor data one can extrapolate to zero frequency, thus minimizing influences of conducting material as described in U.S. Pat. No. 6,285,190 which is commonly owned with the present application and is incorporated herein by reference.

Figure 37:
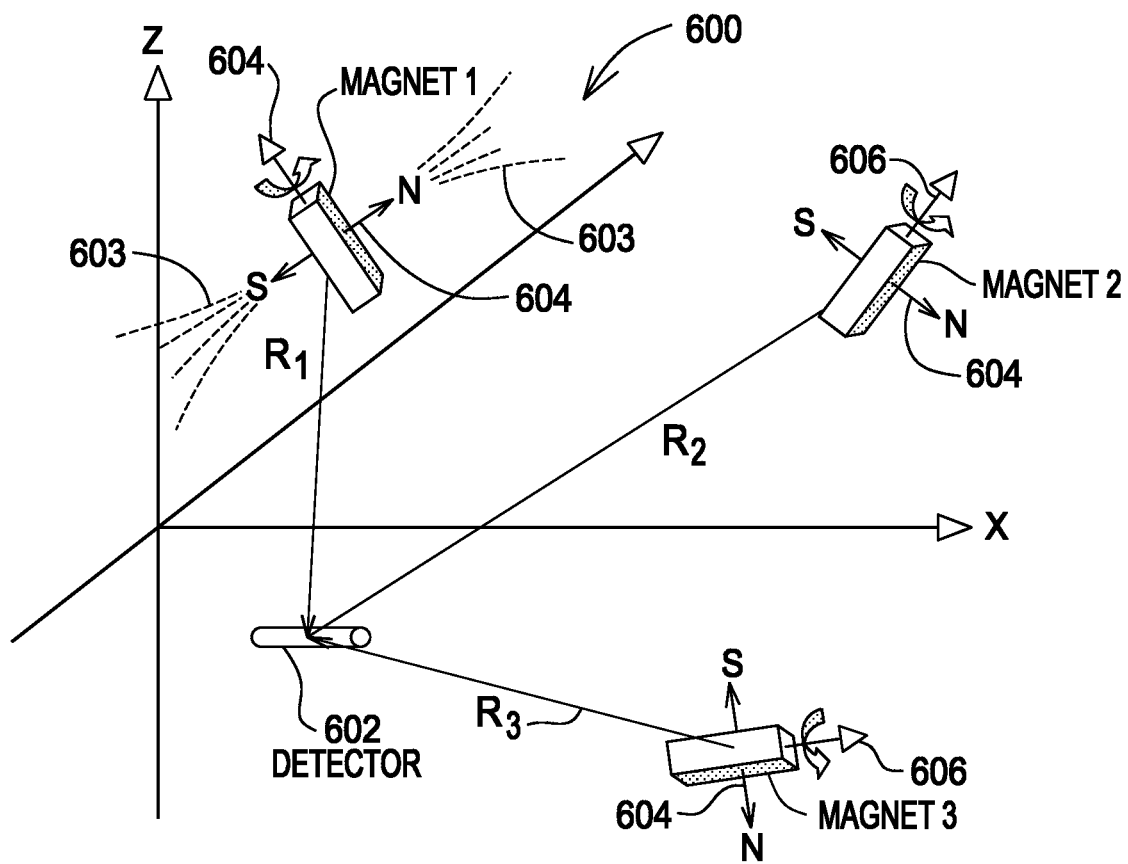
FIG. 37 is a diagrammatic perspective view of a system that uses three rotating magnets, at spaced apart locations, along with one receiver.

Referring now to FIG. 37, another system, that is produced in accordance with the present invention, is generally indicated by the reference number 600. This system is useful in determining the position of an in-ground object such as, for example, a drillhead or other item that can be configured with a receiver or detector 602, with great accuracy. The system employs at least three generators of rotating dipole fields that are indicated as Magnet 1, Magnet 2 and Magnet 3. As is evident in view of the discussions above, each generator produces a rotating dipole field 603 (shown for Magnet 1) by rotating a dipole axis 604 of each magnet about an axis 606 that is typically at least approximately normal to the dipole axis. Each magnet is mounted in a separate housing (not shown). Detector 602 is made up of three flux sensors that may be selected in accordance with the precepts given above. It should be appreciated that rotating fields can either be generated by magnets, as shown, which rotate about a single axis or by a pair of antennas inducing time-varying fluxes. Accordingly, the following description uses the term "magnet" to denote either an actual magnet or an appropriate pair of antennas.

Magnets 1-3 are generally placed above ground, but occasionally an application could require the placement of rotating magnets below the ground surface. In the present example, the XY plane represents the surface of the ground. Magnets 1 and 2 are above the surface of the ground while Magnet 3 is below the surface of the ground. As indicated in the figure, rotation axis orientation angles are arbitrary and need not be measured. In order to minimize interference effects, the magnet can be rotated slowly at low frequencies (revolutions per second) that range from a fraction of a Hertz to 500 Hz or more. Different frequencies are required to distinguish fluxes induced by the magnets at the location of the detector. Alternatively, the system can be designed with different operating time-slots assigned to each magnet, in which case all magnets could rotate at the same frequency.

As described above, each magnet produces a rotating three-dimensional magnetic dipole field having an axis of symmetry that is normal to the rotation axis. The rotating dipole induces a time-varying flux at detector 602 that is measured using three essentially orthogonal flux sensors. Either magnetometers or coils can be used as flux sensing devices, as described above, so long as a total flux strength is determinable in three dimensions. Total flux is calculated as the magnitude of the vector sum of the three orthogonal flux components. The position identifying method that is used in conjunction with this embodiment does not require the measurement of rotation angles of the magnets, as will be seen.

During magnet rotation, the time-varying flux, responsive to each rotating magnet, generally displays maxima and minima. It is recognized that a distance A between the center of the i-th magnet and detector 602 can be obtained based on the use of the minima, maxima, average or some other suitable flux characteristic that is repeatably ascertainable with revolution of the magnet. In the instance of using the minima, a minimum value of flux observed with respect to rotation of one of the magnets, is applied in the formula $$R_i = b_{min}^{-1/3} \quad (66)$$

It is recognized that the flux has the same minimum value $b_{min}$, on the surface of a sphere of radius $R_i$ with the i-th magnet at its center. Therefore, the position of detector 603 can be determined, in part, as a point of intersection of the three spheres enclosing the magnets. In order to make this initial determination, the values required to be known include (i) the positions of the magnets, which can be established in a suitable coordinate system, and (ii) a total minimum flux measurement that is induced by each magnet. The coordinate system can be established in any suitable manner. For example, one of the magnets may define the origin of the coordinate system. The coordinate system axes can be oriented in any suitable manner such as, for example, by being defined with respect to a magnet that is at the origin of the coordinate system or by using the points of the magnetic compass. Any suitable reference system may be utilized and the descriptions provided herein are not intended to have any limiting effect with respect to this coordinate system.

Assuming the position coordinates of the i-th magnet, denoted by $(X_{m_i}, Y_{m_i}, Z_{m_i})$, are known, the equation of the i-th sphere is written as $$f_i = R_i^2 - (X_d - X_{m_i})^2 - (Y_d - Y_{m_i})^2 - (Z_d - Z_{m_i})^2 = 0 \quad (67)$$

which includes detector 602 position coordinates $(X_d, Y_d, Z_d)$ as unknowns.

Equation (66) represents a set of i equations (i=1,2,3, in the present example) which can be solved for its three unknowns using standard numerical techniques. One suitable technique is unconstrained optimization performed with the so-called SIMPLEX method. The latter requires definition of a function F that needs to be minimized. A convenient choice is $$F = w_1 f_1^2 + w_2 f_2^2 + w_3 f_3^2 = F_{min} \quad (68)$$

Here the symbols $w_i$ (i=1,2,3) represent arbitrarily chosen weighting functions. Note $w_i > 0$ to satisfy each sphere equation (2). In one implementation, set $w_i = 1$, but functions like the following can be selected:

$$w_i = \frac{const}{R_i} \quad (69)$$

or some variation of it to account for the decrease of measurement accuracy with increasing distance $R_i$.

One value of the SIMPLEX method resides in its exclusive use of function evaluation and avoidance of derivatives. One could, of course, employ other standard techniques such as a Newton or a nonlinear least square method that use derivatives.

Note that equations (66) are nonlinear and may be solved by iteration starting from an initial solution estimate. In general, there are at least two valid solutions for detector position, so that an initial estimate can be selected with the intent of finding the solution that represents the actual detector position. Any suitable additional information may be utilized as input to identify the actual detector position, among the possible positions. Often, such suitable additional information is already known. For example, a last known detector position may be used as an estimate for the new solution. Alternatively, during drilling in which the detector is moved by a drill string, particularly one including drill pipe sections, an extrapolation can be made from the last known position based on extension of the drill string and, if measured, known pitch and yaw to obtain a better initial estimate. Pitch and yaw can be measured at the drill head and transmitted to the surface for use by a suitable transmitter or transmitted to the drill string using a wire-in-pipe arrangement such as described in above incorporated U.S. Pat. No. 6,223,826. In the instance of wireless transmission, the drill head of FIG. 15, described above, may be employed.

Finally, any number of magnets may be added to the system, requiring only a minor modification of the tracking method. If tracking is performed with the SIMPLEX method a term $w_i f_i^2$ must be added to equation (67) for each magnet added to the system. No other modification of the tracking method is needed. In view of the foregoing descriptions, it is considered that one of ordinary skill in the art is capable of applying a suitable numerical technique for purposes of determining the detector position and for selecting appropriate supplemental information to resolve multivalued parameters based on a particular implementation.

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. For example, a receiver that is described as being housed in a boring tool may often be used in a variety of alternative applications such as, for instance, within a sonde that is designed to transit through a concealed utility line. Such a utility may be concealed, for example, by the ground or contained within a wall or floor. Furthermore, suitable equivalents may be used in place of or in addition to the various components, the function and use of such substitute or additional components being held to be familiar to those skilled in the art and are therefore regarded as falling within the scope of the present invention. Therefore, the present examples are to be considered as illustrative and not restrictive, and the invention is not to be limited to the details given herein, but may be modified in any number of alternative ways.

What is claimed is:

1. An apparatus, comprising:
a transmitter configured for rotating a magnet about an axis in a way which produces a rotating magnetic dipole field;
a receiver arranged at a distance from the transmitter at least approximately in a predetermined positional relationship with the transmitter at least approximately on said axis and configured to periodically sense a set of total flux intensities in three dimensions, of said rotating magnetic dipole field, successively through a plurality of angularly distributed rotation angles of said magnet sufficient to characterize the total flux intensity with rotation of the rotating magnetic dipole field; and a processor configured to use the set of total flux intensities in conjunction with said distance to determine an average flux intensity which determines the dipole strength of the rotating magnetic dipole field.

2. An apparatus comprising:

a transmitter configured for rotating a magnet about an axis in a way which produces a rotating magnetic dipole field wherein said magnet defines a dipole axis that is orthogonal to the axis about which the magnet is rotated;

a receiver arranged at a distance from the transmitter at least approximately in a predetermined positional relationship and in a location through which said dipole axis passes during rotation and configured to periodically sense a set of total flux intensities in three dimensions, of said rotating magnetic dipole field, successively through a plurality of angularly distributed rotation angles of said magnet sufficient to characterize the total flux intensity with rotation of the rotating magnetic dipole field; and a processor configured to use said set of total flux intensities to determine at least one of a minimum flux intensity and a maximum flux intensity for use with said distance to establish the dipole strength of the rotating magnetic dipole field.

* * * * *